United States Patent
Mangler

(10) Patent No.: US 12,121,017 B2
(45) Date of Patent: Oct. 22, 2024

(54) METHOD FOR INFLUENCING ARTHROPODS

(71) Applicant: RUTRONIK ELEKTRONISCHE BAUELEMENTE GMBH, Ispringen (DE)

(72) Inventor: Andreas Mangler, Karlsruhe (DE)

(73) Assignee: RUTRONIK ELEKTRONISCHE BAUELEMENTE GMBH, Ispringen (DK)

( * ) Notice: Subject to any disclaimer, the term of this patent is extended or adjusted under 35 U.S.C. 154(b) by 492 days.

(21) Appl. No.: 17/621,796

(22) PCT Filed: Jun. 25, 2020

(86) PCT No.: PCT/EP2020/067905
§ 371 (c)(1),
(2) Date: Dec. 22, 2021

(87) PCT Pub. No.: WO2020/260501
PCT Pub. Date: Dec. 30, 2020

(65) Prior Publication Data
US 2022/0369620 A1 Nov. 24, 2022

(30) Foreign Application Priority Data

Jun. 25, 2019 (DE) ...................... 10 2019 117 088.5
Aug. 13, 2019 (DE) ...................... 10 2019 121 833.0

(51) Int. Cl.
*A01M 29/28* (2011.01)
*H04B 1/04* (2006.01)

(52) U.S. Cl.
CPC ............... *A01M 29/28* (2013.01); *H04B 1/04* (2013.01)

(58) Field of Classification Search
CPC ..................................................... A01M 29/28
See application file for complete search history.

(56) References Cited

U.S. PATENT DOCUMENTS

| 2014/0144067 A1* | 5/2014 | Shefer | A01M 29/10 43/132.1 |
| 2014/0259858 A1* | 9/2014 | Canfield | A01M 1/04 43/2 |

FOREIGN PATENT DOCUMENTS

| CH | 704365 A2 * | 7/2012 | ............ A01M 29/10 |
| CH | 710951 A2 * | 10/2016 | ............ A01M 29/28 |
| CN | 108935437 A * | 12/2018 | ............ A01M 29/28 |

(Continued)

OTHER PUBLICATIONS

International Search Report for corresponding application PCT/EP2020/067905 filed Jun. 25, 2020; Mail date Oct. 2, 2020.

(Continued)

*Primary Examiner* — Christopher P Ellis
(74) *Attorney, Agent, or Firm* — CANTOR COLBURN LLP

(57) ABSTRACT

The invention relates to a method for influencing arthropods by means of electromagnetic radiation, wherein the electromagnetic radiation (10) is emitted from at least one emitter (14). Due to the fact that the characteristic (18) of the electromagnetic radiation (10) is created by means of at least one equivalent electronic equivalent circuit, wherein the equivalent circuit is a model of an arthropod (12), corresponding signals and/or signal patterns to which the corresponding arthropods react can be quickly, simply and systematically determined.

31 Claims, 60 Drawing Sheets

(56) References Cited

FOREIGN PATENT DOCUMENTS

| WO | WO-9955151 A1 | * | 11/1999 | ............ A01M 29/28 |
|----|---------------|---|---------|-------------------------|
| WO | 2012094768 A1 |   | 7/2012  |                         |
| WO | WO-2016165035 A1 | * | 10/2016 | ............ A01M 29/28 |
| WO | WO-2018104135 A1 | * | 6/2018 | ............ A01M 29/28 |
| WO | WO-2020260501 A1 | * | 12/2020 | ............ A01M 29/24 |

OTHER PUBLICATIONS

Samuel J. Cooper, "Simulated Impedance of Diffusion in Porous Media", Electrochimica Acta 251, (2017) pp. 681-689.

* cited by examiner

FA = Female Antenna
FP = Female Palps
MH = Male Head
FB = Female Body

| FA | FP | MH | FB | GR name |
|----|----|----|----|---------|
|    |    |    |    | AalbGr6 |
|    |    |    |    | AalbGr64e |
|    |    |    |    | AalbGr4 |
|    |    |    |    | AalbGr7 |
|    |    |    |    | AalbGr9 |
|    |    |    |    | AalbGr10 |
|    |    |    |    | AalbGr34 |
|    |    | ■  |    | AalbGr2 |
|    |    |    |    | AalbGr1 |
|    |    |    |    | AalbGr45 |
|    |    |    |    | AalbGr41 |
|    |    |    |    | AalbGr64 |
|    |    |    |    | AalbGr20 |
|    |    |    |    | AalbGr76 |
|    |    | ■  |    | AalbGr3 |
|    |    |    |    | AalbGr53 |
|    |    |    |    | AalbGr73 |
|    |    |    |    | AalbGr11 |
|    |    |    |    | AalbGr14 |
|    |    |    |    | AalbGr25 |
|    |    |    |    | AalbGr26 |
|    |    |    |    | AalbGr23 |
|    |    |    |    | AalbGr46 |
|    |    |    |    | AalbGr61 |
|    |    |    |    | AalbGr61-N1 |
|    |    |    |    | AalbGr71 |
|    |    |    |    | AalbGr78 |
|    |    |    |    | AalbGr58 |
|    |    |    |    | AalbGr35 |
|    |    |    |    | AalbGr63 |

TPM 0   5   300

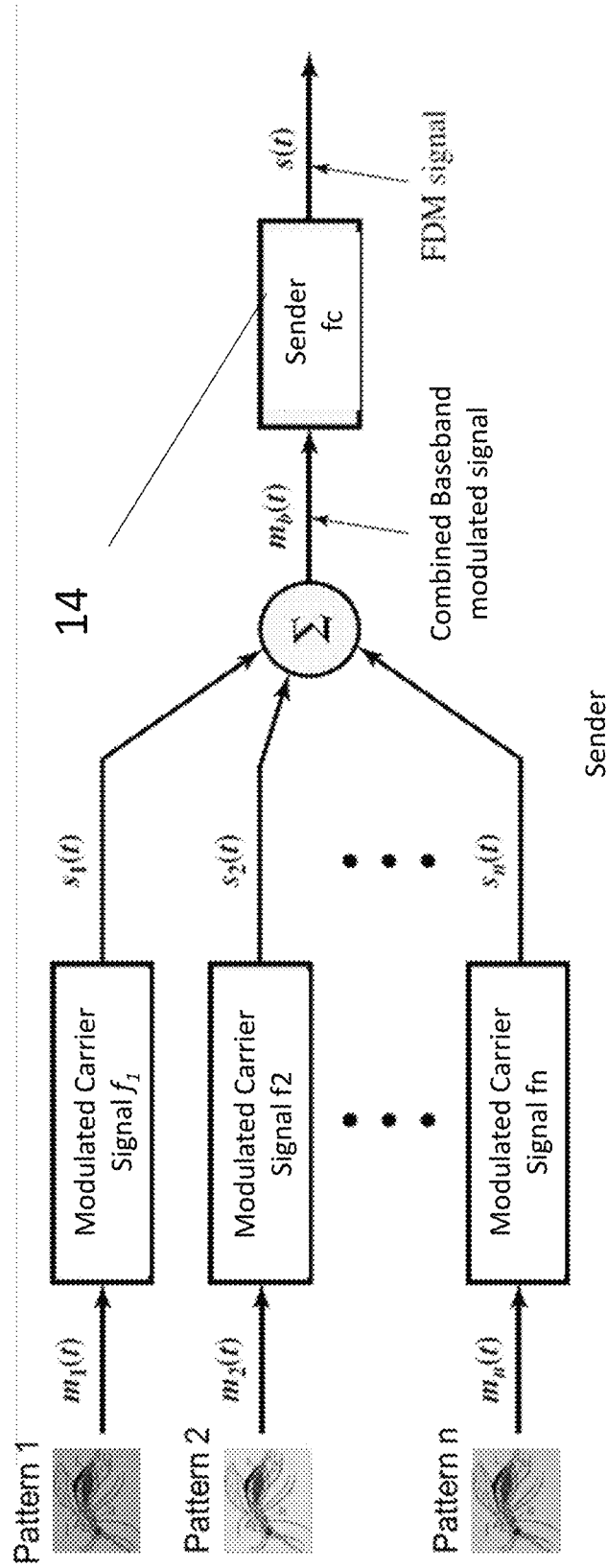
Abb. 19

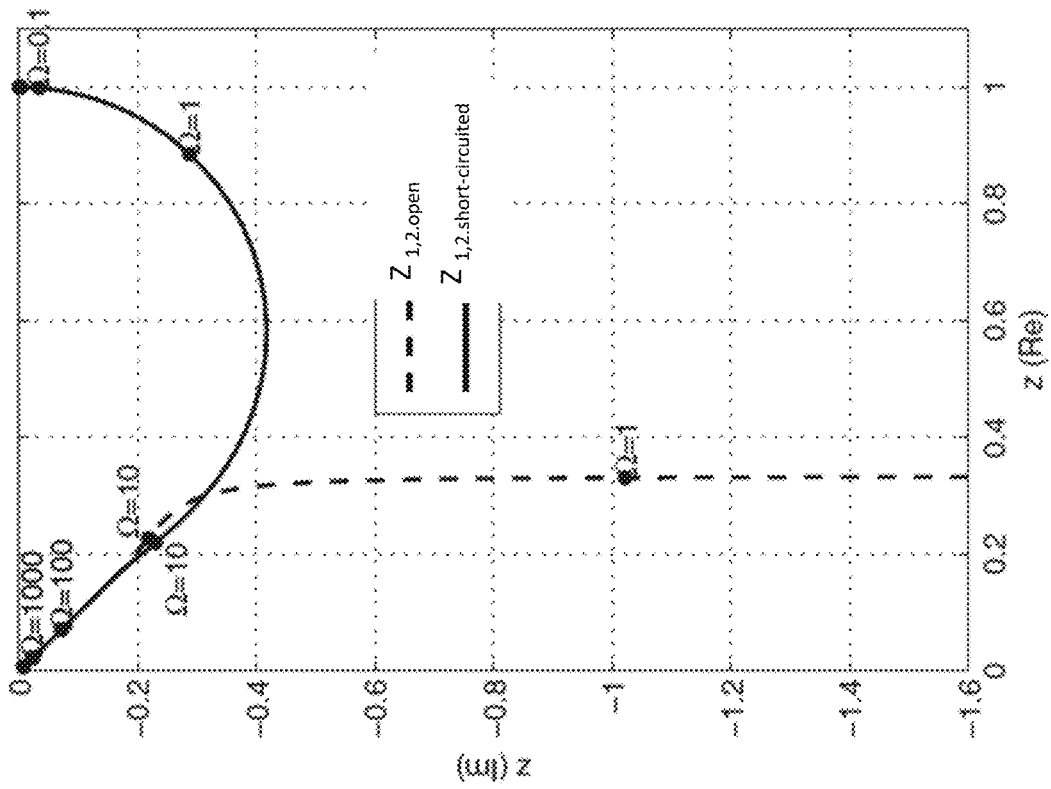
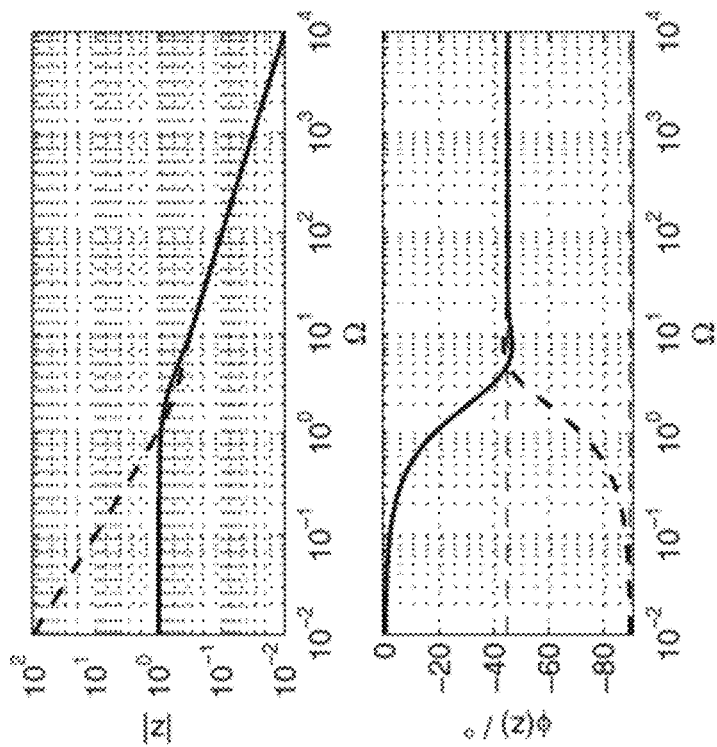
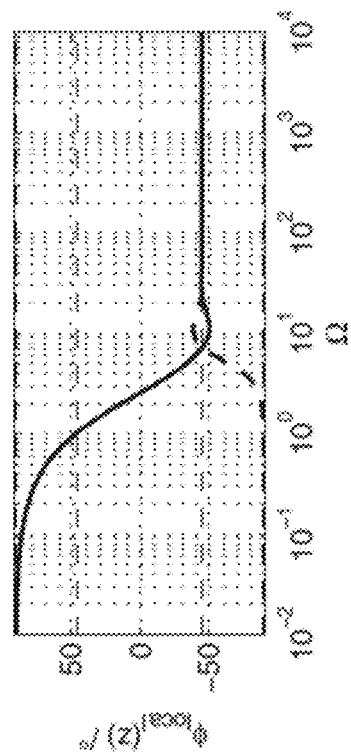
Fig. 34a
Fig. 34b
Fig. 34c
Fig. 34d
Fig. 34

METHOD FOR INFLUENCING ARTHROPODS

CROSS REFERENCE TO RELATED APPLICATIONS

The present application relates and claims the priority of German patent applications 10 2019 117 088.5, filed on 25 Jun. 2019, and 10 2019 121 833.0, filed on 13 Aug. 2019, the disclosure content of which is hereby incorporated by reference in its entirety.

TECHNICAL FIELD

The present disclosure is based on the following work:
Method for substitutive modelling of sensor structures of arthropods on the basis of equivalent circuit models with multi-frequency excitation for deep-learning behavior patterns of arthropods

Content

Definition of the objective
Introduction and motivation
Sensory functions of the arthropods
Scoring models for the sensory functions of arthropods
Fundamental functional principle of the system
Parameters for influencing the behavior pattern
Stimulation signal generator, which combines a frequency division multiplexing signal (FDM) and a time division multiplexing signal (TDM)
Equivalent circuit models (ECMs) for the multi-sensor system of arthropods
Transformation into transmission line models (TLMs)
Division of the TLMs and assignment of the sensory properties
Mathematical principles for calculation of the impedance spectrum
Topographic and tomographic analysis by means of tau factor calculation
Parameter extraction of the sensor model
Machine learning by model-based adaptive control system
Application of neural functions
Deep learning with the aid of a feedback loop to extracted parameters and adaptation of the parameters

Abstract

Impedance spectroscopy is a recognized, non-invasive measurement technique, especially for the characterization and analysis of electrochemical and biochemical systems. Currently, impedance spectroscopy is successfully used under laboratory conditions; a broad industrial and commercial application in embedded systems has not yet been achieved. The application of this method in biochemical systems like humans, animals and especially arthropods is challenging. One of the challenges is to find scalable modeling algorithms and deep learning algorithms based on artificial intelligence that are universally applicable but still suitable for autonomous embedded real-time systems with lower memory requirements. This paper describes a method for substitutive modeling of sensor structures of arthropods based on equivalent circuit models with multi-frequency excitation for deep learning behavior patterns of arthropods [7].

The method describes a robust and universally applied methodology for the parametric and non-parametric representation of the nonlinear impedance model and the correlated behavior of arthropods.

For the industrialization of software and hardware it is important that the implementation of the signal generator for the excitation of arthropods can be realized in a microcontroller-based system. The establishment of impedance spectroscopy and its signal generators for excitation in commercial applications with or without online/cloud connection requires algorithms that ideally work according to a set of identical mathematical algorithms and procedures.

Universally applicable models are of enormous importance, especially with the large number of arthropods. A three-dimensional representation is typically used to illustrate the impedance of biochemical systems. A target-oriented algorithm should support any kind of parametric representation, e.g. depending on Z real, Z imaginary, frequency, time, settling time, relaxation time, temperature, air pressure and humidity. The procedure allows to influence and stimulate arthropods and to adapt the algorithms by a limited number of parameters to extend the use to different classes of arthropods [7].

This method has evolved from a so-called big-data approach, which aims at describing any number of different nonlinear models with only one algorithm.

By the special combination of different approaches from recognized mathematical methods and physical methods, it has been possible to develop a new optimized algorithm with which the specific behavior of arthropods can be influenced and stimulated.

Biochemical Sensors of Arthropods

Representative for arthropods the sensor properties are explained using the example of mosquitoes. The olfactory reactions are triggered by the activation of olfactory sensory neurons (OSNs), which are mainly located at antennae, maxillary palps, mouth parts (consisting of proboscis and labellum) and tarsi. These sensory appendages can perceive very different extrinsic stimuli, such as volatile and non-volatile odors or pheromones, temperature, humidity, innocuous or harmful touch, and gravity, to activate a complex set of different ways in which arthropods perceive stimuli.

The modeling of the electrical and biochemical properties, as well as the excitation of arthropods is a big challenge. The definition of nonlinear dynamic properties based on defined parameters is a highly complex process. In order to compare experimentally determined results with the current model, arthropods must be kept in a defined and as stable as possible operating condition. Under laboratory conditions, this is still possible with a certain technical effort, but in practice, within embedded systems such as mobile or portable devices, only up to a certain point. Four characteristics describe the typical activity of arthropods under real conditions with respect to the challenges.

First, there is the volatility, i.e., the activity and dynamic changes, the speed of change, and the external influences in which the arthropod environment changes. The second challenge is the uncertainty of the measurement and related data, the lack of predictability of events, the lack of knowledge and understanding of the events and their impact on arthropods. Thirdly, complexity is a real problem, since a number of parameters simultaneously affect arthropods and make it impossible to attribute deviations directly to defined causes. The fourth and last characteristic is ambiguity, which can lead to misinterpretation and lack of definition of the different states of arthropods. Against this background, the research project was started to develop a generally accepted and applicable algorithm that is robust and implicitly simplifies the problem and breaks it down into defined steps.

The following constitutes the subject and content of the method and protection of the method
- a software framework, which makes it possible for us to understand data and the behavior pattern of arthropods, which leads to usable findings which automatically improve the algorithms of the frequency pattern
- use of machine learning and deep learning algorithms in embedded systems
- correlation between arthropod behavior and frequency pattern of the excitation signal
- parameterization of the behavior of the nervous system on the basis of equivalent circuit models (ECMs)
- in particular, the use of transmission line models TLMs to model equivalent circuits
- use of simplified equivalent circuits, such as Infinite Voigt models, to determine impedance spectra from empirically determined data
- non-invasive ganglion stimulation with adaptive frequency patterns
- non-invasive stimulation with adaptive frequency patterns which influence the natural resonance of the sensory receptors of the arthropods
- use of condensed ECMs and model parameters by normalization of parameters such as constant phase elements CPE and Infinite Voigt circuits
- simplification of the sensor structure and of the nervous system of arthropods by breaking down the chemical, biological and physical properties. The merged sensory properties of the arthropods are split up to disentangle the complex sensor structures
- analysis and representation of the sensory properties of the arthropods in the impedance spectrum
- use of different impedance representations to disentangle the complex processes with the aid of Nyquist plot, DRT distribution relaxation time method, impedance depending on phase angle and frequency
- use of a Fourier transform and fast Fourier transform (FFT) and in particular inverse Fourier transform (back-transformation) to analyze the image function $Y(\omega)$ and the original function $y(t)$
- use of a discrete Fourier transform DFT for storage-efficient use of the algorithms on the basis of a microcontroller with incorporation of a Goertzel algorithm for signal analysis, in particular with use of more than one excitation frequency
- use of the Laplace transform for analysis of time-continuous signals and analysis of the image hypofunction $F(s)$ and the original or hyperfunction $f(t)$ and in particular back-transformation, inverse Laplace transform
- use of the z-transform for analysis of time-discrete signals and their inverse Z-transformation
- use of vector analysis as a two-dimensional or three-dimensional analysis of time functions, frequency functions and in particular impedance spectra to describe significant extreme points in the spectrum
- description of a method for implementation in MCU-based systems without or with cloud connectivity
- generation of a reference model to excite the arthropods by means of frequency patterns in order to coerce a defined behavior pattern of the arthropods (for example relax or sleep mode) or influence the function of the sensory receptors
- updating and adaptation of the frequency pattern by means of radio transmission or a frequency pattern calculated itself by the microcontroller built-in internally in the device
- Trichel pulse generation for simulation of corona-discharge discharge pulse simulation generation of Trichel pulse sequences and burst pulse sequences with a microcontroller-based PWM modulator
- generation of frequency patterns for simulation of ionization processes and time progressions thereof
- adaptation of the frequency patterns on the basis of the graphical function of the impedance spectrum with the aid of vector analysis
- universally adaptable generation of frequency patterns and use in a radio-based network
- determination of the parameters for influencing the behavior patterns and the environment-based and physical dependencies
- use of equivalent circuit models (ECMs) for the multi-sensor system of arthropods, in particular transmission line models TLMs
- parameter extraction of the split sensor models
- use of the tortuosity factor to describe and analyze tomographic and topographic image data
- combination from time division multiplexing (TDM), frequency division multiplexing (FDM) and dither signals to excite the segmented and condensed ECM sensor models of the arthropods
- extension of the algorithms for machine learning in order to cover different types of arthropods in different regions
- analysis of the curve families in the impedance spectrum and adaptation of the curves by means of gradients and vectors
- extension of algorithms for deep learning for automatic adaptation of the algorithms for changed environmental conditions and for different types of arthropods
- these result in implementable findings which improve the software algorithms in order to define therefrom so-called reference models and reference modeling
- use of Infinite Voigt models to empirically determine time constants and excitation frequency patterns, in particular in the case of the DRT (distribution relaxation time) analysis The behavioral analysis of arthropods is complex. To operate it effectively, a complete overview of the real environment, measurements and parameters that influence arthropods is required. Based on AI-based algorithms and the described procedure, it is possible to perform cognitive functions that specifically influence the sensor system and nervous system of arthropods without specific continuous program changes.

This results in further insights, as follows:

- understanding the arthropods in their respective environments
- feeling like arthropods do
- more effective and adaptable protection against diseases
- functional algorithms from all areas in all countries FIG. 1 The goal is a predictive analysis or analytics to adapt algorithms in advance of events FIG. 2 The three steps from descriptive analysis, through predictive data, up to deep learning Motivation Motivation of the Project:

The Asian mosquito *Aedes albopictus* is a highly invasive species and potential carrier of several arboviruses (e.g., dengue fever, chikungunya, zika) and parasites (e.g., dirofilaria), which are of enormous importance for global health. [1 Lombardo et al.] Compared to other species, the females of *Ae. albopictus* show a particularly dangerous behavior for humans and animals, namely the general search for hosts as well as a very aggressive biting behavior. Several complex behaviors such as host search, feeding, mating or egg deposition are based on olfactory stimuli, which are based on and stimulated by a number of sensory neurons, which are mainly located on special head appendages such as antennae, maxillary palps and mouth parts.

FIG. 3 Example of an arthropod

The Asian mosquito is an aggressive, daytime biting carrier of several human-pathogenic arboviruses. [1] *Ae. albopictus* has been described as one of the 100 worst invasive species in the world (Global Invasive Species Database, http://www.issg.org/database/). The effects on human health depend indeed on its rapid and aggressive global spread from its native area of distribution (Southeast Asia), as well as on its ecological adaptability through various characteristics, among them in particular nutritional behavior, diapause and vector competence. Biological signals picked up from the environment and perceived by the sense of smell and other chemosensory modalities play a central role in the adaptation of behavioral patterns such as host search, feeding, mating, egg laying and uptake of repellents. Olfactory responses are triggered by the activation of olfactory sensory neurons (OSNs), which are mainly found on antennae, maxillary palps, mouth parts (consisting of proboscis and labellum) and tarsi. These sensory appendages can perceive very different extrinsic stimuli, such as volatile and non-volatile odors or pheromones, temperature, humidity, innocuous or harmful touch and gravity, to activate a complex set of different ways in which mosquitos perceive stimuli. The perception of chemical stimuli, i.e., chemosensory perception, is based on chemosensory neurons that are selectively activated by various volatile compounds, such as scent molecules and pheromones. The molecular components underlying peripheral olfactory signal transmission comprise a number of intracellular and extracellular relationships. The complexity of the olfactory factors together with the different effects and/or diversity directly contributes to the stimulation of the specific behavior of the mosquito species. From a receptor-centered point of view, chemo sensors in arthropods are largely based on different representatives of three gene families, which are mainly expressed in OSNs, which in turn are located in specific sensilla on olfactory appendages: olfactory receptors (ORs), taste receptors (GRs) and ionotropic receptors (IRs). Odorous substances and chemical compounds cross the cuticle through sensillar pores and thus reach the aqueous sensillar lymph.

They are thus recognized and transported to their corresponding specific receptors on OSN-dendritic membranes. This is done by a diverse number of extracellular odorant binding proteins (OBPs) and pheromone binding proteins (PBPs), which are secreted by a network of accessory cells and are located at the base of the arthropod sensilla. There are different types of chemosensory sensilla, which host the OSNs and other sensory neurons as well as the associated accessory cells, which in turn are distributed over the sensory appendages of the arthropod.

FIG. 4 Schematic depiction of a female head with highlighted antennae (FA, marked in red) and palps (FP, upper part of the image) [1 Lombardo et al.], male head (MH), whole female arthropod body (FB, lower part of the image).

FIG. 5 Sample comparisons in pairs. Proportional Venn diagram, which shows pairs of comparisons between antennae and palps of a female and heads of a male. Gene subsets which are highlighted in each sample in comparison to the female body according to the edgeR threshold value with a significance of P<0,001 (see the table), were compared with one another. Overlaps (and relative numbers) represent subsets of genes that are distributed differently in more than one tissue.

Overview of the Antennae of a Female *Ae. Aegypti*

*Aedes aegypti* is a highly anthropophilic arthropod, which is responsible for the transmission of dengue fever and yellow fever throughout the world. Similarly to other arthropods, the biting and host preference behavior of this disease carrier is largely influenced by the sense of smell, which is supposedly improved by G-protein-coupled receptor signal cascades. Reference is made here to the identification and characterization of AaOr7 protein, the first or most important olfactory receptor in *Ae. aegypti*. This receptor shows an extremely high primary amino acid conservation with AgOr7, a further olfactory receptor which has been identified in *Anopheles gambiae* (malaria carrier in the Afrotropic), as well as a number of previously identified olfactory receptors in *Drosophila melanogaster* and other arthropods. This is reflected in mature chemosensory tissues and in a number of life and development phases of *Ae. aegypti*. Within the mature olfactory system, the AaOr7 protein is contained especially in most antenna and maxillary palp sensilla and also in a subset of proboscis sensilla. This coincides with the role of AaOr7 as an olfactory and taste sensor, which supports the hypothesis that AaOr7 and its orthology may be of significant importance for chemosensory processes during the entire life cycle of an arthropod [4].

FIG. 6: Image of an antenna of a female of *Ae. aegypti* [4].
  (A). In the first flagellar segment of the female antennae the AaOr7-specific marking is limited to the distal third (on the right, indicated by the arrow), in which a set of marked neural cell bodies and projecting dendrites can be seen.
  (B, C) AaOr7-specific marking was observed along the entire antenna, an example of a distal segment, presumably 9-11,
  (D, E) is shown. AaOr7 marking is visible in dendrites, the trichoid sensilla are excited (hollow arrows), but the grooved peg sensilla are not (solid arrows). Combination of light microscopy image, AaOr7 (magenta in [4]), neural (green in [4]) and nuclear-specific (blue in [4]) marking (B, D) and corresponding individual image of the AaOr7-specific marking (C, E). Colors marked, see [4].

FIG. 7: AaOr7-specific marking on the female maxillary palp (capitate peg sensilla, A, B) and on the labial palp T2 sensilla (C, D). (A) Combined image, AaOr7 (magenta in [4]), neural (green in [4]) and nuclear (blue in [4]) marking. (B) enlarged view of the box in (A). (C) combined image of an optical portion (2 μm) of the tip of a female labial palp, where the marking, which is evocative of dendritic structures in these sensilla, is very weak, but can be seen reproducibly, AaOr7 (magenta in [4]), neural (green in [4]) and nuclear (blue in [4]) marking. (D) enlarged view of the box in (C). Colors marked, see [4].

Transcript Frequency Distribution in Chemosensory Tissues

The tissue-specific transcript assignment was assessed by comparison in pairs between the samples. Fold Change (FC), logarithmic values and fault detector rates (FDR) were calculated with edgeR in order to perform a statistical validation. In the table, transcripts are selected (referred to hereinafter as genes) that show an increased frequency of chemosensory tissue (female antennae, female palps and male heads) in comparison to the entire female body, and these are compared with one another. A defined statistical FDR threshold value (P<0.001) was used in order to define subsets of highly amplified genes in female antennae (620 Contigs) and female palps (268 Contigs, Table 1 and FIG. 8). Within these criteria, 171 Contigs were enriched in male heads compared to the female body, which indicates a sex-specific frequency profile (FIG. 8).

Gene Expression Distribution with edgeR

TABLE 1

Gene expression distribution with edgeR. Comparisons in pairs (FA vs. FB, FP vs. FB and MH vs. FB) reveal genes that appear in each sample according to different probability thresholds ($P < 0.05$, $P < 0.01$ and $P < 0.001$).

|  |  | $P < 0.05$ | $P < 0.01$ | $P < 0.001$ |
|---|---|---|---|---|
| FA vs FB | FA UP: | 1992 | 1129 | 620 |
|  | FB UP: | 3068 | 1962 | 1207 |
|  | Total: | 5060 | 3091 | 1827 |
| FP vs FB | FP UP | 1752 | 731 | 268 |
|  | FB UP | 3445 | 1755 | 807 |
|  | Total: | 5197 | 2486 | 1075 |
| MH vs FB | MH UP | 2137 | 819 | 171 |
|  | FB UP | 2918 | 1768 | 1091 |
|  | Total: | 5055 | 2587 | 1262 |

FIG. 8 Differentiated analysis of expression (DE) of chemosensory genes. The volcano plots show the relative expression of Contigs in pair comparisons.

The x-axis represents the log FC (Fold Change) between the tissues. The y-axis shows the negative log 10 of the p-value (false discovery rate), as calculated by Fisher's exact test.
  a. Female body vs. antennae.
  b. Female body vs. palps.
  c. Female body vs. Male heads. In the plot only differently expressed Contigs (P<0.05, log FC<−2 and >2) are shown (grey dots in [1]), OBP black, OR red (in [1]), GR green (in [1]) and IR blue (in [1]). Colors marked.

Chemosensory Gene Families fied. With high TPM values the assignment of the proteins and receptors responsible for chemosensory perception can be analyzed.

Odor-binding proteins (OBPs) and the distribution into female antennae (FA), female palps (FP), male head (MH), female body (FB)

FIG. 9 Odor-binding proteins (OBPs) in transcriptomes of *Ae. albopictus*. Left region, frequency profile: intensity scale (color progression from blue to yellow, see [1], shows levels from high to low TPM values), (colors are shown in grey from black, through grey to white) as described below. FA, female antennae; FP, female palps; MH male heads and FB, female body. Allocated OBP names, ID in *Ae. albopictus* (VectorBase ID AALFxxxxxxxx (if provided or Contig ID in the transcriptome), number of cysteines, OBP sub-family, name and ID of the supposed ortholog of *Ae. aegypti* and percentage of the identity can be seen.

Olfactory receptors (OR) and the distribution into female antennae (FA), female palps (FP), male head (MH), female body (FB)

FIG. 10 Olfactory receptors (OR) in the *Ae. albopictus* transcriptome. Left region, frequency profile: intensity scale (color progression from blue to yellow, see [1], shows levels from high to low TPM values), (colors are shown in grey from black, through grey to white) as described below. FA, female antennae; FP, female palps; MH male heads and FB, female body.

Ionotropic receptors (IR) and the distribution into female antennae (FA), female palps (FP), male head (MH), female body (FB)

FIG. 11 Ionotropic receptors (IR) in the *Ae. albopictus* transcriptome. Left region, frequency profile: intensity scale (color progression from blue to yellow, see [1], shows levels from high to low TPM values), (colors are shown in grey from black, through grey to white) as described below. FA, female antennae; FP, female palps; MH male heads and FB, female body.

Ionotropic receptors (IRs) are a large, divergent subfamily of ionotropic glutamate receptors (iGluRs), [2] [Abuin et.al] They play an important role in chemosensory perception, thermosensory perception, and hygrosensory perception. Similarly to the synaptic targeting mechanisms of their iGluR parent families, it is alleged that IRs complexes form from widely expressed

TABLE 2

Chemosensory gene families. The transcriptome column shows the number of genes that belong to each chemosensory family that have been identified in the transcriptome by manual and automated (between parentheses) BLAST analysis. The other columns (antennae, palps and male heads) show the number of chemosensory genes in each enriched subset (see Table x gene expression profiling with edgeR), threshold value for FDR < 0.05).

|  | Transcriptome (33,846) | Antennae (5060) | Palps (5197) | Male Heads (5055) |
|---|---|---|---|---|
| OBP | 77 (68) | 30 | 26 | 15 |
| OR | 82 (59) | 52 | 11 | 3 |
| IR | 60 (43) | 25 | 6 | 6 |
| GR | 30 (28) | 2 | 4 | 0 |
| Tot. | 249 | 109 | 47 | 24 |

With the aid of a scoring model, odor-binding proteins (OBPs), olfactory receptors (OR), and ionotropic receptors (IR) can be analyzed, grouped and the data models simplico-receptors and selectively expressed "tuning" receptors for localization at sensory cilia. Whereas the extracellular ligand-binding domain (LBD) of the receptors defines the sensory specificity, the role of this domain in co-receptors is unclear. A co-receptor-specific sequence in the LBD has been identified that contains an N-glycosylation position. By means of the combination of molecular-genetic and cell-biological analysis, we show that this position is dispensable for the construction of IR complexes in olfactory sensory neurons, but is indispensable for the endoplasmic reticulum release of some, but not all, IR complexes. The data show the key role of the IR-co-receptor LBD during the control of the intracellular transport. They provide new findings regarding the stoichiometry and the structure of IR complexes and cover an unexpected heterogeneity in the regulation of the transport of this sensory receptor family.

FIG. 12 The IR-co-receptor has the task in sub-cellular transport (A) diagram of domain organization of iGluRs, IR-co-receptors and tuning-IRs. [2][Abuin et.al.]

FIG. 13 (C) diagram of a third antenna segment of *Drosophila* which shows the distribution of various olfactory sensilla and other sensory structures. The orange-colored box shows an individual sensilla, which can be seen in greater detail in (D). The pink box shows the approximate field of view shown in E-F and comprises the IR8a neurons in the saccule which express the tuning receptor IR64a[12]. (Sensilla in the saccule—which have a similar overall structure to the surface sensilla as in (D)—are not shown). (D) Schematic representation of the anatomical main features of an olfactory sensory neuron (OSN); the morphology of the cuticular hair and the branches of the cilia vary between the various sensillum classes (Note: Most sensilla contain more than one neuron per hair.) [2][Abuin et.al]

Taste receptors (GR) and the distribution into female antennae (FA), female palps (FP), male head (MH), female body (FB)

FIG. 14: Taste receptors (GR) in the *Ae. albopictus* transcriptome. Left region, frequency profile: intensity scale (color progression from blue to yellow, see [1], shows levels from high to low TPM values), (colors are shown in grey from black, through grey to white) as described below. FA, female antennae; FP, female palps; MH male heads and FB, female body.

Frequency Profiles of Sensory Genes and Distribution Between Female and Male

FIG. 15 Frequency profiles of sensory genes in *Ae. albopictus*. transcriptome. Frequency profile: intensity scale (color progression from blue to yellow, see [1], shows levels from high to low TPM values), (colors are shown in grey from black, through grey to white) as described below. Gene name and Contig ID (VectorBase Codes, if available) can also be seen.

qPCR Validation.

qPCR validation describes the correlation between the transcriptional frequency of 11 genes both in the antennae (a) and in the maxillary palps (b)

FIG. 16 qPCR validation. Correlation between the transcriptional frequency of 11 genes both in the antennae (a) and in the maxillary palps (b), which is shown by qPCR and RNA seq. The degree of frequency is defined as the ratio between each sample value over the group median (fold change, FC) both in qPCR and in RNA seq approaches. For both techniques, a statistical evaluation of the Spearman and Pearson tests was performed and the results are shown in the Figures.

Sensory Abilities of the Arthropods

The sensory abilities of arthropods can also be described by discrete individual sensors. From a physical point of view, a large number of sensors with merged sensor properties is necessary to reproduce the complex sensor structures of arthropods. Preliminary biological investigations have shown that there is a clear allocation of defined sensor properties as well as the frequency profiles of sensory genes and the distribution between male and female. These are the ideal prerequisites for building mathematical models based on probability theory.

The Physical Sensors Include:
- ionization sensor of air or environment
- taste sensors
- chemosensors
- gas sensor/breath sensor
- air quality sensor
- $CO_2$ sensor
- air pressure sensor
- temperature sensor
- humidity sensor
- time-of-flight sensor
- infrared sensor
- UV sensor
- accelerometer
- sound sensor
- position and distance measurement The different types of arthropods have different sensory abilities and a different frequency and distribution of sensory abilities.

DESCRIPTION OF THE METHOD

Introduction

Impedance spectroscopy is a recognized, non-invasive measurement technique, especially for the characterization and analysis of electrochemical and biochemical systems. Currently, impedance spectroscopy is successfully used under laboratory conditions; a broad industrial and commercial application in embedded systems has not yet been achieved. The application of this method in biochemical systems like humans, animals and especially arthropods is challenging. One of the challenges is to find scalable modeling algorithms and deep learning algorithms based on artificial intelligence that are universally applicable but still suitable for autonomous embedded real-time systems with lower memory requirements. This paper describes a method for substitutive modeling of sensor structures of arthropods based on equivalent circuit models with multi-frequency excitation for deep learning behavior patterns of arthropods [7]. The method describes a robust and universally applied methodology for the parametric and non-parametric representation of the nonlinear impedance model and the correlated behavior of arthropods.

For the industrialization of software and hardware it is important that the implementation of the signal generator for the excitation of arthropods can be realized in a microcontroller-based system. The establishment of impedance spectroscopy and its signal generators for excitation in commercial applications with or without online/cloud connection requires algorithms that ideally work according to a set of identical mathematical algorithms and procedures.

Universally applicable models are of enormous importance, especially with the large number of arthropods. A three-dimensional representation is typically used to illustrate the impedance of biochemical systems. A target-oriented algorithm should support any kind of parametric representation, e.g. depending on Z real, Z imaginary, frequency, time, settling time, relaxation time, temperature and humidity. The procedure allows to influence and stimulate arthropods and to adapt the algorithms by a limited number of parameters to extend the use to different classes of arthropods [7].

This method has evolved from a so-called big-data approach, which aims at describing any number of different nonlinear models with only one algorithm.

By the special combination of different approaches from recognized mathematical methods and physical methods, it has been possible to develop a new optimized algorithm with which the specific behavior of arthropods can be influenced and stimulated.

FIG. 50 Simplified process structure for equivalent circuit diagram modeling of arthropods FIG. 50 shows the simplified modeling process. On the basis of empirical investigations, signals in the time domain and in the frequency domain are generated for the excitation of the arthropods. The excitation process uses a combined TDM and FDM method to generate multispectral signals. From this, a simplified equivalent circuit diagram ECM is generated, such as an Infinite Voigt model, which represents a series connection of infinite RC combinations with different time constants. Using the generated frequency pattern and the simplified ECM an impedance spectrum is derived. By means of the DRT analysis characteristic frequencies and time constants of the arthropod are determined. Existing tomographic and topographic data of the arthropod simplify the generation of the impedance spectrum. New frequency patterns with different excitation frequencies are derived from the analysis of the DRT spectrum. These patterns are used for the determination of a new improved impedance spectrum and from this new structured transmission line models are derived under consideration of boundary value conditions. The newly created TLMs can then be used for a subsequent iteration or approximation process.

Fundamental Functional Principle of the System

The fundamental physical, biological and biochemical functional principle is based on knowledge and investigations that are already described in patents [8], [9], [10], [11]. Here, a frequency pattern is generated which is modulated onto a carrier signal and is then radiated by means of an antenna. The arthropod receives the different signals, which are tuned to the different sensory appendages, such as antennae, palps, head and body and other sensory appendages. The signals disrupt or influence the sensory function of the appendages and thus also the behavior of the arthropods.

FIG. 17 Simplified function of the system

Parameters for Influencing the Behavior Pattern

Due to the multiple sensory properties and their physical and biochemical function, different frequency patterns are necessary in order to stimulate, as far as possible, all sensory properties of the arthropods. These frequency patterns can be transmitted either at the same time, simultaneously, or sequentially, one after the other. The topology and the physical structure of the arthropod are key here for which sensory appendages are to be stimulated. Different frequency patterns are also necessary for the stimulation of the different types of arthropods.

FIG. 18 shows the simplified principle for different types of arthropods and different stimulation of the sensory appendages. Here, any number n of carrier frequencies with any number of modulation frequencies are generated. This results in arbitrary possibilities for generating different stimulation signals for the frequency patterns.

FIG. 19: Different subcarrier modulators are used to stimulate the various arthropods.

For generation, a combination of a frequency division multiplexing signal FIG. 20 with a time division multiplexing signal FIG. 21 is used. Each frequency portion and time portion has different parameters FIG. 23 and can additionally be superimposed or modulated with a defined dither signal FIG. 24, FIG. 25, and FIG. 26.

In the case of the analysis in the frequency domain, frequency components that show stimulation frequencies in order to stimulate different types of arthropods and different sensory appendages are therefore present.

FIG. 22: Simplified depiction of the frequency spectrum of the combined baseband modulation signal for different arthropods FIG. 23: Simplified depiction of the frequency-variable and time-variable frame and structure of the combined multi-frequency pattern generator based on FDM and TDM Different principles can be used to generate the dither signal. FIG. 24, FIG. 25, and FIG. 26 show known principles for dither signal modulation:

FIG. 24: Impressed dither signal on a PWM pulse of defined signal amplitude

FIG. 25: Phase-modulated dither signal on a PWM pulse with defined frequency FIG. 26: Extension of the signal with PWM-modulated dither signal [12]

These methods are known to a person skilled in the art.

Key Parameters for Generating the Frequency Pattern and the Pulse Generator:

HF carrier frequency sub-GHz, MHz, GHz range modulation frequencies sub-Hz, Hz range—relaxation behavior low frequencies of 1 Hz to several hundred kHz to approximately 1 MHz frequency pattern range type of modulation PWM, FM, AM, PFM, TDM, FDM generation of variable pulse sequences variable relaxation time constants (DRT analysis process)

variable pulse rise time variable relaxation time variable working cycle modulated dither signal in the TDM and in the FDM signal or in the combination of TDM, FDM and dither signal time and frequency patterns based on Dirichlet's prime number theorem on arithmetic progressions no time and frequency sequences have any harmonic or subharmonic correlations, i.e., harmonic components and subharmonic components in the frequency spectrum differ in all sequences that are transmitted simultaneously at the same time all time and frequency sequences are prime number-based or have no integer harmonic and subharmonic multiples or factors; this is also true for carrier frequency and modulation frequencies any other frequency patterns can also be used for application of multiple kinds of arthropods pulse sequences form defined relaxation time imaging sequence (r-region)

modulation of dither signal sequences and superimposition of dither signals in the pulse pattern simulation of Trichel pulse sequences with the aid of pulse square signals generation of stochastic burst pulse sequences Trichel pulse generation for simulation of corona-discharge discharge pulse simulation generation of Trichel pulse sequences and burst pulse sequences with a microcontroller-based PWM modulator Equivalent Circuit Models (ECM) for the Multisensor System and Sensory Appendages of Arthropods System simulation and system identification are common problems in science and engineering. In the field of electrochemistry and biochemistry, this is of particular interest for systems, such as porous electrodes, and mechanisms, such as diffusion. These are relevant for engineering applications as well as for explaining biochemical systems. Models describing the electrical behavior of such systems are based not only on schematic, physical, chemical, and biological approaches, but also on equivalent circuits. Sometimes simplified models of the conductors and the spatial distribution of the parameters are used here. The Nyquist plot is a well-known representation of the impedance behavior at different excitation frequencies of a system.

Due to the availability of many different equivalent circuit models, the selection of an appropriate model for a particular application, in our case arthropods, is very difficult. Therefore, identifying model similarities enables a better understanding of the individual mechanisms, reduces the number of mathematical calculations, simplifies model evaluation, and thus reduces complexity.

To explain the sensory model of an arthropod, the sensory behavior and sensory response must be described. To simplify the biochemical model of arthropods, a more general view of impedance in terms of a generalized transmission line model is used. Transmission line models are suitable as universally applicable models to describe different physical and biochemical processes and to simplify them mathematically via normalized representations.

In this method, different boundary conditions are applied to obtain the solution for different electrochemical and biochemical systems. The equivalent circuit model (ECM) is divided into 6 sub-models here to describe the physical and biochemical effects and finally obtain a condensed ECM. However, any number of sub-models can be used, as the method is extensible. The use of transmission-line boundary conditions for various physical and electrochemical effects is an established procedure. In our case, we have described models for the sensory appendages of arthropods with their specific biochemical effects. This is the primary part of the disclosure.

For simplicity, we defined 6 sub-models here in this example. The sensory properties of arthropods can be supplemented by further models or to reduce the number of ECM models only single sensory properties can be modeled.

In this example we distinguish between the following six models:
1. The model of the brush electrode, which is a model of the arthropod's antennae.
2. The model of the porous electrode, which is a model of the porous sensilla hairs.
3. The model of general diffusion, which is a model of ion diffusion.
4. The model of diffusion of the non-permeable wall (NPW).
5. The model of diffusion of the ideal reservoir.
6. The calculation model of the tortuosity factor from tomographic data of arthropod surface.

The assignment of sensory properties to the individual models has the advantage of analyzing, reducing or even eliminating the ambiguity of impedance model equations. Eliminating ambiguity simplifies the analysis of model parameters that affect impedance behavior, in addition to improving the robustness of nonlinear parameter optimization techniques. The correlations and investigation results with the help of stochastics described earlier in the introduction allow a direct and indirect assignment of the models.

The computational model of the tortuosity factor from tomographic data of arthropod surface quantifies the apparent decrease in diffusive transport resulting from windings in the flow paths through porous media, edge densities, and image-based microstructure data. There are well-established mathematical tools [5] for efficiently calculating the tortuosity factor as well as volume fractions, surface areas, and three-dimensional structure. These mathematical tools were originally developed to improve the understanding of electrode microstructures in electrochemistry; however, the tortuosity factor has been of interest to a variety of fields, including earth sciences, optics, and biology, for over a century. It is still common to use correlations to approximate the tortuosity factor, but in recent years the increasing availability of 3D imaging techniques has sparked interest in calculating the quantity more directly. This allows for fast and accurate, applied to the large datasets typical of modern tomography, without requiring high computational power.

ECMs (equivalent circuit models) rather than physical and chemical approaches provide very similar results, although the starting point is somewhat different. For the consideration of charge carriers, physical, chemical and biochemical approaches are preferred. In contrast, ECMs are more suitable for studying the behavior of the electrical system. Due to the similarities, mixed approaches are also possible [6]. ECMs can simplify the process of model identification. By proper selection of elements and parameters of a transmission line model, it is possible to identify the different behavior of a system and also the fractal structure of an electrochemical system. The application of equivalent circuits is not limited to linear systems. The elements of the two-channel transmission line in FIG. 27 can exhibit nonlinear voltage and current dependence. The parameters may also be position dependent. In this case, numerical methods are often needed to calculate the impedance.

The discussed approach [6] for solving the differential equations of a general transmission line model allows the simulation of the impedance of many different systems with the same methodology. The use of different boundary conditions allows the simulation of different systems with the same model. Changing the values of the impedances allows the simulation of one system under different conditions and also the simulation of different systems. With suitable parameters, the correlations with models from electrochemical approaches are represented. The method allows to identify the correlation between different models, e.g., the degree of similarity between diffusion and porous electrode models.

An important aspect of model development is the influence of model parameters on the behavior of a model. This is necessary for the full understanding of the modeled system and also for the determination of parameters from measurements. In this case, the identification of ambiguities is essential to reduce the number of parameters and to determine parameter sets that lead to the same behavior. Fewer parameters always allow a better understanding of a model. Furthermore, it is not possible to distinguish ambiguous parameter sets from impedance measurements. To distinguish ambiguous parameter sets, additional information is always needed. This information must be obtained with other measurement methods. For example, in a diffusion process, the diffusion coefficient and the concentration can only be determined from impedance measurements if the geometry and reaction conditions are precisely known. In the case of porous electrodes this is very similar: Only 4 of 7 parameters can be obtained from impedance measurements. The identification of ambiguities can be achieved by determining the quotient, product, difference and sum of different parameters, which can be replaced by a smaller number of other parameters. In general, this leads to a reduction in the number of parameters. The remaining parameters can be classified as scaling and structural parameters. Scaling parameters scale only the axes, e.g. the frequency or the impedance axis. For example, the diffusion models shown have only scaling parameters. Structural parameters affect the structure of the model behavior, e.g., the shape of the 45° slope in the porous electrode model. This treatment of models allows us to analyze which parameters can be determined from impedance measurements. Moreover, it allows us to fully understand the influence of parameters on impedance behavior. The major advantage is the use of a single modeling method to study many different mechanisms.

By incorporating equivalent-circuit models into the complex plane or by analyzing the distribution of relaxation times (DRT) [7], it is possible to study, describe, and decouple the relative contributions to impedance of the various physical, electrochemical, and biochemical processes in an arthropod. This is a method to show the so-called points of interest in the impedance spectrum in a dynamic range and to clearly distinguish the different impedance behavior of arthropods.

General Transmission Line Models (TLMs)

General transmission can be described with the above-shown equivalent circuit [6]. Further, even more complex systems can be modeled with a cascading or series connection of a plurality of these general equivalent circuits.

FIG. 27 General transmission line model

The differential equation referring to the equivalent circuit and Kirchhoff's law for current and voltage is solved as follows:

$$I_1(x) = I_1(x+\Delta x) + U_t(x) \underline{Y}_t' \Delta x$$

$$I_2(x+\Delta x) = I_2(x) + U_t(x) \underline{Y}_t' \Delta x$$

$$0 = U_t(x) + I_2(x)\underline{Z}_2'\Delta x - U_t(x+\Delta x) - I_1(x)\underline{Z}_1'\Delta x \quad \text{equations (1), (2), (3)}$$

With usual differential equations, the following values of the system are determined:

$$I_1(x) = C_1 \frac{Z_2'}{Z_1'} + \frac{C_2 e^{-x\gamma} - C_3 e^{x\gamma}}{Z_t' \gamma} \quad \text{equations (4), (5), (6)}$$

$$I_2(x) = C_1 - \frac{(C_2 e^{-x\gamma} - C_3 e^{x\gamma})\gamma}{Z_1' + Z_2'}$$

$$U_t(x) = C_2 e^{-x\gamma} + C_3 e^{x\gamma}$$

wherein the complex propagation constant is defined as follows:

$$\gamma = \sqrt{\frac{Z_1' + Z_2'}{Z_t'}} \quad \text{equation (7)}$$

TABLE 3

Description of the symbols, physical units and meaning thereof

| Symbol | Unit | Meaning |
|---|---|---|
| $\underline{Z}_1'$, $\underline{Z}_2'$ | [Ω/m] | Complex longitudinal impedance (corresponding admittance: $\underline{Y}_{1/2}' = 1/\underline{Z}_{1/2}'$) |
| $\underline{Z}_t'$, $\underline{Z}_2'$ | [Ω m] | Complex transverse impedance (corresponding admittance: $\underline{Y}_t' = 1/\underline{Z}_t'$) |
| $\underline{Z}_{t_{el}}$ | [Ω] | Resistance at the end of transmission line |
| $l_{el}$ | [m] | Length of electrode or thickness of material |
| $U_t$ | [V] | Voltage between media 1 and media 2 across the transverse impedance |
| $I_1$, $I_2$ | [A] | Currents in longitudinal direction through media 1 and media 2 |
| $I_0$ | [A] | Current applied to the porous material |
| $\gamma$ | [1/m] | Complex propagation constant |
| $C_1$ | [A] | Integration constant |
| $C_2$, $C_3$ | [V] | Integration constants |

According to the generally valid solutions of equations (1) to (7), any desired physical effects can be described with TLMs. Here, the boundary conditions must be taken into consideration. The following table describes the boundary conditions and the physical effects. The unknown integration constants $C_1$, $C_2$ and $C_3$ can be determined with use of these boundary conditions.

TABLE 4

Boundary conditions for simplifying the differential equations

| x = 0 | | | x = $l_{el}$ | | | |
|---|---|---|---|---|---|---|
| $I_1$ | $I_2$ | $U_t$ | $I_1$ | $I_2$ | $U_t$ | Physical effect |
| $I_0$ | 0 | | $0^a$ | | | Porous electrode, e.g. [2,25] |
| $I_0$ | 0 | | | | $0^a$ | Porous material e.g. [13] |
| $I_0$ | $-I_0$ | | $U_t(l_{el})_t/Z_{l\,el}$ | | | Ion diffusion, electron conduction in cables |
| $I_0$ | $-I_0$ | 0 | | | $0^a$ | Diffusion, non-permeable wall (NPW) |
| $I_0$ | $-I_0$ | $-I_2^a$ | | | $-I_1^a$ | Diffusion, ideal reservoir (IR) |

$^a$This must be the result after calculating the integration constants

A delimitation of the physical and biochemical effects under consideration of the boundary conditions is thus possible. The division into 4 TLM models, more specifically for the porous electrode, for porous material, for general diffusion and diffusion into non-permeable walls and the ideal reservoir thus results.

FIG. 27a-27d Delimitation of the TLM models for different physical effects

FIG. 28 Description of the processes in porous electrode model according to source [13]

Porous Electrode and Impedance Calculation of the Transmission Line Model [6]

FIG. 27a Transmission line model of a porous electrode

FIG. 30 a) to d) impedance of the porosity model according to equation 4 with the integration constant $c_2=1$ for the porous electrode.

$$Z_{1,2'} = \frac{l_{el}}{(1/Z_2') + (1/Z_1')}\left(1 + \frac{2 + ((Z_1'/Z_2') + (Z_2'/Z_1'))\cosh(l_{el}\gamma)}{l_{el}\gamma\sinh(l_{el}\gamma)}\right) \quad \text{Equation (8)}$$

calculation and impedance calculation of the transmission line model

Porous Material and Impedance Calculation of the Transmission Line Model

FIG. 27b Transmission line model of porous material

Under consideration of the boundary conditions, the impedance for porous material can be calculated as follows:

$$Z_{1,2'} = \frac{l_{el}}{(1/Z_2') + (1/Z_1')}\left(1 + \frac{2 + ((Z_1'/Z_2') + (Z_2'/Z_1'))\cosh(l_{el}\gamma)}{l_{el}\gamma\sinh(l_{el}\gamma)}\right) \quad \text{equation (9)}$$

calculation of the impedance of porous material

General Diffusion and Impedance Calculation of the Transmission Line Model

To determine the impedance for the diffusion, a similar approach is used as for the porous electrode under consideration and application of the boundary conditions FIG. 27c Transmission Line Model of Ion Diffusion Here, equation (10) for the impedance applies:

$$Z_{1,2} = \frac{Z_1'Z_{l_{el}} + Z_2'Z_{l_{el}} + Z_1'Z_t'\tanh(l_{el}\gamma)\gamma + Z_2'Z_t'\tanh(l_{el}\gamma)\gamma}{Z_1' + Z_2' + Z_{l_{el}}\tanh(l_{el}\gamma)\gamma} \quad \text{equation (10)}$$

Under boundary conditions $\underline{Z_2}=0$, the known equation for electrical transmission lines and general diffusion is obtained.

calculation of the impedance for general diffusion $$Z_{1,2} = \frac{Z_1'Z_{l_{el}} + Z_1'Z_t'\tanh(l_{el}\gamma)\gamma}{Z_1' + Z_{l_{el}}\tanh(l_{el}\gamma)\gamma} \quad \text{equation (11)}$$

Diffusion of the Non-Permeable Wall and the Ideal Reservoir and Impedance Calculation of the Transmission Line Model FIG. 27d Transmission line model for a non-permeable wall and the diffusion in an ideal reservoir FIG. 34 Impedance of the diffusion model according to equations 12 and 13

Impedance behavior (Nyquist plot)

from Fig 35 for open and short-circuited outputs $$z_{1,2,SHORT} = \frac{Z_{1,2,SHORT}}{Z_{N,diff}} = \frac{\tanh(\sqrt{j\Omega})}{\sqrt{j\Omega}} \quad \text{equation (12) and (13)}$$

$$z_{1,2,OPEN} = \frac{Z_{1,2,OPEN}}{Z_{N,diff}} = \frac{1}{\sqrt{j\Omega}\tanh(\sqrt{j\Omega})}$$

Equation (14) applies here:

$$Z_{N,diff} = R'_1 l_{el} \quad \text{equation (14)}$$

Pore Geometry

The impedance behavior of different pore geometries and pore structures (open and also closed pore geometry) can be clearly represented in the impedance spectrum (Nyquist plot). The impedance behavior shows the simulations for specific tomographic and topographic pore structures to different extents. These findings can be used directly for TLM modeling of the arthropods and their excitation signals.

For each simulation, characteristic frequencies were selected in a frequency range of $$[\omega_c \times 2^4, \omega_o \times 2^{11}]. \quad \text{equation (15)}$$

$$\omega_c = \frac{D}{L^2}$$

wherein for open systems L is the length of the controlled volume (CV) in the direction to the stimulated surface, and for closed systems L is equal to the maximum penetration distance of the simulated surface to the tip of the longest pore path. For each frequency, the impedance Z was calculated as ratio between amplitude of the concentration stimulus (1 in all cases) and the complex diffusion flux at the inner boundary layers and the normalized impedance ~Z for the simple comparison according to equation (16)

$$\tilde{Z} = Z\frac{AD}{L} \quad \text{equation (16)}$$

for open systems A is the complete area of CV boundary layers in the flow direction, and for closed systems A is the "mean area achievable", which is defined as the algebraic mean that can be achieved for the diffusion in the depth of the pore network. With use of this formal correlation, this means that at points of intersection of lower frequencies in open systems it is equal to τ/ε, which is particularly helpful in the characterization and comparison of different structures.

Simulation of a Single Closed Pore Geometry

FIG. 35 Simulated impedance spectra for 2D (left) and 3D (right) for 5 single closed pore structures, studied by Keiser et al. [14], [16]. The inner smaller drawings show the spectrum normalized for the main axes with use of equation (16). Here, it can be seen that all spectra converge to a value as in the case of straight pore (1), and thus the 5 structures of the pores are clearly distinguished.

Single Open Pore Geometry

FIG. 36 Simulated impedance spectrum of 7 single open pore geometries, wherein all have the same pore volume and tortuosity factor and a uniform direction of the stimulus signal [14]

FIG. 37 left: simulated impedance spectrum of 2D fractals, wherein fractal order increases with a Sierpinski carpet with open boundary layers, and in the small image the normalized representation FIG. 38 right: simulated impedance spectrum of two 2D fractals, wherein the fractal order increases. Here, a Pythagoras tree is shown for closed structures.

FIG. 39 Impedance behavior of a set with different structures of the pores. l is the length of the pores and λ is the form factor [15]

From the analysis and the simulations of the impedance spectrum and in particular the normalized impedance spectrum, it can be seen that different pore geometries and pore structures represent typical behavior patterns in the graphical and mathematical analysis. The analysis and frequency adaptation to different pore structures are therefore easily implemented by a person skilled in the art. With the aid of the vector analysis, parameter-dependent position vectors can be determined, which for example describe the different continuous functions.

FIG. 40 Damping behavior of a sinusoidal signal into a pore due to the de Levie signal penetration effect. [15]. The 5 different values show the signals at different distances into the pore. This typical damping behavior must be taken into consideration in the signal synthesis of the frequency pattern in arthropods.

Impedance Spectrum of Brush Electrodes as Base Model for Arthropod Antennae

De Levie shows the representation of the impedance behavior, which represents as a constant phase element (CPE). The adaptation to different impedance spectra is performed here by parallel shifting of the curves on the x-axis (real component) of the impedance. This abstraction and simplification is very helpful for the modelling of the arthropod antennae.

FIG. 41 Typical impedance behavior of a de Levie brush electrode in the complex domain as a function of the frequency for three different electrolyte concentrations.

FIG. 42 Characteristic of the impedance behavior in the complex domain for a porous electrode with series resistance RS (of 0->∞) and cumulatively distributed resistance, Ω.

By using normalized values and the typical behavior of the different transmission line models, machine learning (deep learning) algorithms can be applied by mathematical methods and in particular the use of stochastic variables.

The assignment of the sensory properties to the individual models has the advantage of analyzing, reducing or even eliminating ambiguities of impedance model equations. The elimination of ambiguities simplifies the analysis of model parameters which influence the impedance behavior, and additionally improves the robustness of nonlinear parameter optimization techniques. The correlations and investigation results with the aid of stochastics described previously in the introduction allow a direct and indirect assignment of the models.

In the Nyquist plot behavior patterns and adaptation of the frequency patterns can thus already be deduced in the two-dimensional representation. With the aid of vector geometry and curve discussions, an analysis of mathematical functions is possible. Under consideration of the modelling with constant phase elements CPE with 45° phase angle (modelling of arthropod antennae), a further simplification of the analysis of the impedance spectrum is possible. Parameter-dependent position vectors can additionally be determined with the aid of the vector analysis and, for example, describe the different continuous functions.

Substitution processes with a so-called library method are a tested approach for implementation in a microcontroller-based application, without use of differential equations. This is to be used particularly in analytical methods in two-dimensional or three-dimensional space. With use of the DRT method (distribution relaxation time constant), the program size in the microcontroller can be extremely reduced [7].

Transformation and Analysis of the Impedance Spectrum with the DRT Method

The analysis of the DRT spectrum has developed into an established method. In the DRT analysis, extreme points can be very well represented in dependencies on time constants τ=R×C. In the DRT method the impedance data are transformed into a function depending on a distribution of time constants τ. This method also allows a simplification in the fitting process of impedance models and thus also a simplification of the adaptation and signal synthesis of frequency patterns.

The advantage of the DRT method is a simpler interpretation of the behavior pattern, without exact knowledge of an equivalent circuit. Here, the use of the DRT method in conjunction with an Infinite Voigt modeling is a tested method from empirically determined data in tests with arthropods for creating simplified equivalent circuit models. In the deep learning process, quicker adaptations and interpretations are thus possible. The DRT spectrum shows significant maxima, minima and turning points in the function curve. By monitoring only these extreme points of the function curve, only a very limited number of frequency-dependent measurement points can describe the impedance properties of the arthropods.

FIG. 29 shows a simplified DRT spectrum with different relaxation times. The function can be described in a very memory space-saving manner with suitable substitution methods by means of a so-called library method [7], so that the use of differential equations is not absolutely necessary. The mathematical relationships are to be understood here e.g. at null points in the imaginary part of the spectrum.

For use of the DRT method, the Infinite Voigt circuit is typically used in the equivalent circuit (FIG. 43); the impedance thereof is as described below, equation (17):

$$Z(\omega) = \int_0^\infty \frac{G(\tau)}{1+i\omega\tau}d\tau \quad \text{equation (17)}$$

FIG. 43 Equivalent circuit of the Infinite Voigt circuit with G(τ) as the distribution function of the settling times τ, which characterizes the particular system. The physical unit G is specified in $\Omega s^{-1}$ For an R/Q, the following correlation applies as per equation (18):

$$G_{R/Q}(\tau) = \frac{e}{2\pi}\frac{\sin((1-\alpha)\pi)}{\cosh(\alpha\ln(\tau/\tau_{R/Q}))-\cos((1-\alpha)\pi))} \quad \text{equation (18)}$$

With $\tau_{R/Q} = (RQ)^{1/\alpha}$ equation (19)

Infinite Voigt Circuit

For a given set of parameters R, Q and α it is possible to determine G(τ). The abscissa of the peak shows the time constant $\tau_{R/Q}$ of the circuit and the G value in the peak is described as follows, equation (20)

$$\frac{dG}{d\tau} = 0 \Rightarrow G_p = \frac{R}{2\pi}\tan\left(\frac{\alpha\pi}{2}\right) \quad \text{equation (20)}$$

FIG. 44 shows the theoretical DTR of an R/Q circuit according to equation (20)

An extended representation and analysis of the impedance spectrum is, besides the Nyquist plot, also the following representation: Value of the imaginary component as a function of the frequency f, the phase angle as a function of the frequency f, the DRT analysis as 3D representation depending on a third arbitrary parameter or the determination of the tau factor to describe the diffusion process.

FIG. 45 Simulated impedance spectrum of a synthetic bundle of particles with porosity. The solid line shows an open structure and dashed line a closed structure. By way of comparison, the DRT spectrum for the open structure is shown in the small graph.

Determination of the Diffusion Transport from Topographic and Tomographic Sensory Data of the Arthropod The so-called tau factor determination is a very efficient method for determining the reduced diffuse transport in windings and twisted and tortuous heterogenous geometries and structures on the basis of microstructural data. As described in the introduction, sufficient image information of arthropods are provided from studies and can be described with the tau factor. This effect will be described as follows with the following term, the so-called tortuosity factor Tor entanglement factor, equation (21)

$$D^{eff} = D\frac{\varepsilon}{\tau} \quad \text{equation (21)}$$

here, $\varepsilon$ is the volume component of the conductive phase D and $D_{eff}$ is the effective diffusion behavior through a porous volume. Here, a limit value consideration is performed, in which the value $\tau=1$ or $\tau>=1$. [14], [5]. FIGS. 6 and 7 show tomographic and topographic data.

Effect of the Pore Structure on the Diffusion Impedance

FIG. 46 Simulated phase angle as function of the logarithmic frequency for 3 single microstructures with different surface conditions on the inner and outer side By way of different representation methods (FIG. 46), different specific properties of microstructures can be represented transparently. Indirect conclusions as to the structural design of the layer model can be drawn from the curve progression, which then leads in the modeling of arthropods to a reduction of parameters and variables. Parameter-dependent position vectors can be determined with the aid of the vector analysis and, for example, describe the different continuous functions.

Mathematical Analysis by Means of Probability Calculation and Statistical Methods for Data Analysis Mathematical methods of probability calculation and statistics are typically used for data processing and data analysis in order to reduce the amount of data, with the objective of implementing software algorithms in microcontrollers.

These methods are known to a person skilled in the art, wherein defined methods are used for data reduction and modeling of impedance characteristic curves. These include the use of the probability density function, the use of recursive filters, Bayesian filters, and in particular particle filters, which are suitable for sequential Monte Carlo methods for online or machine learning. Particle filters are suitable for parameter-free modeling, prediction as a forecast of a proposed base function, for correction and weighting between target function and proposed function, and have the advantage of improving the result the more samples (sample values) are processed. A better and quicker model fitting and a better approximation between measured values and proposed values is thus achieved. The main steps in the use of the particle filter are the sampling of the individual measured values (particles) using a proposed distribution, the weighting of the importance, and the re-sampling, i.e., the replacement of the samples which do not fit in the distribution. The more samples there are, the better is the estimation. Equation (22) describes the mathematical correlation.

equation (22)

$$Bel(x_t) = \eta\, p(z_t | x_t) \int p(x_t | x_{t-1}, u_{t-1})\, Bel(x_{t-1})\, dx_{t-1}$$

draw $x_{t-1}^i$ from $Bel(x_{t-1})$ draw $x_t^i$ from $p(x_t | x_{t-1}^i, u_{t-1})$ importance factor for $x_t^i$:

$$w_t^i = \frac{\text{target distribution}}{\text{proposal distribution}}$$

$$w_t^i = \frac{\eta\, p(z_t | x_t)\, p(x_t | x_{t-1}, u_{t-1})\, Bel(x_{t-1})}{p(x_t | x_{t-1}, u_{t-1})\, Bel(x_{t-1})}$$

$$\propto p(z_t | x_t)$$

Basic Function of the Deep Learning Process

Process Sequence and Method Structure for the Arthropod Reference Modeling

FIG. 47 Basic function of the deep learning process for training different reference models of the arthropods In the arthropod reference modeling, the desired transmission behavior of the closed control circuit is specified with the aid of a reference model. The first reference model can be based, for example, on empirical studies. FIG. 47 shows the general block diagram of the control system for training different reference models. The system consists of an inner, closed feedback control circuit and the outer circuit responsible for the adaptation. The adaptation of the control parameters is performed for example on the basis of a quality criterion with use of a gradient method or on the basis of other known mathematical methods.

Process Sequence for the Arthropod Reference Modeling

Four main process steps will be described hereinafter for reference modeling of arthropods. Provided it is not necessary for the modeling of specific arthropods, individual process steps can also be missed out or used only in part. To solve differential equations, there are different methods known to a person skilled in the art, which are not described here. The methods known to a person skilled in the art of using neural networks, stochastics and probability theory are also not described because they are sufficiently known.

Process Sequence Step 1 for Arthropod Reference Modeling According to FIG. 48a Localization of the Receptors In the first step of the reference modeling, the sensory organs and in particular the sensory surfaces and spaces of the arthropods are determined. Using the example of a mosquito (FIG. 5), these are, in females, the antennae, the palps and the body, and in the male the head. Other types of arthropods have other or further sensory surfaces and spaces or body parts, such as the wings, maxilla, tarsi or the legs. Sensory receptors that have different biochemical and physical properties are located on these body parts.

Division/Clustering of the Sensory Properties

The sensory properties include the receptors shown in FIG. 15 for sensing mechanical changes, taste, odor, scents, sound, chemical sensing, temperature and pheromones. They also include, for example, sensory properties for ionization and thus also for electrical conductivity of gaseous, liquid and solid substances, as well as the detection of partial discharges based on ionization processes. FIG. 8 shows a differentiated analysis of the expression of chemosensory genes which have been determined with the aid of statistical methods.

Use of Neural Functions

With the aid of scoring models and neural functions, these can be used to determine parameters. In particular when using the Monte Carlo method, empirically determined results and biochemical data are helpful in the approximation process for determining unknown parameters. OLAP models and ALEX Net models, which are mathematical models known to a person skilled in the art, are also suitable for the structuring of the many receptors and biochemical properties.

Transformation into Electrochemical Models

With the biochemical results, the sensors and receptors are now broken down into their biochemical, topographic and tomographic properties, and then transformed from biochemical processes into equivalent circuit models (ECMs). Here, the topological, tomographic and biochemical processes within the arthropods are each assigned an ECM. These include, for example, porous electrodes, porous material, material parameters of porous material, description of electrode behavior, brush electrodes, diffusion of substances and processes, ionization in substances and processes, or further electrochemical processes.

Use of Transmission Line Models

In the next step, generally valid ECMs are used. The transmission line models (TLMs) are suitable for modeling many biochemical and electrochemical processes and are also used for the abstraction of processes and procedures. The number of different TLMs is dependent on the necessary model fit. TLMs can also cascade (connection in series) in order to replicate models more accurately.

Solution of Differential Equations with Limit Value Consideration

For calculation of the impedance models, a division into clusters is performed for the various TLMs, as described in FIG. 28. There is also a limit value consideration in order to reduce the complexity and the parameters of the mathematical correlations. The TLMs are described with the aid of differential equations and the analysis is performed in the image domain, time domain or frequency domain with use of the Fourier transform and Laplace transform and back-transformation thereof.

Process Sequence Step 2 for the Arthropod Reference Modeling According to FIG. 48b Verification of the Used Models and Possible Adaptation In the next step, the used models are verified and adapted as necessary. This means that a different TLM base model from the four models in FIG. 28 is used for the modelling. This is because, particularly in biochemical systems, a consideration of open or closed structures (for example open pores or closed pores) is important in order to replicate impedance models based on tomographic and/or topographic data; see FIG. 37.

Identification of the Ambiguity of the Impedance Models

The frequency spectrum for exciting receptors of arthropods is very large. A multi-frequency excitation may thus lead to an ambiguity of the results. Different biochemical processes must be monitored and analyzed in different frequency ranges. If an unambiguous assignment is not possible, certain parameters can be simplified by the use of topographic and/or tomographic data and/or can be determined directly.

Normalization of the Impedance Parameters

With the aid of normalized impedance parameters, generally valid models can be defined for each type of arthropod. Together with a limit value consideration towards 0 and/or towards ∞, the parameter adaptation in the software is simplified, since the adaptations are only relative to a previously determined value.

Substitution Method for Avoiding Differential Equations

To avoid differential equations in microcontroller-based systems and to reduce the required memory space, a substitution method is used in combination with a function library [7], in order to very efficiently model arbitrary nonlinear functions, for example in order to store nonlinear function progressions in look-up tables in the microcontroller.

Process Sequence Step 3 for the Arthropod Reference Modeling According to FIG. 48c (Topographic and Tomographic Modeling)

Topographic and Tomographic Analysis

As can be deduced from FIGS. 6, 7, 13, a topographic and tomographic analysis of arthropods is a tested means for understanding the correlations as a whole. FIGS. 16, 37, 38, 39, 40, 45 and 46 describe simulation results and assignments of structures in the impedance spectrum. The assignment of the model structures is performed as described in main step 1 and 2 by means of the localization of the receptors and biochemical properties. Simulated pore geometries can be assigned on the basis of the topographic and tomographic data and also the limit value consideration and are processed in simplified 2-dimensional or 3-dimensional representations and mathematical models.

Determination of the Tau Factor

Here, the calculation of the tortuosity factor τ (tau factor) is a means, known in the field of science, for describing microstructural image data. The tau factor determination is a very efficient method for determining the reduced diffuse transport in windings and twisted and tortuous heterogenous geometries and structures on the basis of microstructural data.

Calculation of the Penetration Depth of the Excitation Signal

The penetration depth of the excitation signal can be described with the aid of the tau factor [5]. The specific anatomy of the arthropods can be taken into consideration. The results from the tau factor can then be used to reduce the parameters in the system description of the arthropods.

Process Sequence Step 4 for the Arthropod Reference Modeling According to FIG. 48d Determination of the Control Parameters by Means of an Adaptive Control System FIG. 44 describes the principle of the deep learning process on the basis of an adaptive control system. This is used in particular to train further reference models of other types of arthropods.

Adaptation of the Reference Models and Parameters Thereof

The adaptation of the model parameters is performed on the basis of the previous results or by means of the monitoring of the arthropods and their behavior patterns Monitoring of the Behavior Pattern of the Arthropods The activity behavior of the arthropods is influenced with the excitation, and this is ultimately detected by means of human monitoring or by means of a camera-based monitoring or other suitable optical sensors, for example infrared or FIR time-of-flight sensors.

Storing of the Model in the Function Library

Together with the monitoring result, the model is stored together with the corresponding frequency pattern in the memory and is thus learned by the data processing system.

REFERENCES

[1] Deciphering the olfactory repertoire of the tiger mosquito *Aedes albopictus*; Fabrizio Lombardo1*, Marco Salvemini2, Carmine Fiorillo1, Tony Nolan3, Laurence J. Zwiebel4, José M. Ribeiro5 and Bruno Arca1, 2017

[2] In vivo assembly and trafficking of olfactory Ionotropic Receptors; Liliane Abuin1, Lucia L. Prieto-Godino1,+, Haiyun Pan2,+, Craig Gutierrez2, Lan Huang2, Rongsheng Jin2 and Richard Benton1,* 1Center for Integrative Genomics; Genopode Building; Faculty of Biology and Medicine; University of Lausanne, CH-1015 Lausanne, Switzerland; 2Department of Physiology and Biophysics University of California, Irvine Calif. 92697; USA; October 2018

[3] Chemosensory Transduction in Arthropods; Monika Stengl; The Oxford Handbook of Invertebrate Neurobiology, Edited by John H. Byrne; Subject: Neuroscience, Invertebrate Neurobiology, Molecular and Cellular Systems Online Publication Date: February 2017; DOI: 10.1093/oxfordhb/9780190456757.013.15

[4] Identification of a Chemosensory Receptor from the Yellow Fever Mosquito, *Aedes aegypti*, that is Highly Conserved and Expressed in Olfactory and Gustatory Organs; Ana Claudia A. Melo1,2*, Michael Rutzler1*, R. Jason Pitts1* and Laurence J. Zwiebel1; 1Department of Biological Sciences, Center for Molecular Neuroscience and Program in Developmental Biology, Vanderbilt University, Nashville, Tenn., 37235, USA and 2Departamento de Patologia, Universidade Federal do Para, Belem, Pa., 66075, Brasil; Chem. Senses 29: 403-410, 2004

[5] TauFactor: An open-source application for calculating tortuosity factors from tomographic data; S. J. Coopera,*, A. Berteia, P. R. Shearingb, J. A. Kilnerc, N. P. Brandona; a Electrochemical Science and Engineering, Earth Science and Engineering Department, Imperial College London, South Kensington, London, SW7 2AZ, UK; Electrochemical Innovation Lab, Department of Chemical Engineering, UCL, London, WC1E 7JE, UK; Electroceramics, Materials Department, Imperial College London, South Kensington, London, SW7 2AZ, UK; Received 5 Jul. 2016; received in revised form 15 Sep. 2016; accepted 19 Sep. 2016

[6] Generalization of transmission line models for deriving the impedance of diffusion and porous media; Uwe Tröltzsch*, Olfa Kanoun; Chemnitz University of Technology, Chair for Measurement and Sensor Technology, Reichenhainer Straße 70, 09126 Chemnitz, Germany; 2012

[7] Robust and Universal Modeling Algorithm for Impedance Spectroscopy in Embedded Systems; Andreas Mangler; Technische Universität Chemnitz, Chair Measurement and Sensor Technology; Jil Jasmin Ehnis; RUTRONIK Elektronische Bauelemente GmbH ISPRINGEN, Germany IWIS Conference 2017 Chemnitz 2017

[8] WO 2012/094768 A1 Title: DEVICE THAT EFFECTIVELY AND CONSTANTLY PROTECTS PEOPLE FROM BLOOD-SUCKING ARTHROPODS AND THUS PREVENTS THE SPREAD OF THE EPIDEMIC DISEASES MALARIA, YELLOW FEVER, AND DENGUE FEVER, Kurt Stell, 19. July 2012

[9] WO 2016/165035 A1; METHOD AND DEVICE FOR PRODUCING ELECTROMAGNETIC FIELDS THAT INFLUENCE THE NERVOUS SYSTEM OF INSECTS; Kurt Stell; 20 Oct. 2016

[10] WO 201 8/1 041 35 A1; METHOD AND DEVICE FOR INFLUENCING INSECTS; Kurt Stell; 14 Jun. 2018

[11] WO 99/55151, Device providing protection against insect bites without modifying the ecological balance, Kurt Stell, 27 Apr. 1999

[12] Extension of Pulsewidth Modulation From Carrier-Based to Dither-Based, Shiang-Hwua Yu; Ting-Yu Wu; Sing-Han Wang, Published in: IEEE Transactions on Industrial Informatics (Volume: 9, Issue: 2, May 2013) Page(s): 1029-1036 Date of Publication: 24 Sep. 2012 ISSN Information: INSPEC Accession Number: 13220087, DOI: 10.1109/TII.2012.2220555, Publisher: IEEE

[13] J. P. Meyers, M. Doyle, R. M. Darling, J. Newman, Journal of the Electrochemical, Society 147 (2000) 2930

[14] Simulated impedance of diffusion in porous media; Samuel J. Coopera,*, Antonio Berteib, Donal P. Fineganc, d, Nigel P. Brandonb; Electrochimica Acta 251 (2017) 681-689; Available online 27 Jul. 2017

[15] E. Barsoukov, J. R. Macdonald, Impedance Spectroscopy: Theory, Experiment, and Applications, 2nd Edition, (2005)

[16] H. Keiser, K. D. Beccu, M. A. Gutjahr, Abschätzung der porenstruktur poröser elektroden aus impedanzmessungen, Electrochimica Acta 21 (1976) 539-543.

Proceeding from this basis, the disclosure will be explained in greater detail hereinafter. The disclosure relates to a method and a device for influencing arthropods by means of electromagnetic radiation.

BACKGROUND

Document WO 99/55151 A1 [11] describes a device for protecting against insect bites. The device has oscillators which produce oscillations at different frequencies which propagate over the human skin. If an insect sits on the surface of the skin, the oscillations are perceived by the sensilla of the insect and are converted into stimulus flows by sensory cells of the insect. The intention of the insect to bite the individual is thus disrupted, and the insect moves away from the surface of the skin.

Document WO 2012/094768 A1 [8] discloses a device that protects individuals against blood-sucking arthropods and thus prevents the spread of epidemics. The device basically has two microprocessors and two transmitters, which transmit various pulses and pulse sequence frequencies. A pulsed carrier signal is radiated in the form of electromagnetic waves by antennas coupled to the output stage of the transmitters. A medium frequency spectrum of a lightning discharge channel of 565 kHz is selected as carrier frequency. A protection zone is established due to the radiated transmitting power of 5 microwatts and protects the individuals within a range of approximately two meters against arthropods. External influences, such as lightning, are thus simulated as signals and are perceived by arthropods, initiating an automatic flight response in them.

WO 2016/165035 A1 [9] discloses a device and a method, wherein insects are influenced by a two-channel pulse pattern transmitter which radiates, by means of integrated antennas, two modulated and pulsed electromagnetic waves phase-shifted by 180 degrees with respect to one another. Two electromagnetic fields are thus generated, which influence neurons located in the supraesophageal and subesophageal ganglion of the insects as well as neurons located in the central and peripheral nervous systems of the insects such that they are rendered inactive so that the insects are unable to penetrate the human skin.

A method and a device for influencing insects by means of electromagnetic radiation are disclosed in WO 201 8/1 041 35 A1 [10]. A transmitter generates a time progression of an antenna feed with pulses which is radiated via an antenna as electromagnetic radiation with corresponding pulses. The antenna feed has bursts or packets or salvos of pulses, wherein the time interval between directly successive pulses of a burst lies in the range of 5 microseconds to 9 microseconds and the duration of the bursts is at least 0.1 milliseconds.

In document ALFAIFI, Bandar et al.: Computer simulation analyses to improve radio frequency (RF) heating uniformity in dried fruits for insect control. Innovative Food Science & Emerging Technologies, 2016, 37. Jg., p. 125-137, the influence of various electrode configurations on the heating of different sample geometries is examined in order to minimize an uneven temperature distribution within various samples. To this end, the temperature in various sample geometries is simulated. The objective here is to treat food by means of temperature so that pests such as insects are removed to the greatest possible extent.

Document WANG, Shaojin, et al.: Dielectric Properties of Fruits and Insect Pests as related to radio frequency and Microwave treatments. Biosystems Engineering, 2003, 85. Jg., no. 2, p. 201-212 relates to a determination of a radiation characteristic in order to influence insects by means of an electronic simulation or impedance model. Dielectric properties are measured at various frequencies and temperatures of different samples, such as insects and foods, and the penetration depth and a loss factor are calculated.

A feature common to all methods and devices in the cited prior art is that determined (empirically determined) pulses and pulse widths are transmitted as electromagnetic radiation by means of a transmitter. New empirical studies must be performed for each arthropod (for example insects, spiders, caterpillars) in order to determine a corresponding pulse sequence to which the arthropod reacts so that it does not sting humans. In order to determine the various pulse sequences for influencing the behavior of different arthropods, time-consuming intensive tests must therefore be performed for each arthropod. The prior art does not describe a systematic approach.

BRIEF SUMMARY

The object of the following disclosure is to provide a method and a device for influencing arthropods (for example insects, spiders, caterpillars) by means of electromagnetic radiation, with the aid of which method and device corresponding signals and/or signal patterns to which the arthropods react can be determined quickly, easily and systematically for each of the arthropods.

It is known from biology to examine arthropods in respect of their sensory organs. For example, a localization of sensory organs and in particular of sensory surfaces and spaces of the arthropods can thus be achieved. For example, in the case of a mosquito, these are the antennae, the palps and the body in females, and the head in males. Other types of arthropods have other or further sensory surfaces and spaces or body parts, such as the wings, maxilla, tarsi or the legs. Physical and/or biochemical sensory appendages which have different physical, biochemical and/or sensory properties are located on these body parts. The localization of the sensory appendages is known from biology as described above and can be taken from there, for example from corresponding publications.

The physical and/or biochemical sensory appendages of arthropods include, for example, sensors and/or receptors for example for sensing mechanical changes, taste, odor, scents, sound, chemical sensing, temperature and pheromones. They also include, for example, sensory appendages for ionization and thus also for electrical conductivity of gaseous, liquid and solid substances, as well as the detection of partial discharges based on ionization processes.

These sensory appendages react to different signals and/or signal patterns, for example an arthropod can be influenced with a corresponding signal and/or signal pattern, for example in the form of electromagnetic radiation, such that the arthropod takes flight for example or is rendered inactive. Here, the corresponding signal and/or the signal pattern address at least one specific sensory appendage and/or at least one sensory property of the arthropod, which then influences the arthropod accordingly.

In the method for influencing arthropods by means of electromagnetic radiation, electromagnetic radiation is radiated by at least one transmitter. The characteristic of the electromagnetic radiation, for example the time progression of the electromagnetic radiation, is established with the aid of at least one equivalent electronic circuit (ECM), wherein the equivalent circuit is a model of the arthropod. Signals and/or signal patterns to which the corresponding arthropod reacts can thus be obtained quickly, easily and systematically, wherein the equivalent electronic circuit is used as the basis of a model of the arthropod. An empirical determination of the signals and/or signal patterns to which the arthropod reacts is therefore no longer necessary. Rather, a systematic approach for determining the signals and/or signal patterns for influencing the arthropod is provided.

ECMs are electrical equivalent circuits which, for example, have different configurations and/or elements, for example from ohmic resistors, inductors and capacitors. These elements can be interconnected as desired. The complex resistors $\underline{Z}$ in the equivalent circuits are representative of a complex network consisting of at least one of these three elements.

The characteristic of the electromagnetic radiation may be dependent here on various factors, for example a temporal, a spatial or a frequency-based dependency are conceivable. In principle, however, further factors by which electromagnetic radiation can be described and/or characterized are conceivable.

The (mathematical and electrotechnical) ECMs deliver very similar results instead of physical, chemical and/or biochemical approaches, although the starting point is somewhat different. Physical, chemical and/or biochemical approaches are preferred for the consideration of charge carriers. By contrast, ECMs are better suited for examining the behavior of an electrical system. Due to the similarities, mixed approaches are also possible. ECMs can simplify the process of model identification. The use of ECMs is not limited to linear systems.

For accurate and targeted influencing, the model advantageously describes at least one sensory appendage and/or at least one sensory property of the arthropod. The sensory abilities of arthropods can also be described by discrete individual sensors. From a physical point of view, a large number of sensors with merged sensor properties is necessary to reproduce the complex sensor structures of arthropods. Examples of physical sensors are ionization sensors of the air or environment, taste sensors, chemical sensors, gas sensors/breath sensors, air quality sensors, $CO_2$ sensors, air pressure sensors, temperature sensors, humidity sensors, time of flight sensors, infrared sensors, UV sensors, accelerometers and sound sensors. Preliminary biological investigations have shown that there is a clear allocation of defined sensor properties as well as of frequency profiles of sensory genes, and the distribution and arrangement of sensors between male and female, and therefore the sensory abilities of an arthropod, can be described, for example, by a plurality of physical sensors. Different kinds of arthropods have different sensory abilities and a different frequency and distribution of the sensory abilities.

Due to the multiple sensory properties and their physical and/or biochemical functions, different signals and/or signal patterns, for example frequency patterns, are necessary in order to stimulate, as far as possible, all sensory appendages of the arthropods and/or their sensory properties. These frequency patterns can be transmitted either at the same time, simultaneously or sequentially, one after the other. For example, the topology and/or the physical structure of the arthropod are key here for which sensory appendages are to be stimulated. Different frequency patterns are also necessary for the stimulation of the different types of arthropods.

In order to describe the electrical behavior of sensory appendages and/or of sensory properties of the arthropods, equivalent electronic circuits are used as models of the arthropod. Transmission line models (TLMs) are universally applicable as ECMs. Due to the series connection of a plurality of TLMs, any desired cascaded models can be constructed. Infinite Voigt models can also be constructed with the aid of TLMs connected in series. The physical and/or biochemical effects of the sensory appendages of the arthropod can be described with equivalent electronic circuits. Sensory appendages of the arthropods are, for example, the antennae, the sensilla hairs or the body of the arthropod. Further sensory appendages, however, may also be considered, depending on the arthropod.

By using ECMs in the complex plane or by analyzing the distribution of relaxation times (DRT), it is possible to advantageously examine, describe and decouple the relative contributions to the impedance of the various physical, electrochemical and/or biochemical processes in arthropods. This is a method to represent the so-called points of interest in the impedance spectrum in a dynamic range and to clearly distinguish the different impedance behavior of arthropods. The different representation methods, such as Nyquist plot or DRT spectrum, show significant points in the spectrum. These significant points are assigned to the biochemical and/or physical properties and behavior patterns of the arthropods.

The equivalent circuit is at least one sensory appendage and/or at least one sensory property of the arthropod. It is thus possible to obtain different models and/or equivalent circuits for different arthropods having different sensory appendages and/or sensory properties. In principle, any number of models can be used and analyzed together with one another. Furthermore, the sensory appendages and/or sensory properties of the arthropods can be supplemented by further sub-models or only individual sensory appendages and/or sensory properties can be modeled, in order to reduce the number of models and/or electrical equivalent circuits.

For an advantageously quick determination of the signals and/or signal patterns for influencing the arthropod, at least one pulse, preferably for example a Trichel pulse, is preferably transmitted first. However, the pulse can be any pulse in principle. The frequency spectrum of the transmitted pulse is then detected. At least one frequency component of the frequency spectrum of the transmitted pulse is then determined, for example by means of a Fourier transform, and the frequency component is converted into a settling time. At least one element is determined from the group comprising the sensory appendage and the sensory property of the arthropod. The at least one electronic equivalent circuit that is equivalent to the at least determined element from the group comprising the sensory appendage and the sensory property of the arthropod and that has at least one unknown RC circuit with a resistance R of $0 \leq R$ and a capacitance C of $0 \leq C$ is then selected. The at least one unknown RC circuit is now determined on the basis of the settling time, calculated from the frequency component of the frequency spectrum of the transmitted pulse, corresponding with the time constants of the RC circuit as at least one now known RC circuit. At least one RC circuit significant for influencing the arthropod is then determined.

To determine the at least one significant RC circuit, the voltage amplitude is preferably normalized depending on the at least one settling time determined with the known RC circuit. The determination is then performed on the basis of the normalized voltage amplitude. The normalization is preferably performed by means of a DRT analysis, thus resulting advantageously in a quick and simple determination. A graphical determination by pattern recognition is thus also possible.

The time progression of the pulse preferably advantageously comprises at least one positive and/or negative Trichel pulse for quick and simple determination of the characteristic of the electromagnetic radiation.

The arthropod is preferably trained by varying the time constants of the at least one significant RC circuit. It is thus advantageously possible to modify only the frequency of the significant RC circuit, instead of all RC circuits, in order to determine the characteristic of the electromagnetic radiation.

For an advantageous plausibility check or also alternative determination in respect of the determined significant RC circuit, at least one element is preferably firstly determined from the group comprising the sensory appendage and the sensory property of the arthropod. A frequency behavior of the at least one element from the group comprising the sensory appendage and the sensory property of the arthropod is then identified during transmission of at least one pulse and is represented graphically. A frequency behavior of equivalent circuits during transmission of at least one pulse is likewise identified and represented graphically. The graphically represented frequency behavior of the equivalent circuits is then compared with the graphically represented frequency behavior of the at least one element from the group comprising the sensory appendage and the sensory property of the arthropod, and a similarity of graphical patterns is determined. A selection of the at least one electronic equivalent circuit that is equivalent to the at least one element from the group comprising the sensory appendage and the sensory property of the arthropod can then be made on the basis of the determined similarity.

The graphical representation is preferably provided in the form of a Nyquist plot for a particularly clear representation.

In order to advantageously analyze, reduce or even eliminate the ambiguity of impedance model equations, a model or sub-model is assigned at least one physical and/or biochemical effect of the sensory appendages and/or the sensory properties of the arthropod. For example, the model or sub-model of a brush electrode describes the antennae of the arthropod; the model or sub-model of a porous electrode describes the porous sensilla hairs of the arthropod; the model or sub-model of the general diffusion describes the ion diffusion. Furthermore, effects are described, for example, by the model or sub-model of the diffusion of the non-permeable wall and/or the diffusion of an ideal reservoir. A further model or sub-model is, for example, a model for calculating the tortuosity factor from tomographic and/or topographic data of the surface and/or the inner structure of the arthropod. The analysis of model parameters which influence the impedance behavior is likewise simplified by the elimination of ambiguities, and in addition the robustness of nonlinear parameter optimization techniques is improved.

For example, the computational model of tortuosity factor (=tau factor) from tomographic data of arthropod surface quantifies the apparent decrease in diffusive transport resulting from windings of the flow path through porous media, edge densities, and image-based microstructure data. There are established mathematical tools, such as the tau factor calculation, for efficiently calculating the tau factor as well as volume fractions, surface areas and three-dimensional structure. The penetration depth of the excitation signal can be described with the aid of the tau factor. The specific anatomy of the arthropods can thus be taken into consideration. The tau factor calculation is a very efficient method for determining the reduced diffuse transport in windings and twisted and tortuous heterogenous geometries and structures on the basis of microstructural image data. The results from the tau factor can then be used to reduce the parameters in the system description of the arthropods. For example, correlations can be used in order to approximate the tortuosity factor. In recent years, however, the increasing availability of 3D imaging techniques has sparked interest in calculating the quantity more directly. The large datasets typical of modern tomography can thus be used quickly and precisely, without the need for high computational power.

The sensory properties of the arthropods can be supplemented by further models, or only individual sensory properties can be modelled in order to reduce the number of electronic equivalent circuit models. By eliminating ambiguities, the analysis of model parameters that influence the impedance behavior is simplified, and in addition the robustness of nonlinear parameter optimization technology improves. The previously described correlations and test results with the aid of stochastics allow a direct and indirect assignment of the models.

Since generally valid solutions for transmission line models (TLMs) are advantageously available and therefore, for example, any physical and/or biochemical effects can be described with TLMs, at least one TLM is used to generate the equivalent circuit. The TLMs are thus universally applicable as ECMs. With the use of TLMs, any equivalent circuits can be generated, because, for example for the individual complex elements $\underline{Z}x$, boundary conditions can also be assumed (for example $\underline{Z}x=0$ or $\underline{Z}x=\infty$). For example, it is possible to use an ECM as TLM or another ECM circuit structure formed of complex elements, such as resistor, capacitor or inductor. Due to the correct selection of the elements and parameters of the TLM, for example different resistors, capacitors, coils, impedances, currents and/or voltages, it is possible to identify the different behavior of a system and also the fractal structure of a physical and/or electrochemical system. The elements of a TLM may have, for example, a nonlinear voltage and current dependency. The parameters may additionally be position-dependent or frequency-dependent, for example. In this case, numerical methods are often required to calculate the impedance. The solving of the differential equations of a general TLM for example allows the simulation of the impedance of many different systems by means of the same methodology. The use of different boundary conditions allows the simulation of different systems by means of the same model. The change to the values of the impedances allows the simulation of a system under different conditions and also the simulation of different systems. The correlations with models from electrochemical approaches are represented by means of suitable parameters. An identification of the correlation between different models is thus made possible, for example the degree of similarity between diffusion and porous electrode models. It is also conceivable that the electronic equivalent circuits divided into sub-models are described by means of the TLM.

In principle, equivalent circuits (ECM) represent an electrotechnical approach for describing a model, for example of an arthropod, whereas general transmission line models TLMs represent a generally valid mathematical approach for describing the ECM or the model. A general TLM abstracts the conventional ECM by the use of generally valid complex elements $\underline{Z}$ in the equivalent circuit. An ECM uses, for example, (electrotechnical) circuit diagrams with corresponding elements, for example resistors, capacitors and/or coils, in order to describe a model, whereas a TLM is a generally valid approach, in which the complex elements $\underline{Z}$ are selected generally in order to simplify the equation systems. The solutions to the differential equations are thus simplified from a mathematical viewpoint with the aid of the TLM. Boundary conditions are used to describe the ECM and/or the model for simplified modelling of electrochemical and biochemical processes of arthropods. Information regarding the model can thus be obtained with ECM and/or TLM. In order to simplify the system simulation and system identification of arthropods, in particular when describing diffusion processes, different modelling must be applied for porous structures such as porous sensilla hairs. It is likewise possible by way of transformations to change between an electrotechnical description of an ECM and a mathematical description of a TLM. Modelling with the aid of Infinite Voigt models (ECM) is a simplified modelling method for an empirical determination of frequency patterns that describes the relaxation behavior of the arthropods.

For the most advantageous possible universal representation and use of equivalent circuits, at least one transmission line model is preferably used to determine the at least one RC circuit of the equivalent circuit.

In order to advantageously model further even more complex systems and/or in order to replicate models even more precisely, at least two or more equivalent circuits are connected in series. For example, arthropods having a plurality of sensory appendages and/or sensory properties, for example different sensilla hairs and with different numbers of antennae, can thus be modelled. Any desired cascaded models can be constructed by connecting a plurality of ECMs in series. For example, Infinite Voigt models can also be constructed with the aid of ECMs connected in series. Furthermore, it is thus possible to achieve a condensed electronic equivalent circuit in which a plurality of transmission line models are arranged in series. An example of a condensed equivalent circuit is provided by Infinite Voigt models or models that use constant phase elements (CPEs).

If at least one boundary condition is used with the TLM in order to describe the model of the arthropod, a simulation of various systems can advantageously be performed with the same model. It is thus possible to delimit the physical and/or biochemical effects of the sensory appendages and/or the sensory properties of the arthropod under consideration of the boundary conditions. For example, different currents and/or voltages result in the TLM for describing the antennae or the sensilla hairs of the arthropod.

For an advantageously simplified model, the boundary condition has at least one boundary consideration of at least one impedance, for example towards 0 and/or infinitely, whereby the TLM is converted into a simplified equivalent circuit. It is thus advantageously possible to describe and/or to calculate the model more easily and with less computational effort.

If at least one impedance spectrum is determined with the aid of the equivalent circuit or the simplified equivalent circuit, the relevant points of interest can thus advantageously be extracted from this spectrum quickly and easily. For example, it is possible with simplified equivalent circuits, such as Infinite Voigt models, to determine impedance spectra from empirically determined data. For example, impedance spectra can also be determined from empirical equivalent circuits.

For advantageously more precise results, the impedance spectrum is determined with the aid of tomographic and/or topographic data. For example, the tomographic and/or topographic data can originate from corresponding publications. For example, impedance spectra can be created from empirical ECMs and tomographic and/or topographic data.

With the impedance spectrum and at least one analysis, for example a DRT analysis (distribution relaxation time constant), it is possible, for an advantageous targeted influencing of the arthropod, to determine at least one parameter of the characteristic of the electromagnetic radiation, for example at least one characteristic frequency and/or time constant. However, other parameters, such as voltage, current or time progression, are also conceivable in principle. For example, it is conceivable that characteristic frequencies are determined from an empirical ECM, such as an Infinite Voigt model, in order to influence the behavior of arthropods with the aid of the analysis, for example the DRT analysis.

To provide an advantageously improved influencing, at least one new parameter (for example excitation frequencies) is derived, for example with a DRT analysis, with the aid of the at least one parameter of the characteristic (for example a characteristic frequency and/or time constant), for example from this parameter, in order to generate at least one new impedance spectrum and in order to derive therefrom at least one new TLM. For example, it is possible to create an ECM of the sensory appendages of the arthropods from the DRT spectrum and the relaxation behavior with characteristic settling times and to determine further characteristic frequencies and/or time constants with the aid of the DRT analysis in order to derive therefrom new excitation frequencies in order to in turn generate herefrom new impedance spectra and in order to derive therefrom new structured TLMs.

In order to advantageously achieve a delimitation of the physical and/or biochemical effects of the sensory appendages and/or the sensory effects of the arthropod, the TLM is divided into at least one of the following divided transmission line models: TLM for the porous electrode, TLM for the porous material, TLM for general diffusion and/or into non-permeable walls and an ideal reservoir (IR/NPW). It is also conceivable that all TLMs are used, or only one, two, three or four. It is likewise conceivable that, for example, the model or sub-model of the brush electrode which describes the antennae of the arthropod is described by the TLM for the porous electrode, the porous sensilla hairs of the arthropod are described by the TLM for the porous material, the ion diffusion is described by the TLM of general diffusion and the diffusion of the non-permeable wall and/or the diffusion of an ideal reservoir is described by the TLM of IR/NPW diffusion.

Differential equations describe the TLMs. In order to advantageously extend the method, for example to different classes of arthropods, at least one differential equation of the TLM is solved to determine parameters for the characteristic of the electromagnetic radiation, for example current, voltage, frequency, time dependency. In the case of divided TLMs, for example, each TLM can be solved. For example, the solution can be represented in the form of a representation of the impedance behavior, for example in the form of a Nyquist plot. However, other representations of the solution are also conceivable in principle, for example in the form of a representation in the image, time, frequency, current and/or voltage domain. It is also possible to change between the various representations by means of transformations, such as Fourier transform, Laplace transform and/or back-transformation thereof. For example, it is possible to change from the Nyquist representation to a representation in the form of a frequency curve which directly shows the characteristic of the electromagnetic radiation, for example the time progression of the electromagnetic radiation. Due to the use, for example, of a Fourier transform, Laplace transform and/or back-transformation thereof, the analysis can be performed for example in the image domain, time domain or frequency domain.

In order to obtain a quicker and more accurate solution, the differential equation is solved by means of at least one boundary condition. The use of different boundary conditions advantageously allows the simulation of different systems with the same model. The boundary conditions are given for example by specification of fixed parameters, such as temperature, pressure and/or humidity. For example, a complex temperature dependency can be removed by assuming the temperature to be constant. However, further parameters which occur in the corresponding systems are also conceivable in principle. The complexity and parameters of the mathematical correlations are also reduced by the boundary conditions. By solving the differential equation by means of at least one boundary condition, it is possible, for example with a graphical analysis with the aid of a DGL-based curve discussion, to identify characteristic properties of the arthropods and thus simplify the determination of new frequency patterns.

A particularly advantageous representation of the solution to the differential equation is the impedance spectrum representation, for example the Nyquist representation. The impedance spectrum makes it possible to represent the solution clearly and to analyze it quickly, since for example the points of interest are quickly discernible. The solution to the differential equation can therefore preferably be represented and/or analyzed in an impedance spectrum. For example, the influence of the pore geometry (for example open/closed pores) on the impedance behavior or the impedance behavior of brush electrodes as a model of the antennae of the arthropods can thus be analyzed very comfortably. However, other influences can also be analyzed, for example the influence of the geometry of the antenna of the arthropod.

The used TLM is verified and/or adapted with the aid of at least one other TLM and/or a simplified ECM, whereby more accurate results advantageously can be achieved. For example, another TLM with other parameters and/or elements from the above-mentioned divided four models is used for this purpose, or, for example, an Infinite Voigt model is used as the basis.

In order to advantageously analyze, reduce or even eliminate the ambiguity of impedance model equations, parameters of the TLM for unambiguous assignment of the TLM to the corresponding sensory appendage of the arthropod are determined. The elimination of ambiguities simplifies the analysis of model parameters that influence the impedance behavior, and in addition improves the robustness of nonlinear parameter optimization techniques. The previously described correlations and test results with the aid of stochastics allow a direct and indirect assignment of the models. In particular, the settling times of simplified RC models offer a good possibility for generating correlating frequency patterns. For example, a direct assignment of the ECM to a sensory property of the arthropod can thus be achieved.

The frequency spectrum for exciting sensory appendages of arthropods is very large. A multi-frequency excitation may thus lead to an ambiguity of the results. Different physical and/or biochemical processes must be monitored and analyzed in different frequency ranges. If an unambiguous assignment is not possible, certain parameters can be simplified by the use of topographic and/or tomographic data and/or can be determined directly, for example by differential equations. The parameters of the TLM can therefore be simplified and/or directly determined by the use of topographic and/or tomographic data of the arthropod, for example from corresponding publications. For example, assignments can be made with the aid of the tomographic and/or topographic data, whether the structures are porous, permeable or semi-permeable. Specific TLMs can thus in turn be assigned to the tomographic and/or topographic information. The complexity of the models can thus be reduced.

In order to advantageously define generally valid models for each kind of arthropod and to compare models, the parameters, for example impedance parameters, are normalized. For example, in the Nyquist plot parameters are generally normalized to the value 1, so that a better comparability with other parameters and/or data is provided. With the normalization of the parameters it is possible, for example, to create generally valid ECMs for different arthropods.

For a simplification of the parameter adaptation for example in software, the parameters are advantageously adapted with a limit value analysis. For example, a simplification is achieved with a limit value analysis towards zero or towards infinity, since the adaptations are only relative to a previously determined value.

In order to avoid differential equations for example in microcontroller-based systems and in order to reduce the required memory space, a substitution method is used in combination with at least one database, for example in order to very efficiently model any desired nonlinear functions, for example in order to store nonlinear function profiles in look-up tables in the microcontroller. In this substitution method, nonlinear functions are replaced for example in part by e-functions, Gaussian functions or linear functions. Any desired nonlinear functions can thus be stored in a memory space-saving manner for the microcontroller, and complex differential equations can be avoided. For example, it is also conceivable that a discrete Fourier transform (DFT) is used for memory-efficient use of the algorithms on the basis of a microcontroller with incorporation of a Goertzel algorithm for the signal evaluation, in particular with use of more than one excitation frequency.

At least one discrete Fourier transform (DFT) is used with incorporation of a Goertzel algorithm for an advantageously memory-efficient use of the method on the basis of a microcontroller. It is thus possible to implement the method and/or the resulting algorithm in a memory space-saving manner on a microcontroller, so that there is no need to use large and powerful computing units.

So that the solution to the differential equation can advantageously be used for a real arthropod and/or the model can be adapted to real conditions, the solution to the differential equation is checked and/or adapted by means of a control system based on at least one reference model, for example a self-adapting or adaptive control system, such as a deep learning process. It is thus possible that further reference models for other types of arthropods can advantageously be trained. The reference model can comprise, for example, empirical data and/or data from an already established model.

In the case that no data are (yet) known from models, the reference model can be determined from empirical data. In principle, it is also possible to determine the reference model from empirical data and/or from data of the (previously determined) model.

In order to make the characteristic of the electromagnetic radiation available to the transmitter quickly and easily, the characteristic of the electromagnetic radiation is stored in a memory, for example in a database or a cloud. For example, it is possible that the transmitter receives the characteristic of the electromagnetic radiation from the memory wirelessly, for example by Wi-Fi, Bluetooth, infrared or other data networks. The transmitter may also transfer the characteristic, for example to another transmitter. However, other possibilities for reception and transmission are also conceivable. It is also conceivable that, depending on the position of the transmitter, the characteristics of the electromagnetic radiation for the arthropods located in this position are transmitted from the memory, for example wirelessly, and are then later transmitted by the transmitter.

So that the electromagnetic radiation can be radiated advantageously over a greater range, the characteristic, for example the time progression, of the electromagnetic radiation is modulated with at least one carrier signal. In principle, carrier frequencies for example in the sub-megahertz, megahertz and gigahertz range are conceivable. Furthermore, different types of modulation, such as PWM, FM, AM, PFM, TDM and FDM, are conceivable.

In order to advantageously achieve a greater range of the electromagnetic radiation, the characteristic, for example the time progression, of the electromagnetic radiation is modulated with at least one dither signal.

In order to advantageously save power and achieve a greater range and an improved transmitting power of the electromagnetic radiation, the carrier signal is additionally modulated with at least one dither signal. It is thus possible to modulate a third frequency onto the carrier signal. The dither modulation can be described, for example, by a time window shifted back-and-forth in the frequency over time representation. For example, a modulated dither signal can be generated in the TDM and in the FDM signal or in combination from TDM, FDM and dither signal.

For simulation and/or stimulation of the different types of arthropods, different frequency patterns are also necessary. Advantageously in order to generate arbitrary different stimulation signals, the characteristic, for example the time progression, of the electromagnetic radiation is generated with a multi-frequency pattern generator which is based on a frequency division multiplexing signal (FDM) and a time division multiplexing signal (TDM). In the case of FDM, a frequency is transmitted over the total time. By contrast, in the case of TDM, the total frequency spectrum is transmitted over certain time intervals. A combination of FDM and TDM makes it possible to transmit a very wide range of frequencies in a very wide range of time periods. Any desired characteristic of the electromagnetic radiation can thus be generated.

In order to advantageously achieve an additional effective stimulation of the arthropods, the characteristic of the electromagnetic radiation comprises at least one burst pulse, which simulates at least one corona discharge in air and the time progression of which comprises at least one positive and/or negative Trichel pulse.

For an advantageously increased efficacy of the influencing of the arthropods, the characteristic does not have any harmonic and/or subharmonic correlations. A distinction is thus made, for example, between the harmonic components and subharmonic components in the frequency spectrum for all sequences transmitted simultaneously at the same time. It is also conceivable that the characteristic of simultaneously transmitted frequencies in the time domain and/or in the frequency domain does not have any harmonic and/or subharmonic correlations.

For a further increased efficacy of the influencing, the characteristic is prime number-based. The characteristic thus does not have any integer harmonic and/or subharmonic multiples and/or factors.

For a particularly increased efficacy, the characteristic is based on the Dirichlet's theorem on arithmetic progressions. Dirichlet's theorem is a statement from the mathematical subfield of number theory which states that an arithmetic sequence contains infinitely many prime numbers, if this is not impossible for trivial reasons.

The object is additionally achieved by a device for influencing arthropods by means of electromagnetic radiation. The device in this case comprises at least one transmitter, which radiates the electromagnetic radiation. The characteristic of the electromagnetic radiation is created with the aid of at least one equivalent electronic circuit, wherein the equivalent circuit is a model of an arthropod. Examples of devices are wristbands or devices which can be mounted, for example, in rooms or outside, for example on sunshades.

The device is also intended as a means for determining the characteristic of the electromagnetic radiation of at least one equivalent electronic circuit, wherein the equivalent circuit is a model of at least one sensory appendage and/or at least one sensory property of an arthropod.

In order to advantageously quickly determine the signals and/or signal patterns for influencing the arthropod, the device also preferably comprises means for transmitting at least one pulse, means for detecting the frequency spectrum of the transmitted pulse, means for determining at least one frequency component of the frequency spectrum of the transmitted pulse, and computing means for converting the frequency component into a settling time, means for determining at least one element from the group comprising the sensory appendage and the sensory property of the arthropod, selection means for selecting the at least one electronic equivalent circuit that is equivalent to the at least one determined element from the group comprising the sensory appendage and the sensory property of the arthropod and that comprises at least one unknown RC circuit with a resistance R of $0 \leq R$ and a capacitance C of $0 \leq C$, means for determining the at least one unknown RC circuit, calculated from the frequency component of the frequency spectrum of the transmitted pulse, corresponding with the time constants of the RC circuit as at least one now known RC circuit, and means for determining at least one RC circuit significant for the influencing of the arthropod.

For an advantageously quick and simple determination, the means for determining the at least one significant RC circuit preferably comprise normalization means for normalizing the voltage amplitude depending on the at least one settling time determined with the known RC circuit.

Advantageously for quick and simple determination of the characteristic of the electromagnetic radiation, the means for transmitting the pulse is preferably arranged to transmit at least one positive and/or negative Trichel pulse.

For an advantageous plausibility check or alternative determination in respect of the determined significant RC circuit, the device preferably comprises means for determining at least one element from the group comprising the sensory appendage and the sensory property of the arthropod, means for identifying and means for graphically representing a frequency behavior of the at least one element from the group comprising the sensory appendage and the sensory property of the arthropod when transmitting at least one pulse, means for identifying and means for graphically representing a frequency behavior of equivalent circuits when transmitting at least one pulse, means for comparing the graphically represented frequency behavior of the equivalent circuits with the graphically represented frequency behavior of the at least one element from the group comprising the sensory appendage and the sensory property of the arthropod and for determining a similarity of graphical patterns, and selection means for selecting the at least one electronic equivalent circuit that is equivalent to the at least one element from the group comprising the sensory appendage and the sensory property of the arthropod on the basis of the determined similarity.

For an advantageously particularly clear representation and thus also processing for the pattern recognition, the graphical representation means are preferably arranged to perform the graphical representation in a Nyquist plot.

Since generally valid solutions advantageously exist for TLMs and, for example, any desired physical and/or biochemical effects can likewise be described with TLMs, the equivalent circuit is generated with the aid of at least one TLM.

In order to transmit advantageously any frequencies and/or frequencies of any length in order to thus address different classes of arthropods, a combined multi-frequency pattern generator is provided, which is based on a frequency division multiplexing signal (FDM) and a time division multiplexing signal (TDM), which generates the characteristic, for example the time progression, of the electromagnetic radiation.

For a variable use in respect of different arthropods, for example depending on location, means are provided with which the characteristic, for example the time progression, of the electromagnetic radiation can be transferred from a memory, for example from a database or from the cloud, to the device. For example, a wireless transfer, for example by Wi-Fi, Bluetooth, infrared or other data networks, is conceivable. However, other transfer possibilities are also conceivable.

If a transfer from the memory is not possible, for example since there are no corresponding transfer means or there is no data network, means are provided, such as a microcontroller, by which the characteristic of the electromagnetic radiation can be created, for example calculated, in the device. Other means are also possible in principle, by which the characteristic of the electromagnetic radiation can be created.

For a stronger and more efficient influencing of the arthropods, the characteristic comprises at least one Trichel pulse sequence for simulation of a corona discharge in the atmosphere.

For an advantageously additional effective influencing of the arthropods, the characteristic comprises at least one burst pulse, which simulates at least one corona discharge in air and the time progression of which comprises at least one positive and/or negative Trichel pulse.

Further advantages will become clear from the dependent claims and the following description of preferred exemplary embodiments. The features discussed individually in the claims can be combined with one another in a technically feasible way and can be supplemented by explanatory information from the description and by details from the Figures, in which further variants are shown.

DETAILED DESCRIPTION

Figure 1:
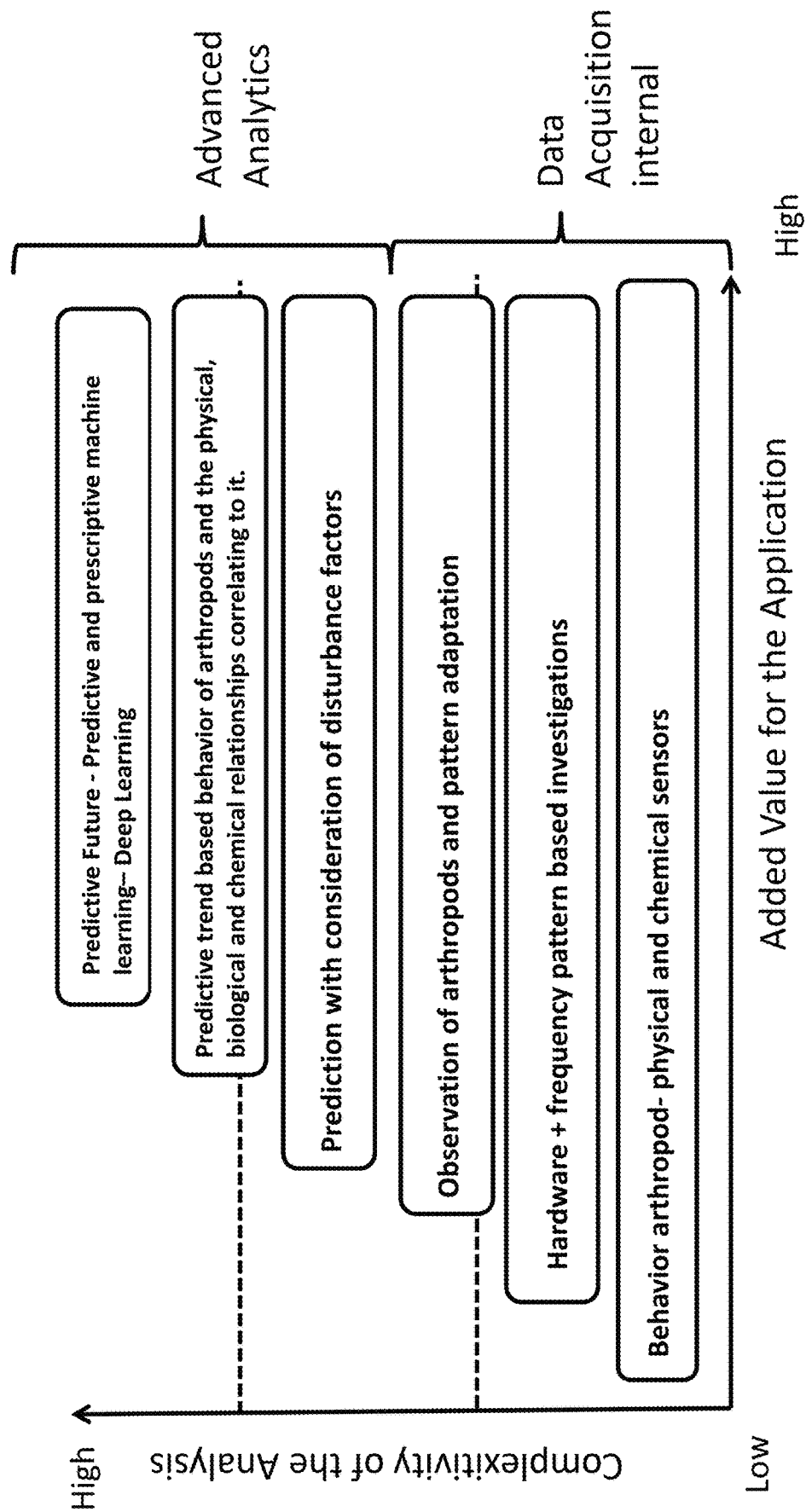
FIG. 1 a predictive analysis or analytics to adapt algorithms in advance of events, FIG. 2 the three steps from descriptive analysis, through predictive data, up to deep learning, FIG. 3 example of an arthropod, FIG. 4 examples of sensory appendages: schematic depiction of a female head with highlighted (dark) antennae (FA) and palps (FP) [1], male head (MH), entire body of the female arthropod (FB), FIG. 5 sample comparisons in pairs: proportional Venn diagram, FIG. 6 antenna of a female *Ae. Aegypti* [4], FIG. 7 palp of a female *Ae. Aegypti*; AaOr7-specific marker on the female maxillary palp (capitate peg sensilla, A, B) and the labial palp T2 sensilla (C, D), FIG. 8 differentiated analysis of the expression (DE) of chemosensory genes, FIG. 9 odor-binding proteins (OBPs) in transcriptomes of *Ae. Albopictus*, FIG. 10 olfactory receptors (OR) in the *Ae. albopictus* transcriptome, FIG. 11 ionotropic receptors (IR) in the *Ae. albopictus* transcriptome, FIG. 12 the IR co-receptor CREL, FIG. 13 diagram of a third antenna segment of *Drosophila*, which shows the distribution of various olfactory sensilla and other sensory structures, (D) shows a detail from (C), FIG. 14 taste receptors (GR) in the *Ae. albopictus* transcriptome, FIG. 15 frequency profiles of sensory genes in *Ae. Albopictus*, FIG. 16 qPCR validation, FIG. 17 a simplified function of the system, FIG. 18 a simplified functional principle of the method for different arthropods and different stimulation of the sensory appendages, FIG. 19 a simplified functional principle for stimulation of the sensory appendages, FIG. 20 a frequency division multiplexing signal (FDM), FIG. 21 a time division multiplexing signal (TDM), FIG. 22 a simplified depiction of the frequency spectrum of the combined baseband modulation signal for different arthropods, FIG. 23 a simplified depiction of the frequency- and time-variable frame and structure of the combined multi-frequency pattern generator, FIG. 24 an impressed dither signal on a PWM pulse of defined signal amplitude, FIG. 25 a phase-modulated dither signal on a PWM pulse with defined frequency (left), PWM signal without dither modulation (right), FIG. 26 an extension of the signal with PWM-modulated dither signal [12], FIG. 27 a general transmission line model (TLM), FIG. 27a a TLM of a porous electrode, FIG. 27b a TLM of porous material, FIG. 27c a TLM of ion diffusion, FIG. 27d a TLM for a non-permeable wall and the diffusion in an ideal reservoir, FIG. 28 description of the processes in a porous electrode model [13], FIG. 29 DRT spectrum with different relaxation times (settling times) of the ECM of an arthropod, FIG. 30a-d graphical representations of the solution to the differential equation of the TLM from FIG. 27a, impedance of the porosity model according to equation 4 with c2=1, FIG. 31-33 time progression of a positive Trichel pulse, a negative Trichel pulse, and a Trichel pulse sequence (in each case as measured and simulated pulses), FIG. 34a-d graphical representation of the solution to the differential equation of the TLM from FIG. 27d, impedance of the diffusion model according to equations 12 and 13, FIG. 35 simulated impedance spectra for 2D (left) and 3D (right) for 5 single closed pore structures [14], [16], FIG. 36 simulated impedance spectra of 7 single open pore geometries, wherein all have identical pore volume and tortuosity factor and a uniform direction of the stimuli signal [14], FIG. 37 simulated impedance spectrum of 2D fractals, FIG. 38 simulated impedance spectrum of two 2D fractals (Here a Pythagoras tree is shown for closed structures.), FIG. 39 impedance behavior of a set with different structures of the pores (I is the length of the pores and lambda is the form factor [15]), FIG. 40 damping behavior of a sinusoidal signal into a pore due to the de Levie signal penetration effect [15], FIG. 41 typical impedance behavior of a de Levie brush electrode in the complex domain as a function of the frequency for electrolyte concentrations, FIG. 42 characteristic of the impedance behavior in the complex domain for a porous electrode with series resistance RS (of $0 \to \infty$) and cumulatively distributed resistance, $\Omega$, FIG. 43 equivalent circuit of the Infinite Voigt circuit, FIG. 44 theoretical DTR of an R/Q circuit according to equation (20), FIG. 45 simulated impedance spectrum of a synthetic bundle of particles with porosity, FIG. 46 simulated phase angle as a function of the logarithmic frequency for 3 single microstructures, FIG. 47 a diagram of a control system (basic function of the deep learning process for training different reference models of the arthropods), FIG. 48a-d process sequence steps 1-4 for the arthropod reference modeling, FIG. 49 a simplified functional principle of the method, FIG. 50 a simplified modeling process, FIG. 51-54 equivalent circuits of various sensory appendages, FIG. 55 various models for transformed equivalent circuits, FIG. 56 description of characteristic properties of the DRT impedance spectrum by vectors and scalars, FIG. 57 equivalent model of a positive Trichel pulse, FIG. 58 a sequence of needle pulses generates a Trichel pulse according to FIG. 57, FIG. 59 pulse pattern signal with variable time windows, FIG. 60 pulse pattern signal with variable sub time windows, FIG. 61 tau time constant spectrum FIG. 62 a schematic depiction of a device, measuring devices, and PC with Matlab FIG. 63 a schematic depiction of the integration of a device in a mobile phone.
Figure 2:
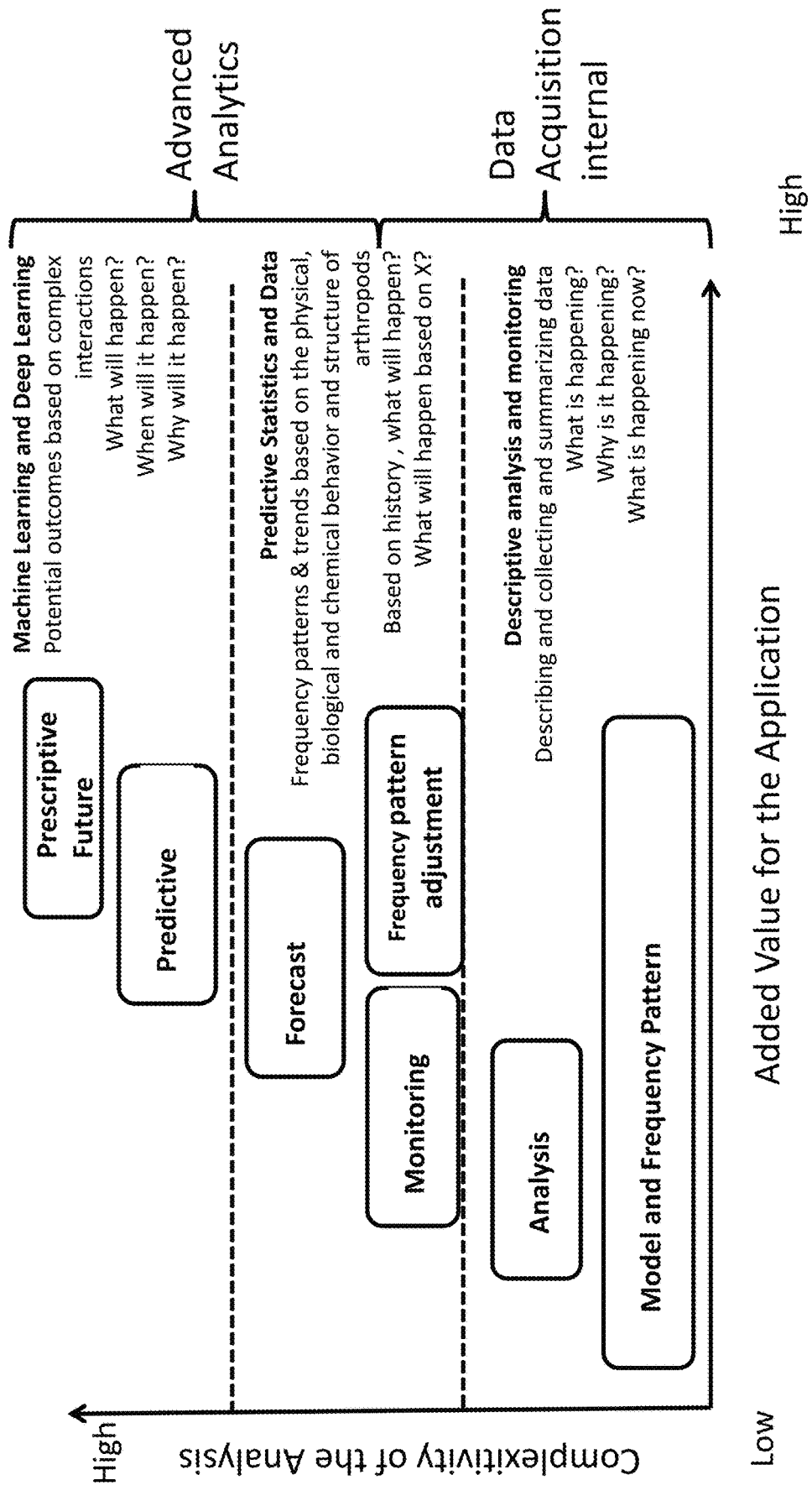
Figure 5:
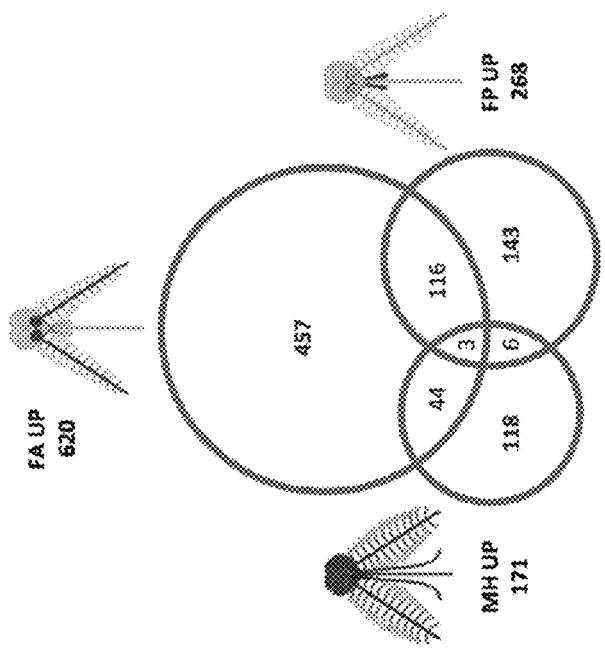

The disclosure will now be explained in greater detail by way of example with reference to the accompanying drawings. However, the exemplary embodiments are only examples and are not intended to limit the inventive concept to a specific arrangement. Before the disclosure is described in detail, it should be noted that it is not limited to the various components of the device or the various method steps, since these components and methods may vary. The terms used here are merely intended to describe specific embodiments and are not used in a limiting manner. If, in addition, the singular or indefinite article are used in the description or in the claims, this also relates to the plurality of these elements, unless the broader context clearly indicates otherwise.

It is known from biology that sensor properties for example of arthropods (for example insects, spiders, caterpillars) can be determined. A localization of corresponding sensory appendages is also possible. This will be explained hereinafter:

The olfactory responses of an arthropod are triggered, for example, by the activation of olfactory sensory neurons (OSNs), which are mainly found, for example, on antennas, maxillary palps, mouth parts (consisting of proboscis and labellum) and tarsi. These sensory appendages can perceive very different extrinsic stimuli, such as volatile and non-volatile odors or pheromones, temperature, humidity, innocuous or harmful touch and gravity, to activate a complex set of different ways in which arthropods perceive stimuli. The perception of chemical stimuli, i.e. chemosensory perception, is based on chemosensory neurons that are selectively activated by various volatile compounds, such as scent molecules and pheromones. The molecular components underlying peripheral olfactory signal transmission comprise a number of intracellular and extracellular relationships. The complexity of the olfactory factors together with the different effects and/or diversity directly contributes to the stimulation of the specific behavior of the arthropod species. From a receptor-centered point of view, chemical sensor technology in arthropods is largely based on different representatives of three gene families, which are mainly expressed in OSNs, which in turn are located in specific sensilla on olfactory appendages: for example olfactory receptors (ORs), taste receptors (GRs) and ionotropic receptors (IRs). Odorous substances and chemical compounds cross the cuticle through sensillar pores and thus reach the aqueous sensillar lymph.

They are thus recognized and transported to their corresponding specific receptors on OSN-dendritic membranes. This is done by a diverse number of extracellular odorant binding proteins (OBPs) and pheromone binding proteins (PBPs), which are secreted by a network of accessory cells and are located at the base of the arthropod sensilla. There are different types of chemosensory receptors, which host the OSNs and other sensory neurons as well as the associated accessory cells, which in turn are distributed over the sensory appendages of the arthropod.

Figure 4:
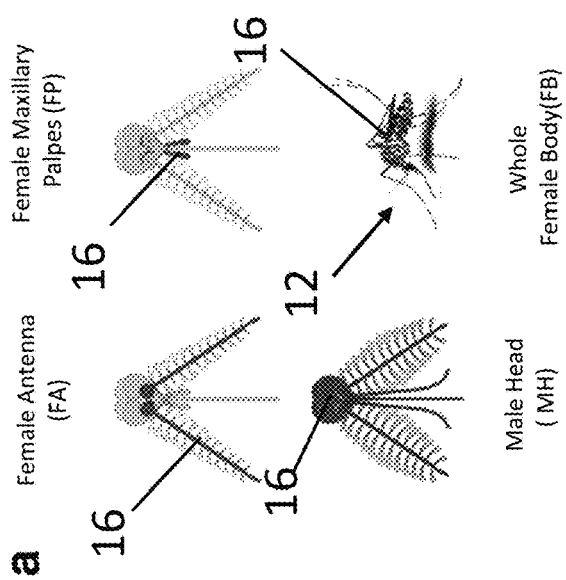
Figure 3:
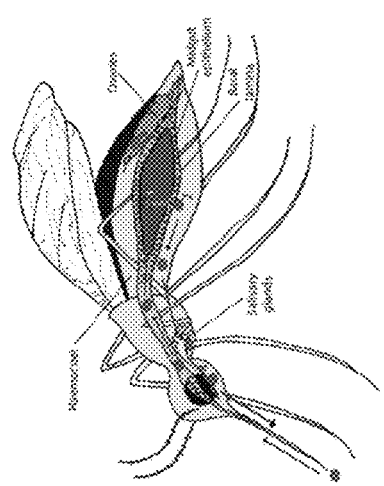

FIG. 4 shows examples of sensory appendages 16 of an arthropod 12: the female antenna, the female palps, the female body and the male head (from [1]). In principle there are also other and/or further sensory appendages 16 depending on the arthropod.

For example, Aedes aegypti is a highly anthropophilic arthropod, which is responsible for the transmission of dengue fever and yellow fever throughout the world. Similarly to other arthropods, the biting and host preference behavior of this disease carrier are largely influenced by the sense of smell, which is supposedly improved by G-protein-coupled receptor signal cascades. Reference is made here to the identification and characterization of AaOr7, the first or most important olfactory receptor in Ae. aegypti. This receptor shows an extremely high primary amino acid conservation with AgOr7, a further olfactory receptor which has been identified in Anopheles gambiae (malaria carrier in the Afrotropic), as well as a number of previously identified olfactory receptors in Drosophila melanogaster and other arthropods. This is reflected in adult chemosensory tissues and in a number of life and development phases of Ae. aegypti. Within the adult olfactory system, the AaOr7 protein is contained especially in most antenna and maxillary palp sensilla and also in a subset of proboscis sensilla. This coincides with the role of AaOr7 as an olfactory and taste sensor, which supports the hypothesis that AaOr7 and its orthology may be of significant importance for chemosensory processes during the entire life cycle of an arthropod.

Figure 6:
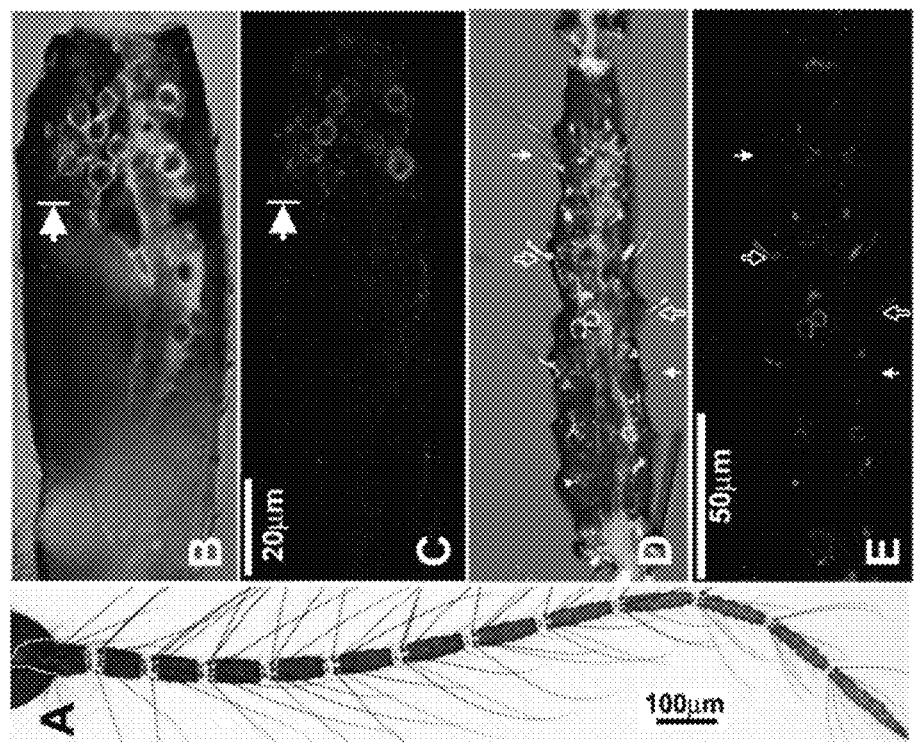
Figure 8:
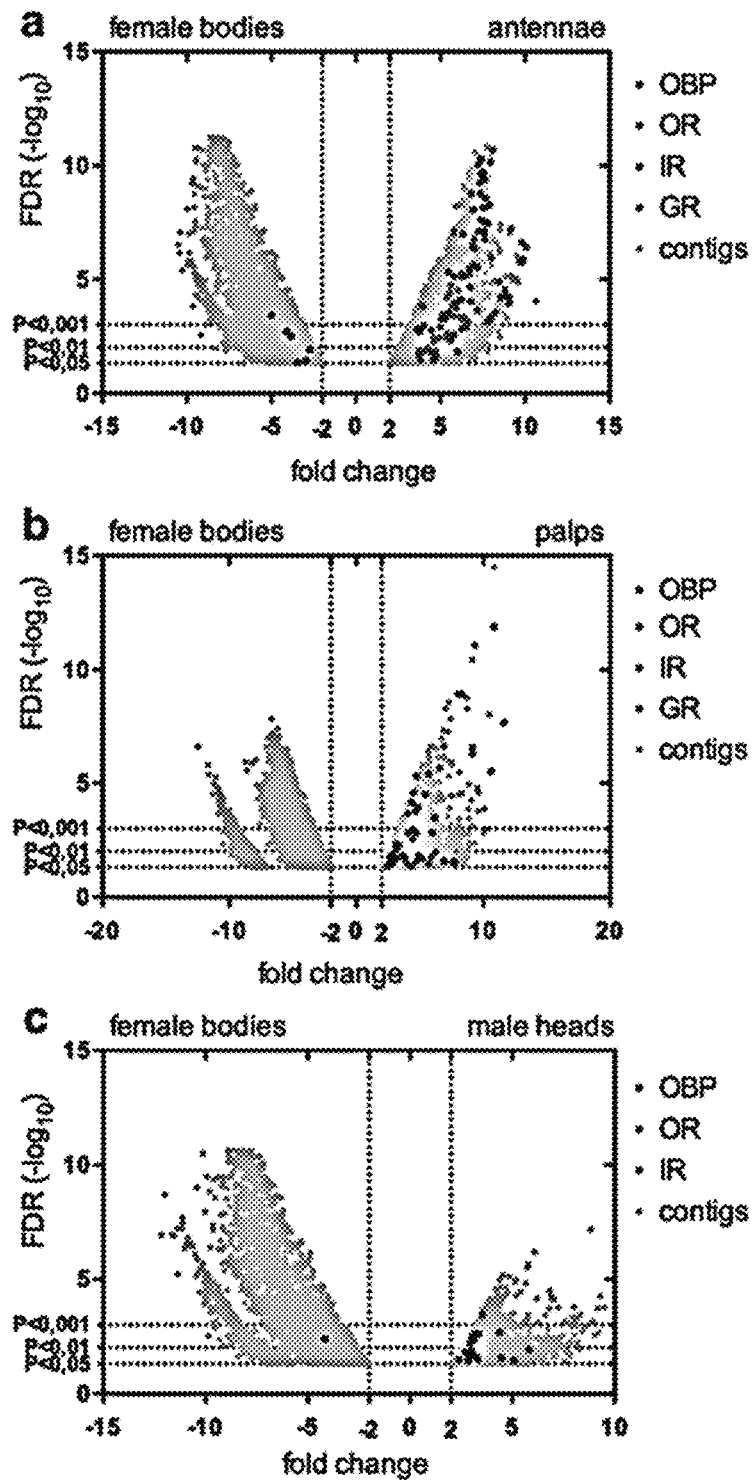
Figure 9:
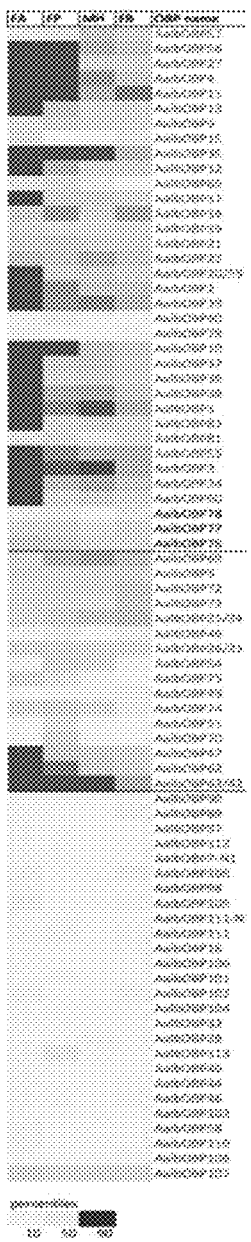
Figure 10:
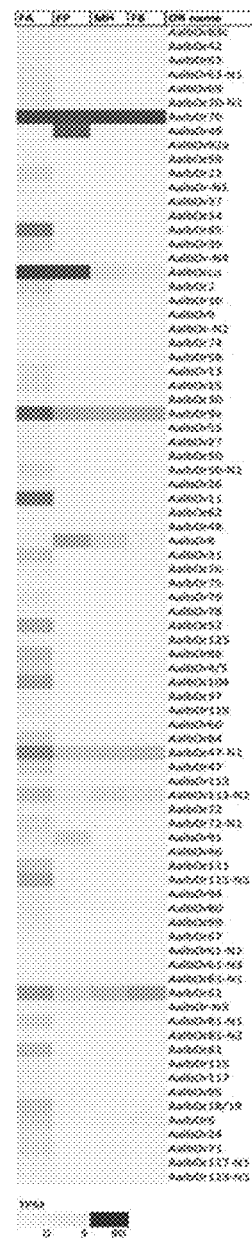
Figure 11:
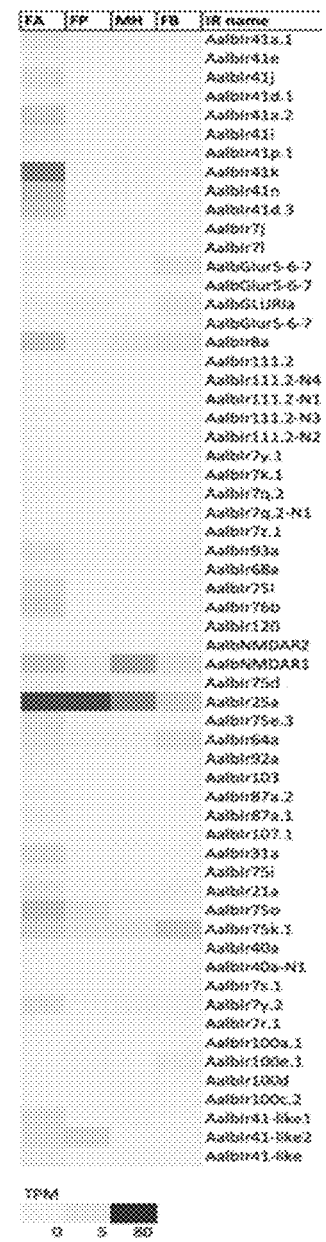
Figure 12:
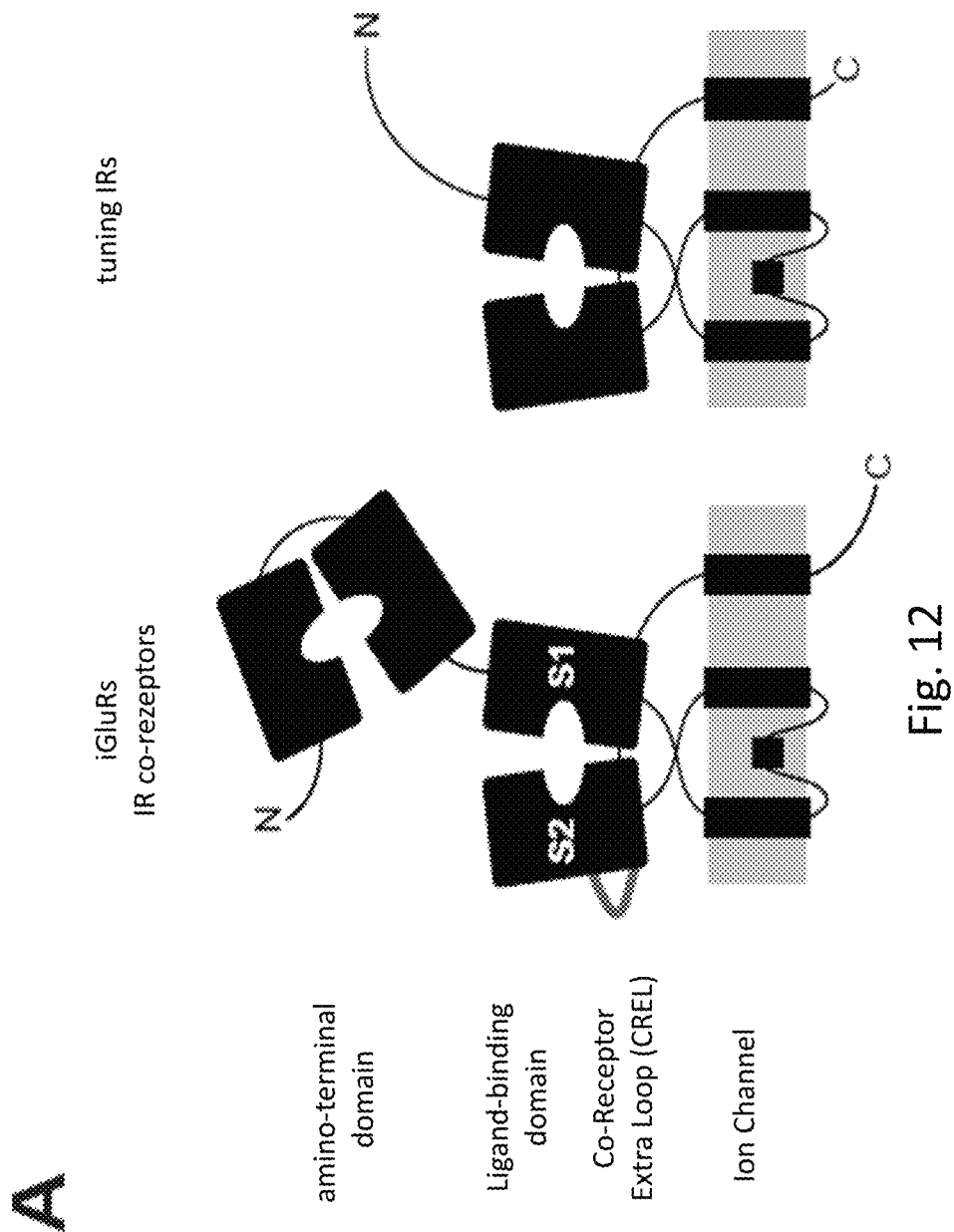
Figure 13:
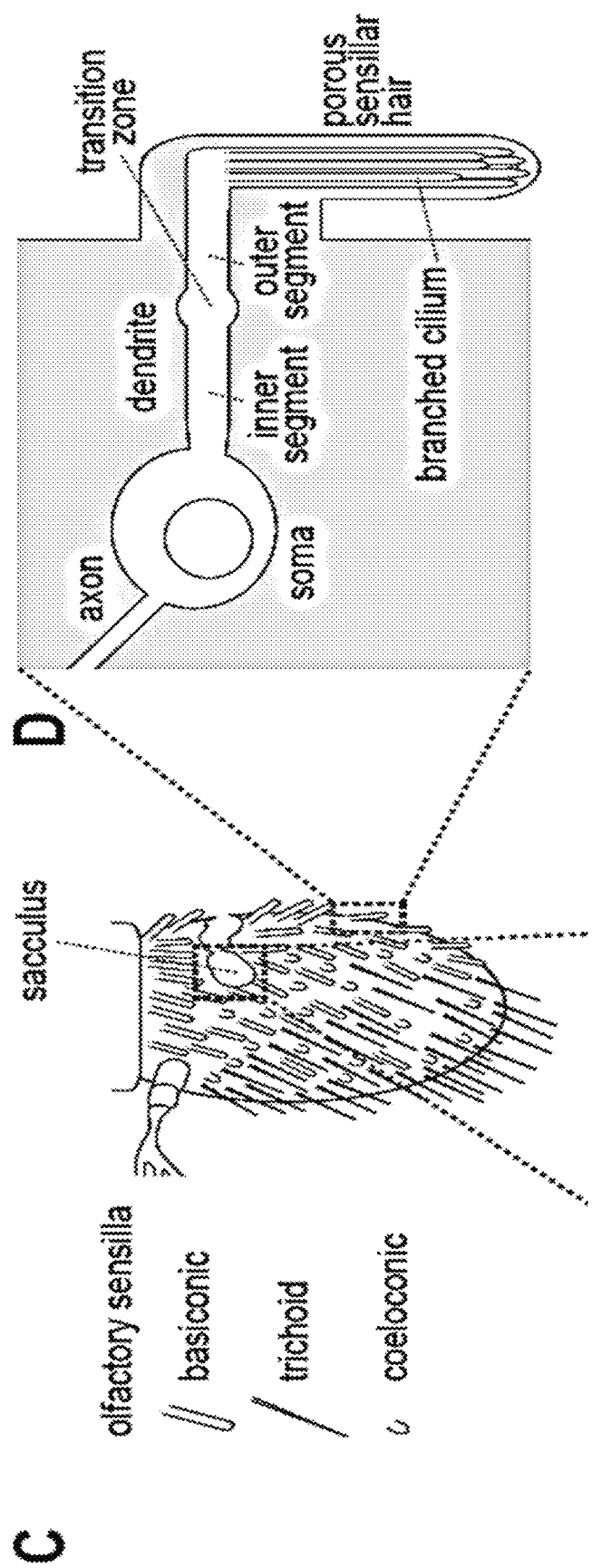
Figure 14:

FIGS. 6A to 6E show an antenna of a female Ae. Aegypti (see [4]), wherein FIGS. 6B and 6D show a combination of light microscopy image, AaOr7, neural and nuclear-specific marking, and FIGS. 6C and 6E show a corresponding individual image of the AaOr7-specific marking. In FIG. 6A the first flagellar segment of the female antenna is shown, wherein the AaOr7-specific marking is limited to the distal third (on the right, indicated by the arrow), in which a set of marked neural cell bodies and projecting dendrites can be seen. The AaOr7-specific marking was observed along the entire antenna (FIGS. 6B, 6C). In FIGS. 6D and 6E an example of a distal segment is shown. The AaOr7 marking is visible in dendrites which excite trichodic (hollow arrows in FIGS. 6D, 6E), but the grooved peg sensilla are not (solid arrows in FIGS. 6D, 6E).

Figure 7:
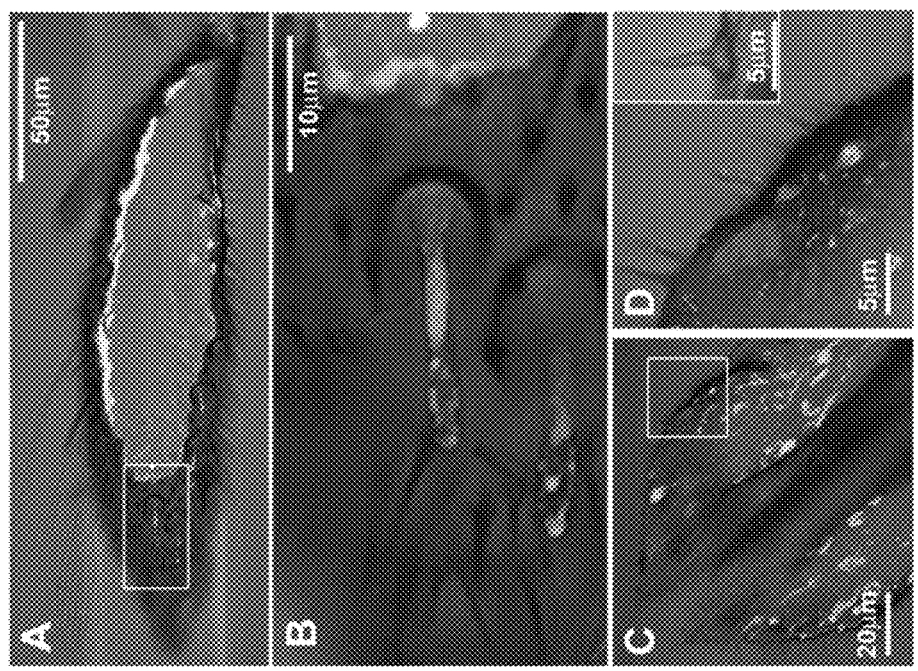

FIGS. 7A-7D show, similarly to FIGS. 6A-6E, a female maxillary palp of a female Ae. Aegypti (see [4]). FIGS. 7A and 7B show the AaOr7-specific marking on the female maxillary palp (capitate peg sensilla) and FIGS. 6C and 7D on the labial palp T2 sensilla. FIG. 7A shows a combined image with an AaOr7, neural and nuclear marking. FIG. 7B shows an enlarged view of the box in FIG. 7A. FIG. 7C shows a combined image of an optical portion (2 μm) of the tip of a female labial palp, where the marking, which is evocative of dendritic structures in these sensilla, is very weak, but can be seen reproducibly. FIG. 7D shows an enlarged view of the box in FIG. 7C.

A clear localization of an olfactory sensor or receptor to the antennae or palps of a female Ae. Aegypti can thus be seen from FIGS. 6A-6E and 7A-7D. In principle, such tests can also be performed on other arthropods, so that an assignment can be made on the basis of these tests.

Figure 15:
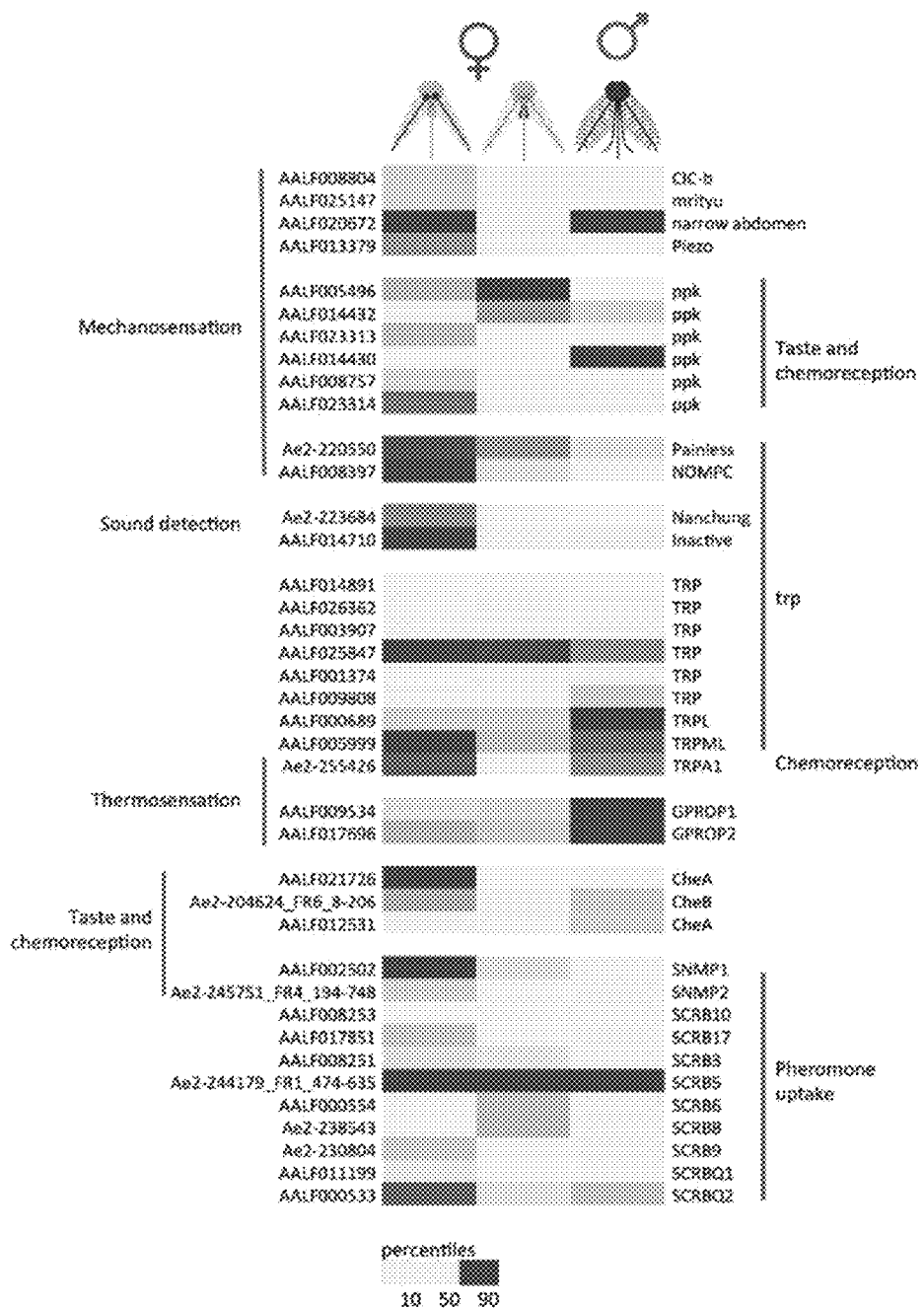
Figure 16:
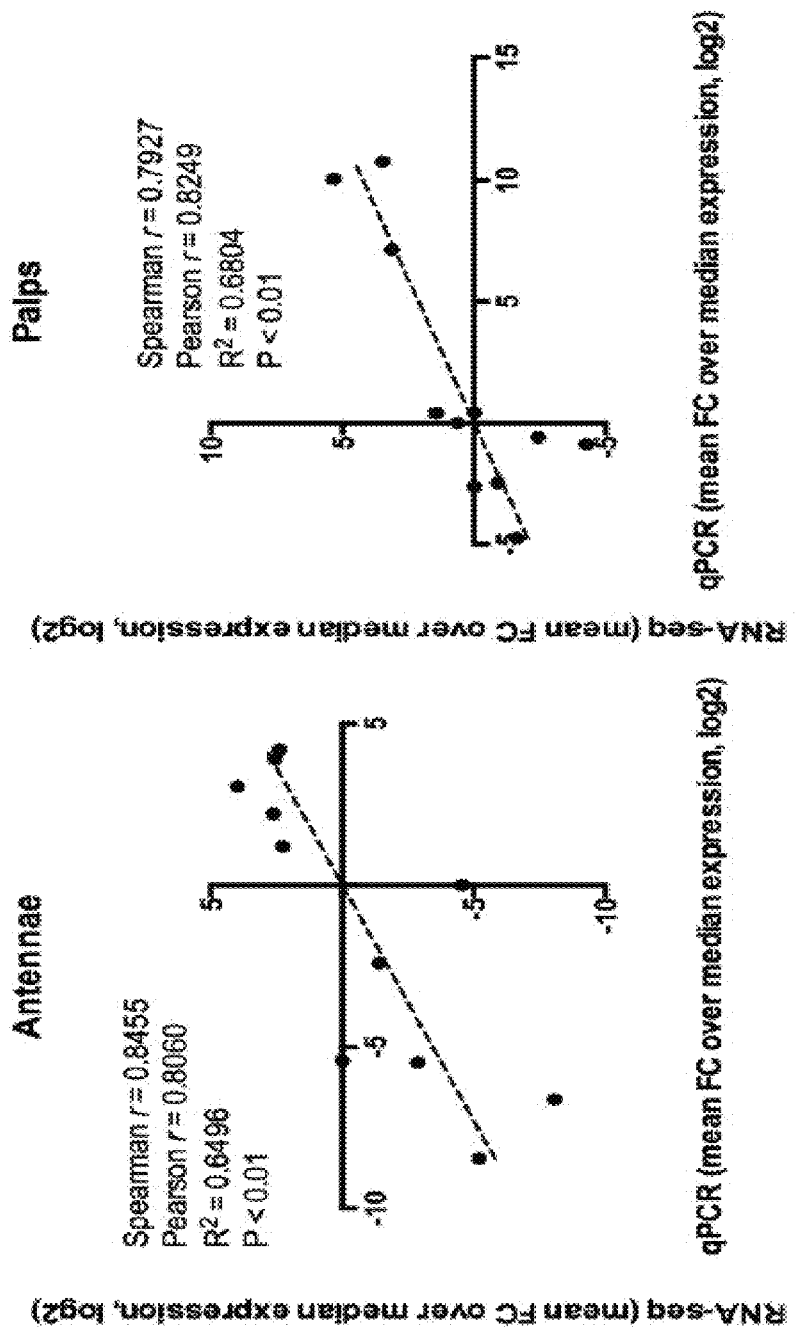
Figure 17:
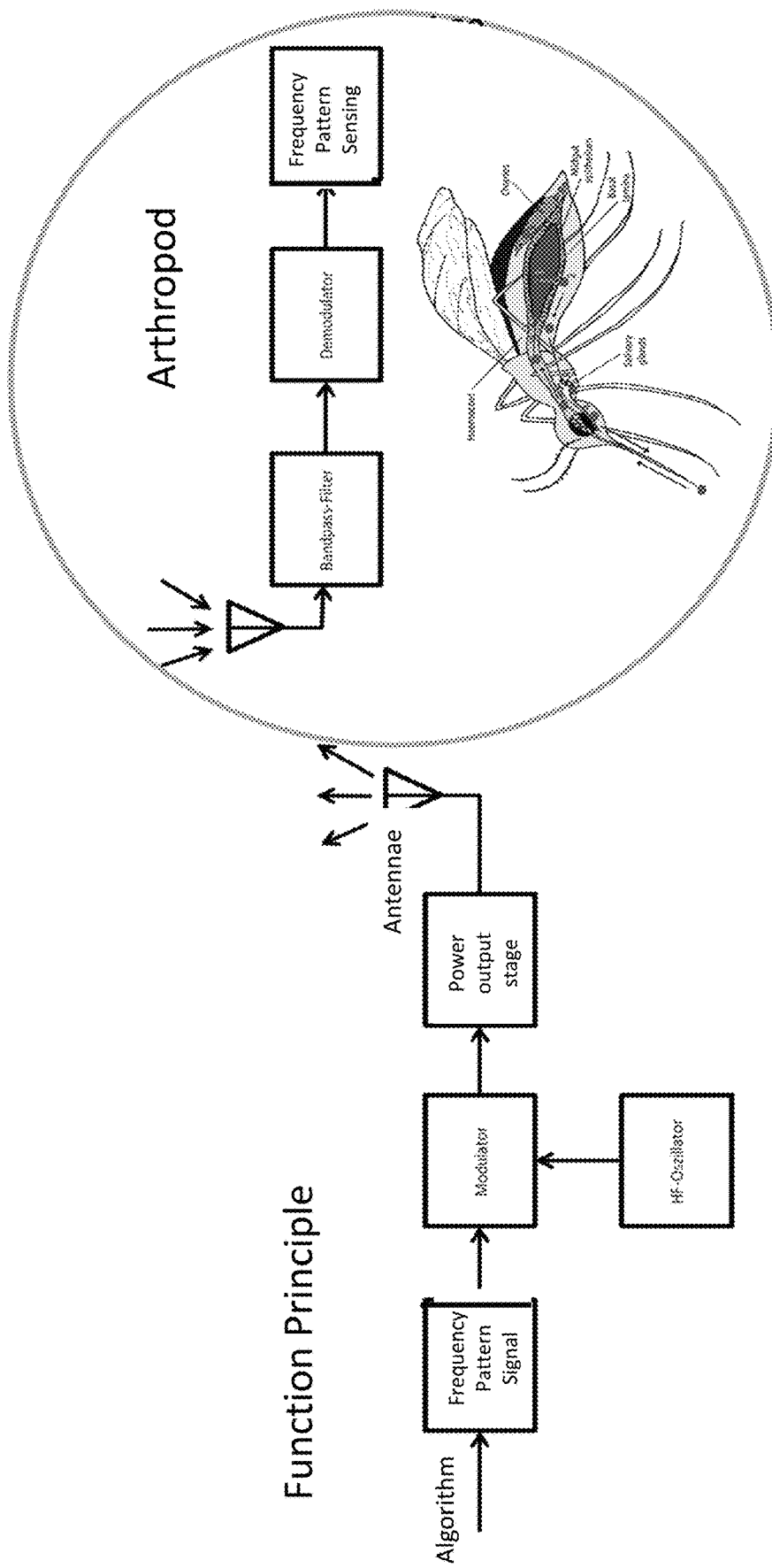

With the aid, for example, of a scoring model, odor-binding proteins (OBPs), olfactory receptors (OR) and ionotropic receptors (IR) can be analyzed, grouped and the data models simplified. With high TPM values, the assignment of the proteins and receptors responsible for the chemosensors can be analyzed. FIG. 15 shows frequency profiles of sensory genes in Ae. Albopictus, wherein the progression from dark to light indicates high to low TPM values. Gene name and Contig ID (VectorBase codes, if available) can also be seen. With the aid of the scoring model, an accurate localization and assignment of the individual sensory appendages to the corresponding physical and/or biochemical properties can thus be performed. As can be seen from FIG. 15, the female antennae for example are responsible for detecting noise, in contrast to the male antennae, which here has practically no sensitivity (fourth "block" in FIG. 15).

The sensory abilities of the arthropods 12 can be described, for example, also with discrete individual sensors. Physically speaking, a plurality of sensors with merged sensor properties is necessary in order to replicate the complex sensor structures of arthropods 12. The above-mentioned preliminary biological investigations have shown that there is a clear assignment of defined sensor and/or receptor properties to the sensory appendages 16 of the arthropods 12. Likewise, by means of the frequency profiles of sensory genes, there is a clear distribution between female and male. The physical sensors include, for example, ionization sensor of air or environment, taste sensors, chemo sensors, gas sensor/breath sensor, air quality sensor, $CO_2$ sensor, air pressure sensor, temperature sensor, humidity sensor, time of flight sensor, infrared sensor, UV sensor, accelerometer, sound sensor, position and distance measurement and also further sensors.

Figure 49:
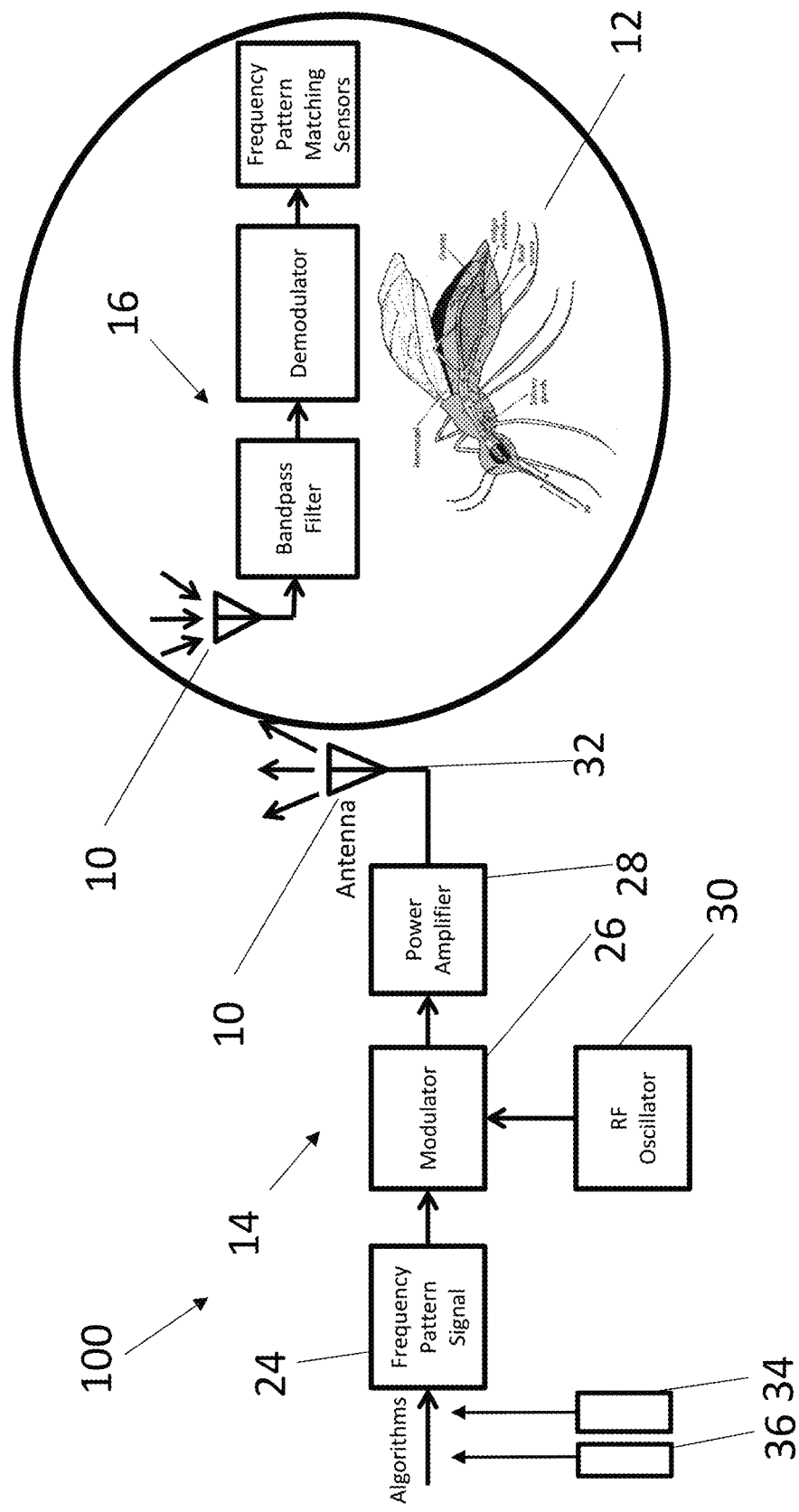

FIG. 49 shows the fundamental functional principle for influencing arthropods 12 by means of electromagnetic radiation 10. Here, the electromagnetic radiation 10 is radiated by a transmitter 14. The arthropod 12 receives the electromagnetic radiation 10, which is matched with the different sensory appendages 16, for example antennae, palps, head and body and other sensory appendages 16 and/or sensory properties. The electromagnetic radiation 10 disrupts or influences the sensory functions of the sensory appendages 16 and thus also the behavior of the arthropod 12. For example, the sensory appendages 16 of the arthropod 12, which have different physical and/or biochemical properties, are firstly localized from biology.

Due to the multiple sensory properties and the physical and/or biochemical functions thereof, different signals and/or signal patterns, for example frequency patterns, are necessary in order to stimulate, as far as possible, all sensory properties of the arthropods 12. These frequency patterns can be transmitted, for example, either at the same time, simultaneously, or sequentially, one after the other. For example, the topology and the physical build of the arthropod 12 is key here for which sensory appendages 16 and/or sensory properties are to be stimulated. For stimulation of the different types of arthropods, different frequency patterns in the form of different characteristics 18 of the electromagnetic radiation 10, for example of different time progressions of the electromagnetic radiation, are necessary. The characteristic of the electromagnetic radiation can be dependent here on various factors, for example a temporal, a spatial or a frequency-based dependency are conceivable. In principle, however, further factors by which electromagnetic radiation can be described and/or characterized are conceivable.

Figure 18:
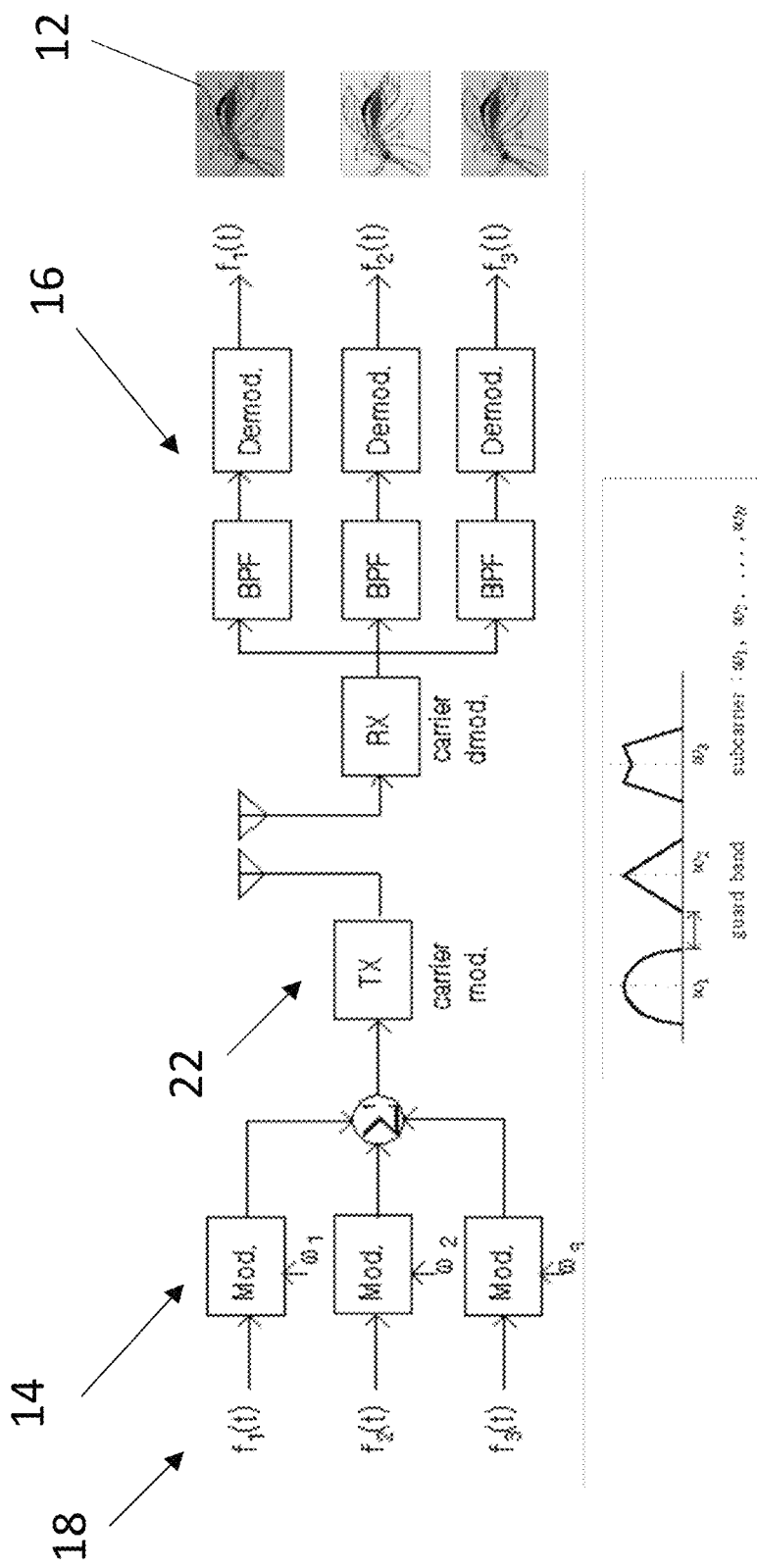

In FIG. 18 the simplified principle for different types of arthropods 12 and different stimulation of the sensory appendages 16 is shown. Here, for example, an arbitrary number n of characteristics 18, for example a time progression of the electromagnetic radiation 10 with an arbitrary number of modulation frequencies, are generated (FIG. 19). This results in any number of possibilities for generating different stimulation signals for the characteristic 18 of the electromagnetic radiation 10. In principle, it is also conceivable that the characteristics 18 of the electromagnetic radiation 10 are not modulated. In FIG. 18 the corresponding characteristic 18 of the electromagnetic radiation 10 is received depending on the arthropod or sensory appendage 16 and/or sensory property and influences the behavior of the arthropod 12.

Figure 45:
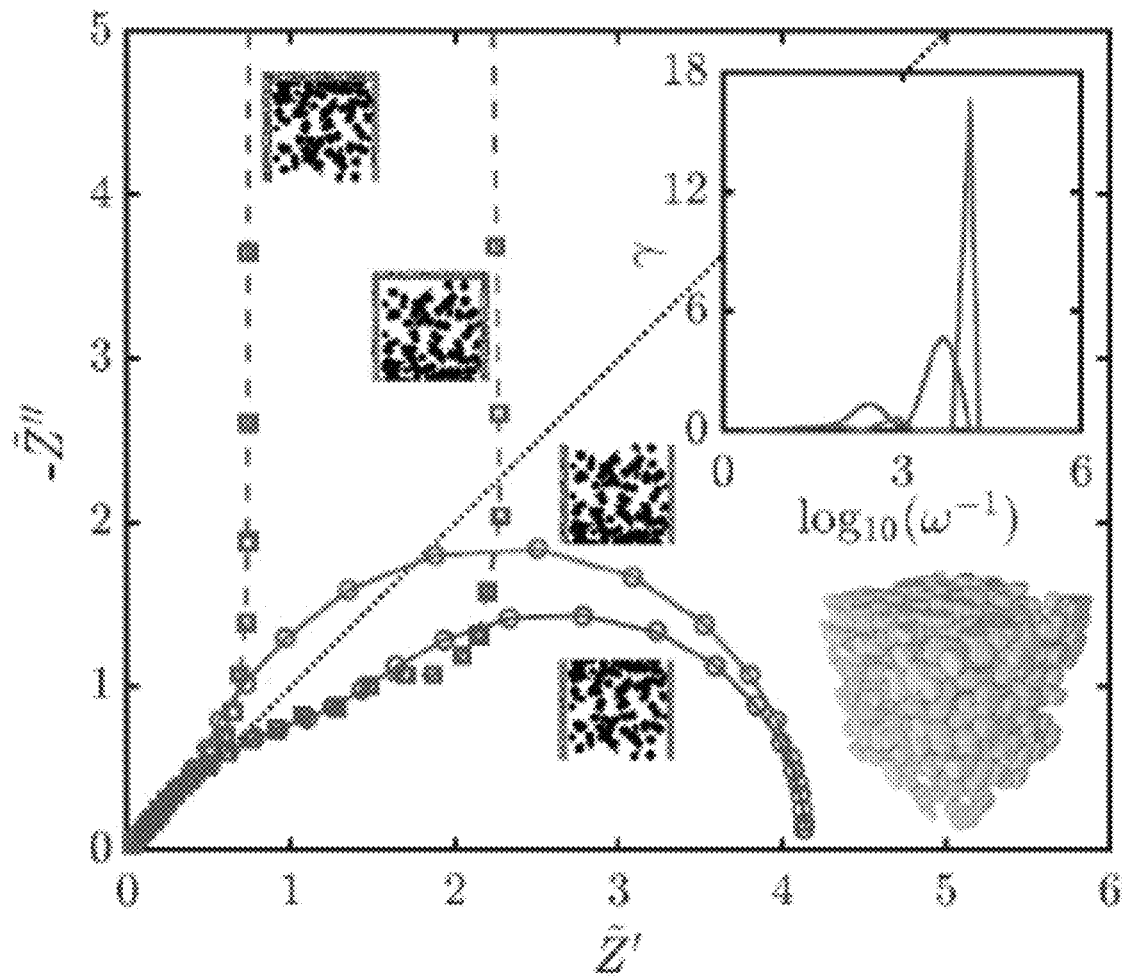
Figure 46:
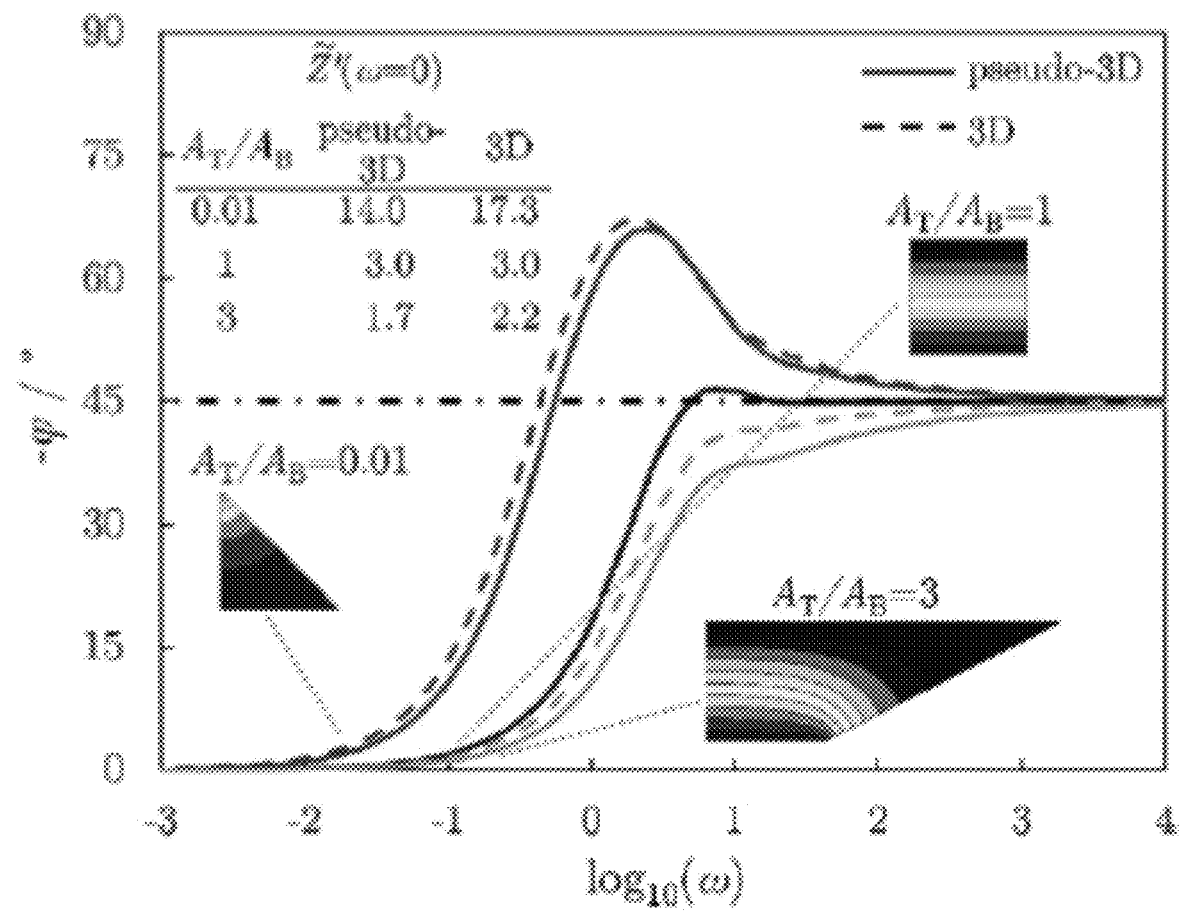

With the physical and/or biochemical results obtained previously from biology, the sensory appendages 16 are broken down for example into their physical, biochemical, topographic and tomographic properties, followed by the transformation of physical and/or biochemical processes into equivalent circuits (ECMs). Here, each ECM is assigned, for example, the topological, tomographic, physical and/or biochemical processes within the arthropods 12 (see for example FIG. 27 and FIGS. 27a to d). These include, for example, porous electrodes, porous material, material parameters of porous material, description of electrode behavior, brush electrodes, diffusion of substances and processes, ionization in substances and processes or further electrochemical processes. FIG. 45 shows the impedance spectrum and also the DRT spectrum for different tomographic and topographic properties, in particular the characteristic properties of the impedance spectrum for open and closed structures. The equivalent circuit can thus be considered as a model of an arthropod.

The model in turn describes at least one sensory appendage 16 and/or at least one sensory property of the arthropod 12. A characteristic 18 of an electromagnetic radiation 10, by means of which characteristic the arthropod can be influenced, can then be determined with the aid of the model and/or the equivalent circuit. In principle, it is conceivable that the model also describes the complete arthropod 12 or all sensory appendages 16 and/or sensory properties of the arthropod 12. It is also conceivable that the model describes two or more, for example, different arthropods 12 and/or arthropod types or their sensory appendages and/or sensory properties. For simplification, in a preferred exemplary embodiment, the model is divided into at least one sub-model which describes at least one sensory appendage and/or at least one sensory property of the arthropod. For example, the antenna of the arthropod 12 can be described with one sub-model, whereas the sensilla hairs of the arthropod 12 can be described with another sub-model. In principle, any number of sub-models can be used.

In a particularly preferred exemplary embodiment, the at least one model or sub-model is assigned at least one of the following physical and/or biochemical effects of the sensory appendages and/or sensory properties of the arthropod 12:
  a model of a brush electrode, which is a model of the antennae of the arthropod,
  a model of a porous electrode, which is a model of the porous sensilla hairs of the arthropod,
  a model of general diffusion, which describes the ion diffusion,
  a model of the diffusion of a non-permeable wall (NPW),
  a model of the diffusion of an ideal reservoir,
  a model for calculating the tortuosity factor from tomographic data of the surface and/or the inner structure of the arthropod,
  a model for calculating the tortuosity factor from topographic data of the surface and/or the inner structure of the arthropod.

In principle, however, further assignments of physical and/or biochemical effects of the sensory appendages of the arthropod 12 to models or sub-models are conceivable.

Figure 27:
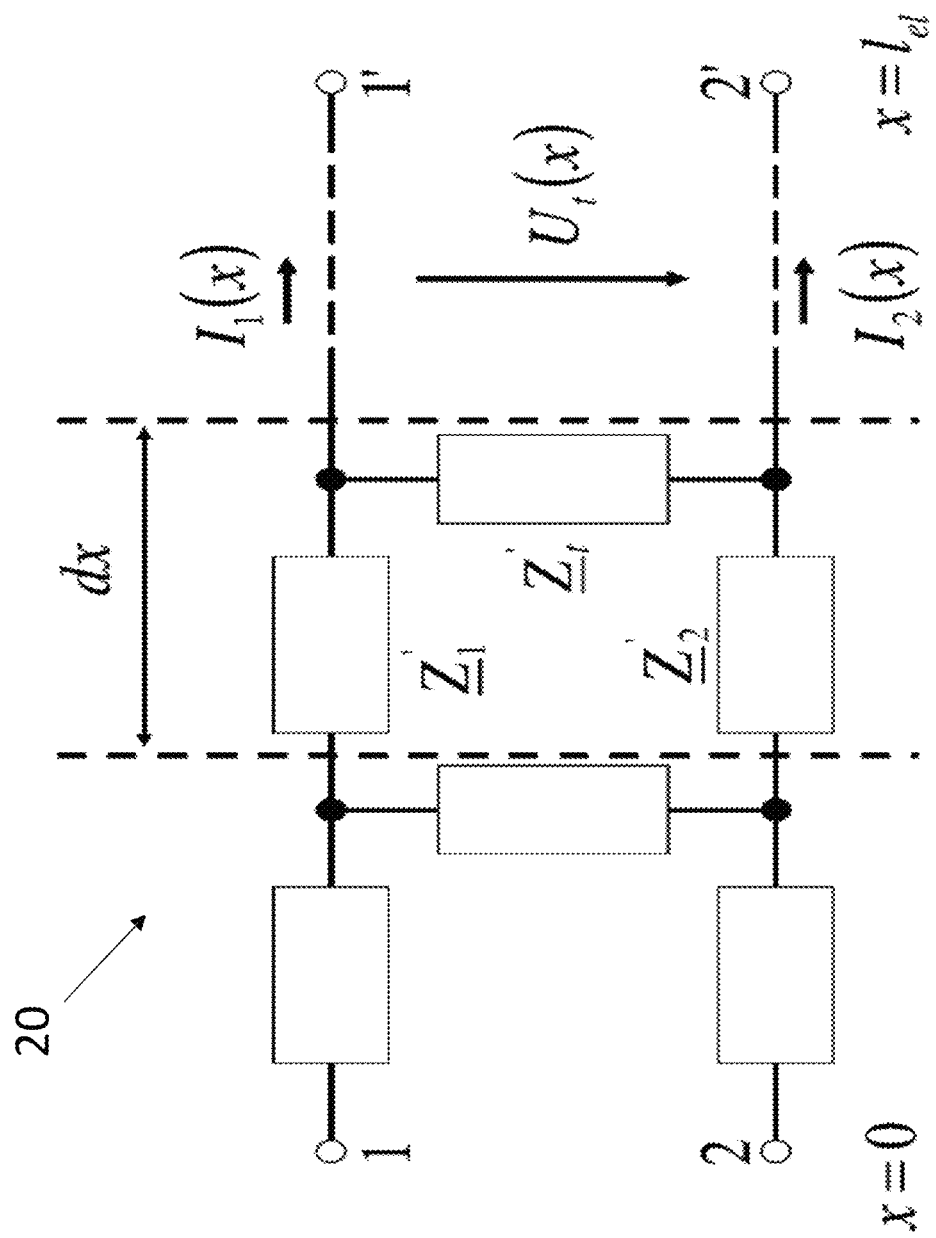

In a further particularly preferred exemplary embodiment at least one transmission line model (TLM) 20 is used to generate the equivalent circuit. FIG. 27 shows a general TLM 20. With the use of the TLM 20, any equivalent circuits can be generated, because for example for the individual complex elements $\underline{Zx}$, boundary conditions can also be assumed (for example $\underline{Zx}=0$ or $\underline{Zx}=\infty$).

In order to model complex systems, in a further exemplary embodiment at least two or more equivalent circuits can be connected in series. Due to the series connection, the results of the models are additionally more accurate. In principle, any number of equivalent circuits can be connected in series. Examples of condensed ECMs are constant phase elements (CPEs) and Infinite Voigt circuits.

In a preferred exemplary embodiment, at least one boundary condition is used with the TLM 20 in order to describe the model of the arthropod 12. In the mentioned Table 4, examples for boundary conditions for the TLM in FIG. 27 are shown.

TABLE 4

| x = 0 | | | x = $l_{el}$ | | | |
|---|---|---|---|---|---|---|
| $I_1$ | $I_2$ | $U_t$ | $I_1$ | $I_2$ | $U_t$ | Physical effect |
| $I_0$ | 0 | $0^a$ | $I_0$ | | | Porous electrode, e.g. [2,25] |
| $I_0$ | 0 | | | | $0^a$ | Porous material e.g. [13] |
| $I_0$ | $-I_0$ | $U_t(l_{el})_t/Z_{l\ el}$ | | | | Ion diffusion, electron conduction in cables |
| $I_0$ | $-I_0$ | 0 | | | $0^a$ | Diffusion, non-permeable wall (NPW) |
| $I_0$ | $-I_0$ | $-I_2{}^a$ | | | $-I_1{}^a$ | Diffusion, ideal reservoir (IR) |

$^a$This must be the result after calculating the integration constants

For example, the boundary conditions for a porous electrode which is a model of the porous sensilla hairs is, for x=0: $I_1=I_0$, $I_2=0$; for $x=l_{el}$: $I_1=0$, $I_2=I_0$. In principle, further boundary conditions are also possible depending on the model. It is additionally also possible to model the sensory appendages 16 and/or sensory properties described by the model of the arthropod 12 with boundary conditions of the TLM 20.

Furthermore, the boundary condition can have at least one boundary consideration of at least one impedance, for example towards zero and/or towards infinity, whereby the TLM 20 is converted into a simplified equivalent circuit. For example, the otherwise (complex) equivalent circuit can thus be simplified, whereby solutions can be found more quickly and more easily.

Figure 43:
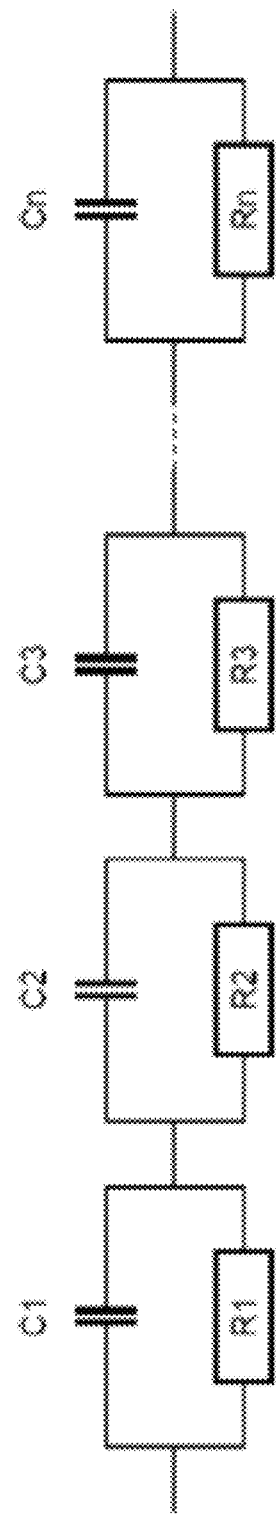
Figure 44:
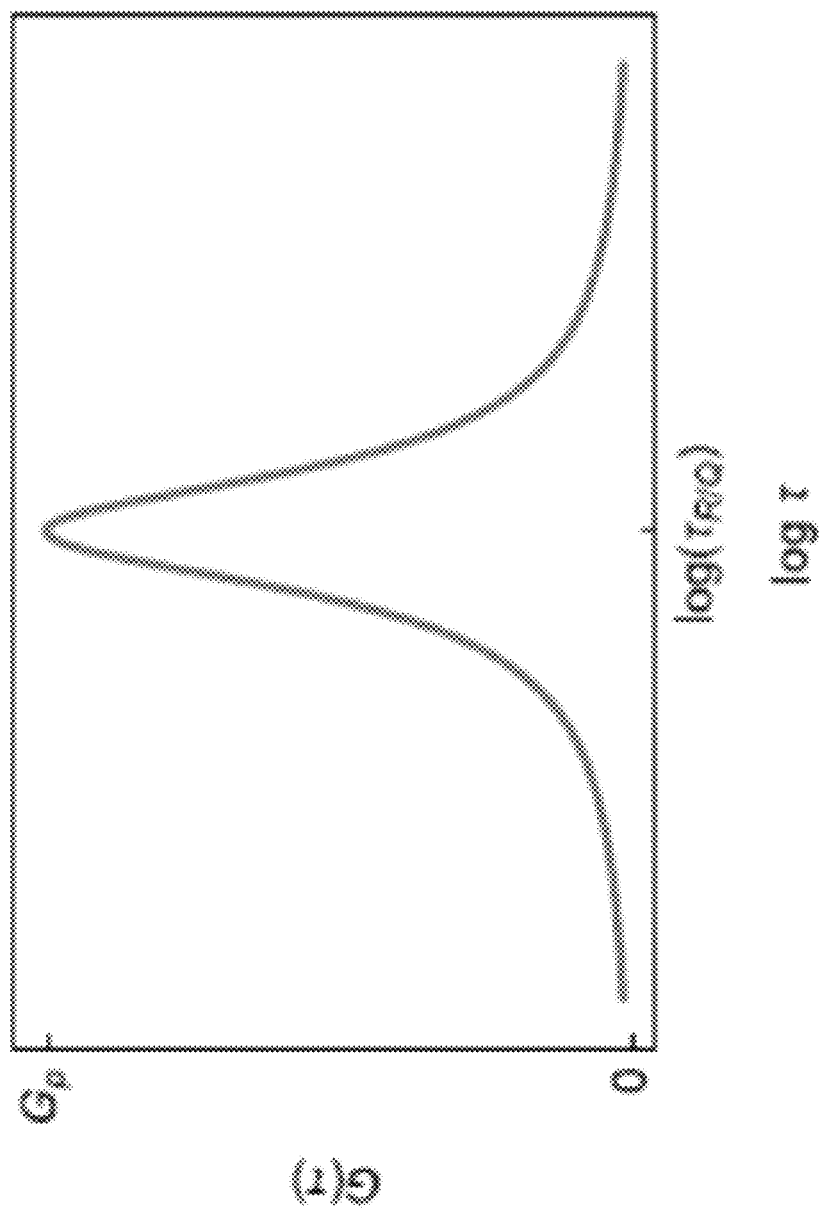

In a further exemplary embodiment, it is conceivable to determine at least one impedance spectrum with the aid of the simplified equivalent circuit. Simplified equivalent circuits, such as Infinite Voigt models, can then be used, for example, for determination of impedance spectra from empirically determined data. For example, FIG. 45 shows an impedance spectrum and a DRT spectrum for different tomographic and topographic properties; in particular the characteristic properties of the impedance spectrum for open and closed structures are shown. In order to determine an impedance spectrum from an ECM, there is, for example, the method of distribution of relaxation times (DRT). The DRT method does not presuppose any model assumptions, but merely an infinitely long Voigt network (R parallel C) (FIG. 43) for mapping all time constants. With this approach, it is possible to map all linear time-invariant (LTD-compliant spectra. The DRT method is a search for correlations in the spectrum of the specimen with the relaxation behavior of an RC parallel circuit with the time constant $\tau=RC$. If such a behavior is present, the DRT method would thus indicate a Dirac pulse at the associated limit frequency. Since the signal, however, must be filtered from the image domain before the back-transformation, for example by means of fast Fourier transform (FFT), there is a distribution of the time constants of the relaxation processes even in the event of a perfect correlation in the DRT method. If this distribution in a logarithmic application is above the frequency $f=(2\pi\tau)^{-1}$ asymmetrically to the maximum, a further process in the vicinity off can be assumed.

In a further preferred exemplary embodiment, the impedance spectrum is determined with the aid of tomographic and/or topographic data for more accurate results. For example, the tomographic and/or topographic data can originate from corresponding publications. FIGS. 35 to 39 show, for example, impedances for specific tomographic and topographic pore structures. For example, impedance spectra can be created from empirical ECMs and tomographic and/or topographic data.

Figure 29:
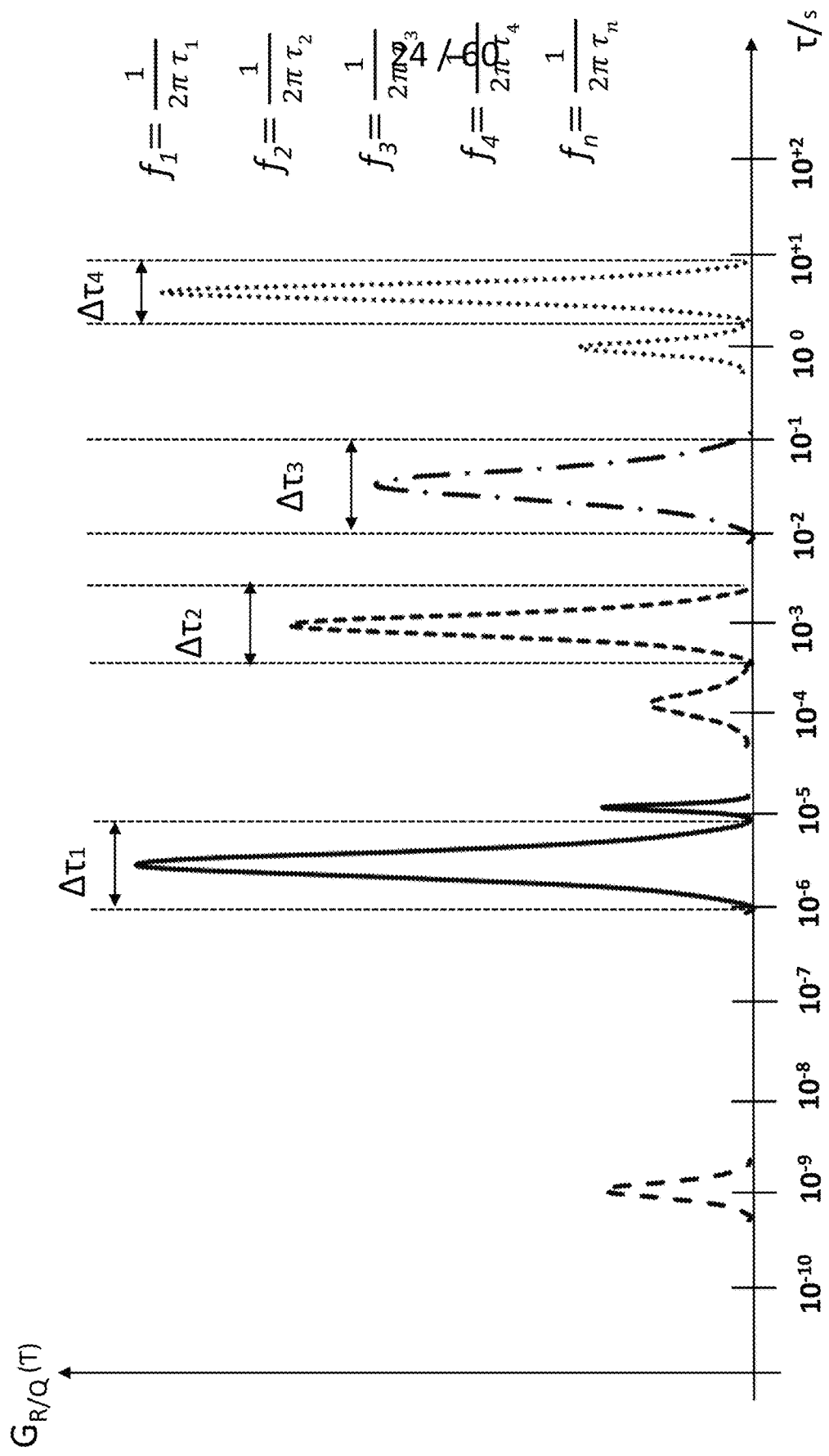
Figure 30A:
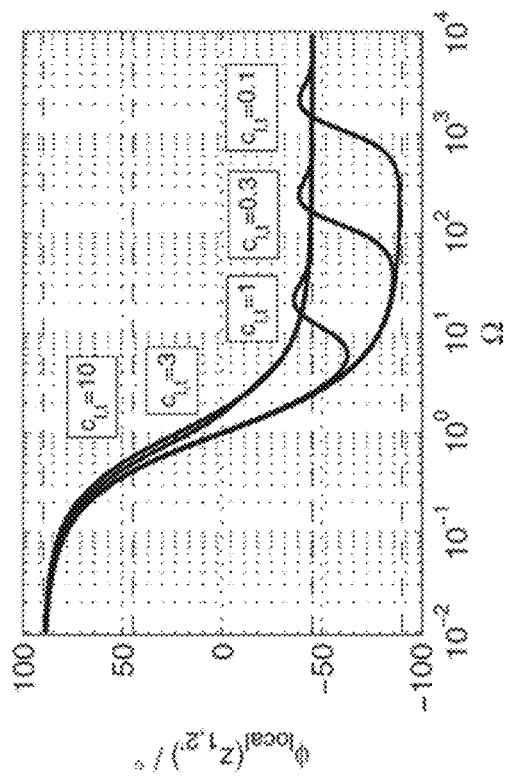
Figure 30B:
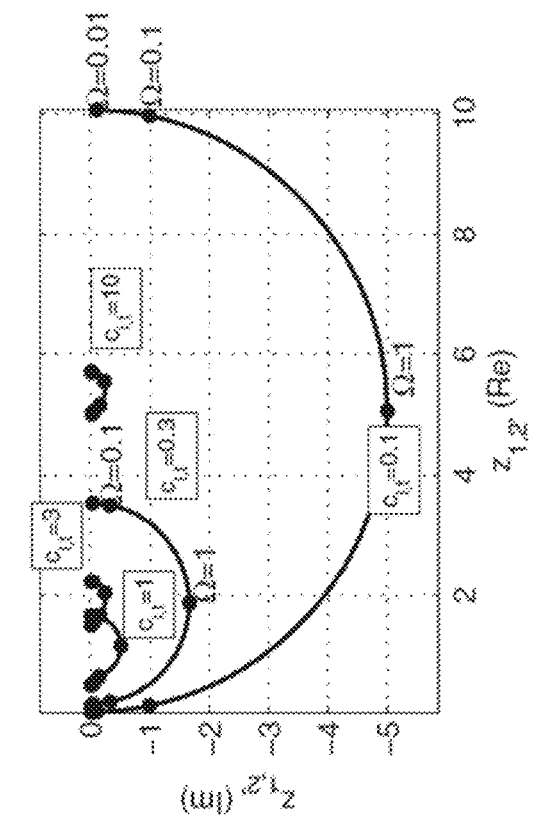
Figure 30C:
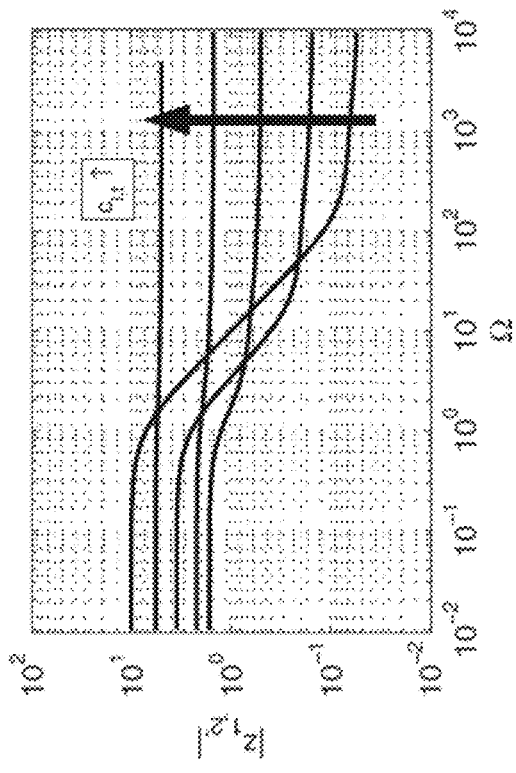
Figure 30D:
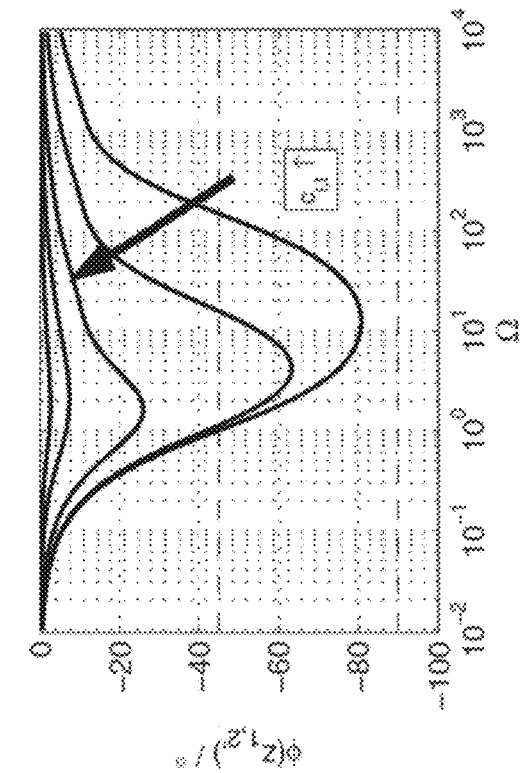

In a particularly preferred exemplary embodiment, it is possible, for an advantageous targeted influencing of the arthropod, to determine, with the impedance spectrum and at least one analysis, for example a DRT analysis (distribution relaxation time constant), at least one parameter of the characteristic 18 of the electromagnetic radiation 10, for example at least one characteristic frequency and/or time constant. In FIG. 29 a plurality of time constants tau and associated frequencies are shown. In principle, however, other parameters, such as voltage, current or time progression are also conceivable. For example, it is thus conceivable that characteristic frequencies for influencing the behavior of arthropods are determined with the aid of the analysis, for example the DRT analysis, from an empirical ECM, such as an Infinite Voigt model.

To provide an advantageously improved influencing, at least one new parameter (for example excitation frequencies) is derived, for example with a DRT analysis (FIG. 50), with the aid of the at least one parameter of the characteristic (for example a characteristic frequency and/or time constant), for example from this parameter, in order to generate at least one new impedance spectrum and in order to derive therefrom at least one new TLM. For example, it is possible to create an ECM of the sensory appendages of the arthropods from the DRT spectrum and the relaxation behavior with characteristic settling times and to determine further characteristic frequencies and/or time constants with the aid of the DRT analysis in order to derive therefrom new excitation frequencies in order to in turn generate herefrom new impedance spectra and in order to derive therefrom new structured TLMs.

In a further preferred exemplary embodiment, the TLM 20 comprises at least one of the following divided TLMs 20:
TLM for the porous electrode,
TLM for porous material,
TLM for general diffusion,
TLM for diffusion in non-permeable walls and an ideal reservoir.

Figure 27A:
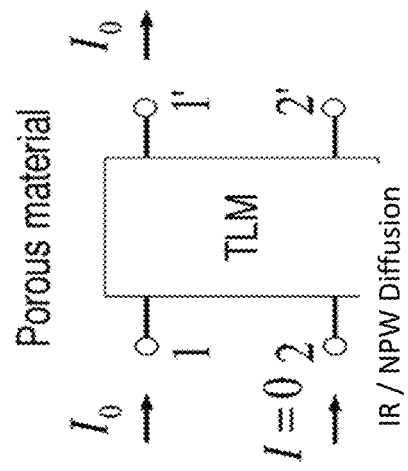
Figure 27C:
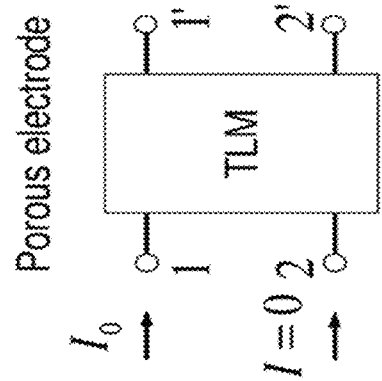
Figure 27B:
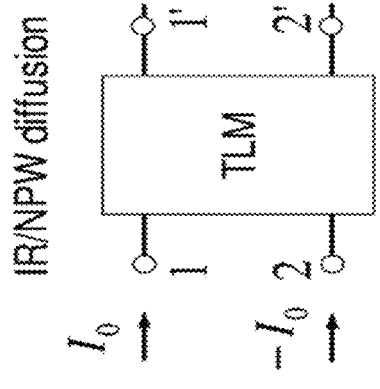
Figure 27D:
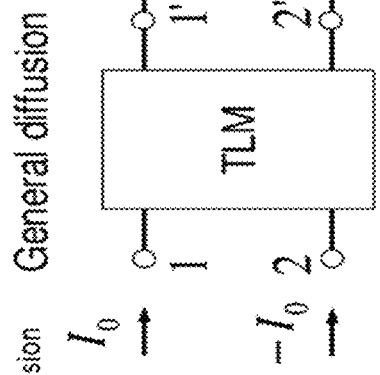
Figure 28:
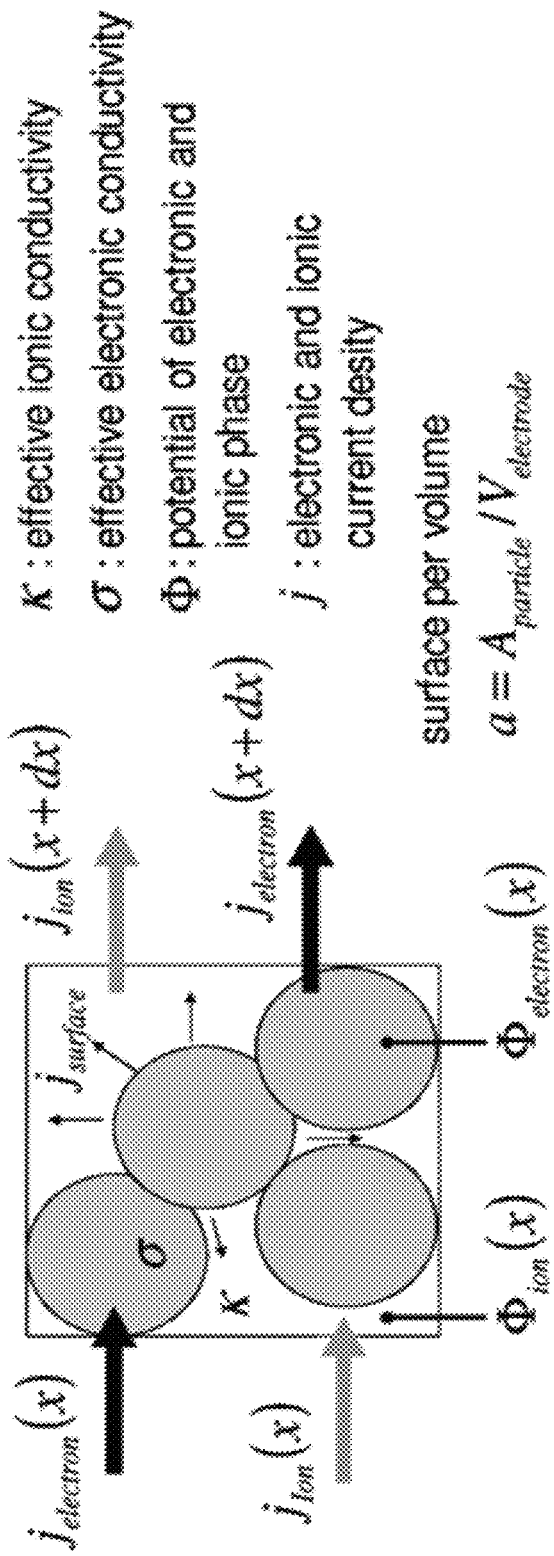

FIGS. 27a-27d show, by way of example, the various TLM for different physical and/or biochemical effects. FIG. 27a shows the TLM for the porous electrode. FIG. 27b shows the TLM for porous material. FIG. 27c shows the TLM of general diffusion. FIG. 27d shows the TLM for diffusion of the non-permeable wall and the ideal reservoir. For example, it is also possible to combine a plurality of physical and/or biochemical effects in a TLM (see for example FIG. 27d). In FIG. 27d the diffusion of the non-permeable wall and the ideal reservoir is combined in one TLM.

TLMs 20 are described generally for example by a differential equation. In a further preferred exemplary embodiment at least one differential equation of the TLM 20 is solved to determine parameters for the characteristic 18 of the electromagnetic radiation 10. Equation 23 shows the solution to the general TLM from FIG. 27.

$$I_1 = I_1(x+\Delta x) + U_t(x)\underline{Y}_t'\Delta x$$

$$I_2(x+\Delta x) = I_2(x) + U_t(x)\underline{Y}_t'\Delta x$$

$$0 = U_t(x) + I_2(x)\underline{Z}_2'\Delta x - U_t(x+\Delta x) - I_1(x)\underline{Z}_1'\Delta x \quad \text{equation 23}$$

With equation 23, for example, the values of the system represented in equation 24 are determined, $$I_1(x) = G_1 \frac{Z_2'}{Z_1'} + \frac{C_2 e^{-x\underline{\gamma}} - C_3 e^{x\underline{\gamma}}}{Z_t' \underline{\gamma}} \quad \text{equation 24}$$

$$I_2(x) = C_1 - \frac{(C_2 e^{-x\underline{\gamma}} - C_3 e^{x\underline{\gamma}})\underline{\gamma}}{Z_1' + Z_2'}$$

$$U_t(x) = C_2 e^{-x\underline{\gamma}} + C_3 e^{x\underline{\gamma}}$$

wherein a complex delay constant is defined in equation 25.

$$\underline{\gamma} = \sqrt{\frac{Z_1' + Z_2'}{Z_t'}} \quad \text{equation 25}$$

The used symbols and their unit have the following meanings.

| Symbol | Unit | Meaning |
|---|---|---|
| $\underline{Z}_1'$, $\underline{Z}_2'$ | [Ω/m] | Complex longitudinal impedance (corresponding admittance: $\underline{Y}_{1/2}' = 1/\underline{Z}_{1/2}'$) |
| $\underline{Z}_t'$, $\underline{Z}_2'$ | [Ω m] | Complex transverse impedance (corresponding admittance: $\underline{Y}_t' = 1/\underline{Z}_t'$) |
| $Z_{l_{el}}$ | [Ω] | Resistance at the end of transmission line |
| $l_{el}$ | [m] | Length of electrode or thickness of material |
| $U_t$ | [V] | Voltage between media 1 and media 2 across the transverse impedance |
| $I_1, I_2$ | [A] | Currents in longitudinal direction through media 1 and media 2 |
| $I_0$ | [A] | Current applied to the porous material |
| $\underline{\gamma}$ | [1/m] | Complex propagation constant |
| $C_1$ | [A] | Integration constant |
| $C_2, C_3$ | [V] | Integration constants |

For example, it is thus possible to determine the undetermined integration constants $C_1$, $C_2$ and $C_3$ with the boundary conditions from Table 4.

In a further preferred exemplary embodiment, the differential equation is solved by means of at least one boundary condition. For example, the TLM of the porous electrode in equation 26 can be solved in that the boundary conditions for the porous electrode from Table 4 are used to solve the TLM in FIG. 27 or the differential equations in equation 23.

$$Z_{1,2'} = \frac{l_{el}}{(1/Z_2') + (1/Z_1')}\left(1 + \frac{2 + ((Z_1'/Z_2') + (Z_2'/Z_1'))\cosh(l_{el}\underline{\gamma})}{l_{el}\underline{\gamma}\sinh(l_{el}\underline{\gamma})}\right) \quad \text{equation 26}$$

For the impedance, the graphical solutions shown in FIGS. 30a-30d are then obtained for different integration constants, wherein in this example C2=1. Accordingly, the impedance solution in equation 27 is achieved for the porous material.

$$Z_{1,2'} = \frac{l_{el}}{(1/Z_2') + (1/Z_1')}\left(1 + \frac{2 + ((Z_1'/Z_2') + (Z_2'/Z_1'))\cosh(l_{el}\underline{\gamma})}{l_{el}\underline{\gamma}\sinh(l_{el}\underline{\gamma})}\right) \quad \text{equation 27}$$

For the general diffusion, the impedance shown in equation 28 is achieved, $$Z_{1,2} = \frac{Z_1'Z_{l_{el}} + Z_2'Z_{l_{el}} + Z_1'Z_t'\tanh(l_{el}\underline{\gamma})\underline{\gamma} + Z_2'Z_t'\tanh(l_{el}\underline{\gamma})\underline{\gamma}}{Z_1' + Z_2' + Z_{l_{el}}\tanh(l_{el}\underline{\gamma})\underline{\gamma}} \quad \text{equation 28}$$

wherein, in this case with $Z_2=0$, the solution of the impedance shown in equation 29 is achieved.

$$Z_{1,2} = \frac{Z_1'Z_{l_{el}} + Z_1'Z_t'\tanh(l_{el}\underline{\gamma})\underline{\gamma}}{Z_1' + Z_{l_{el}}\tanh(l_{el}\underline{\gamma})\underline{\gamma}} \quad \text{equation 29}$$

For the diffusion of the non-permeable wall and the ideal reservoir, the solutions of impedance shown in equations 30 and 31 are achieved, $$z_{1,2,SHORT} = \frac{Z_{1,2,SHORT}}{Z_{N,diff}} = \frac{\tanh(\sqrt{j\Omega})}{\sqrt{j\Omega}} \quad \text{equation 30, 31}$$

$$z_{1,2,OPEN} = \frac{Z_{1,2,OPEN}}{Z_{N,diff}} = \frac{1}{\sqrt{j\Omega}\tanh(\sqrt{j\Omega})}$$

wherein equation 30 shows the impedance progression for open outputs and equation 31 shows the impedance progression for closed outputs, and also the relationship shown in equation 32.

$$Z_{N,diff} = R_1' l_{el} \quad \text{equation 32}$$

FIGS. 34a-34d show a graphical solution of impedance according to equations 30 and 31.

The progressions for example in FIGS. 30a-30d and FIGS. 34a-34d can be obtained by suitable transformations, for example by Fourier transform, Laplace transform and/or back-transformation thereof, whereby an analysis, for example in the image domain, time domain and/or frequency domain, is made possible. In a preferred exemplary embodiment, the solution of the differential equation, for example of equations 26, 30 and/or 31, is therefore represented and/or analyzed in an impedance spectrum. For example, the impedance behavior of different pore geometries and pore structures (open and/or closed pore geometries) can be clearly represented in an impedance spectrum, for example the Nyquist plot, and thus compared with the solution of the differential equation in the impedance spectrum. These findings are directly applicable for TLM modelling of the arthropods 12 and excitation signals thereof. Conclusions as to the excitation frequencies can be made directly with the result in the DRT spectrum. In addition, characteristic curve profiles, as shown in FIG. 38 and FIG.

45, are directly applicable. The DRT method does not presuppose any model assumptions, but merely a Voigt network of infinite length (R parallel to C) (FIG. 43) for mapping all time constants. With this approach, it is possible to map all linear time-invariant (LTD-compliant) spectra. The DRT method is a search for correlations in the spectrum of the specimen with the relaxation behavior of an RC parallel circuit with the time constant $\tau=RC$. If such a behavior is present, the DRT method would thus indicate a Dirac pulse at the associated limit frequency. Since the signal, however, must be filtered from the image domain before the back-transformation by means of fast Fourier transform (FFT), there is a distribution of the time constants of the relaxation processes even in the event of a perfect correlation in the DRT method. If this distribution in a logarithmic application is above the frequency $f=(2\pi\ \tau)^{-1}$ asymmetrically to the maximum, a further process in the vicinity off can be assumed.

In the DRT spectrum, the settling times (relaxation times) in respect of the Infinite Voigt network are visible. Conclusions can be drawn as to the excitation frequencies on the basis of the formal correlation $f=(2\pi\ \tau)^{-1}$. FIG. 38, for example, shows a Nyquist spectrum with different porous structures. FIG. 45 likewise shows a Nyquist spectrum, and in the small square image the DRT spectrum correlating thereto.

Figure 35:
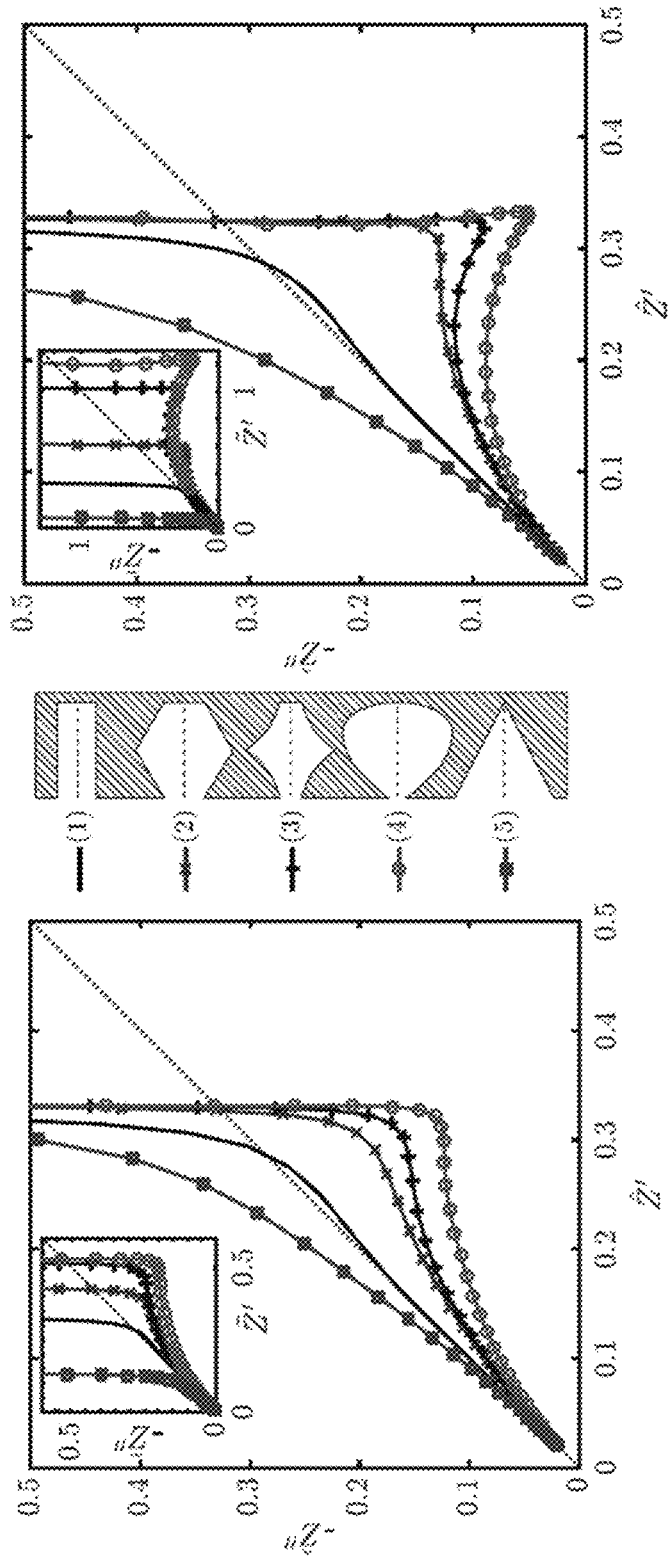
Figure 36:
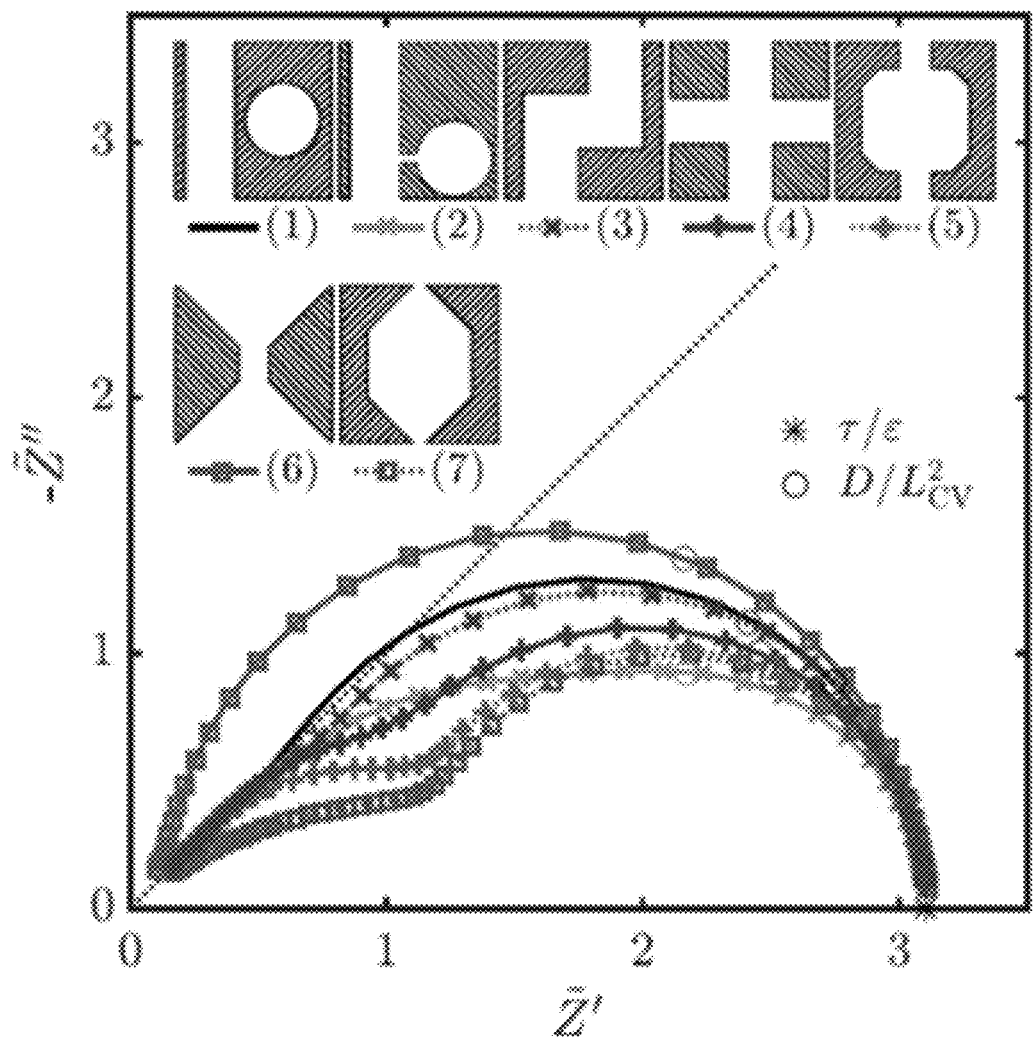
Figure 38:
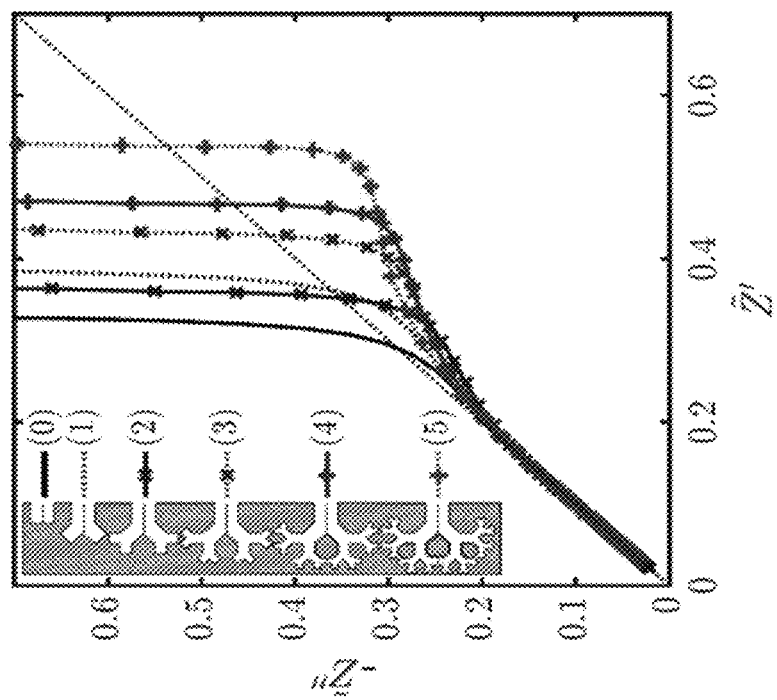
Figure 37:
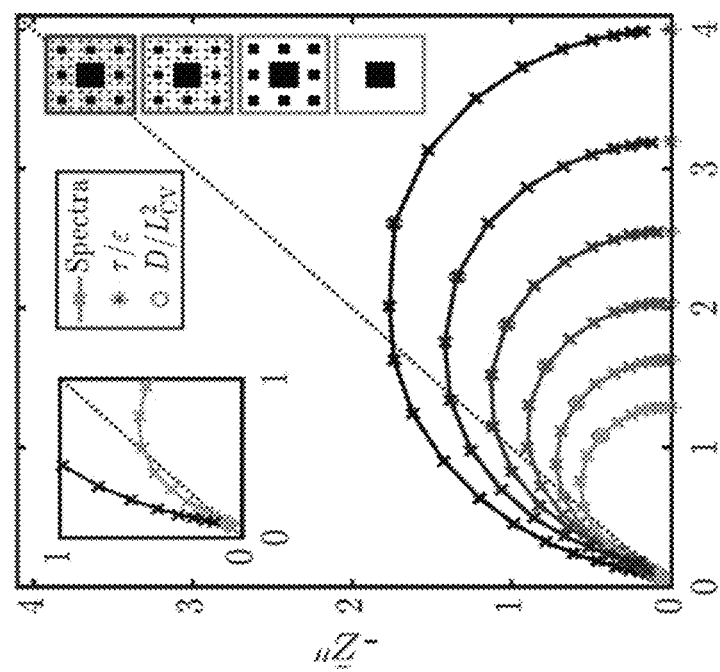
Figure 39:
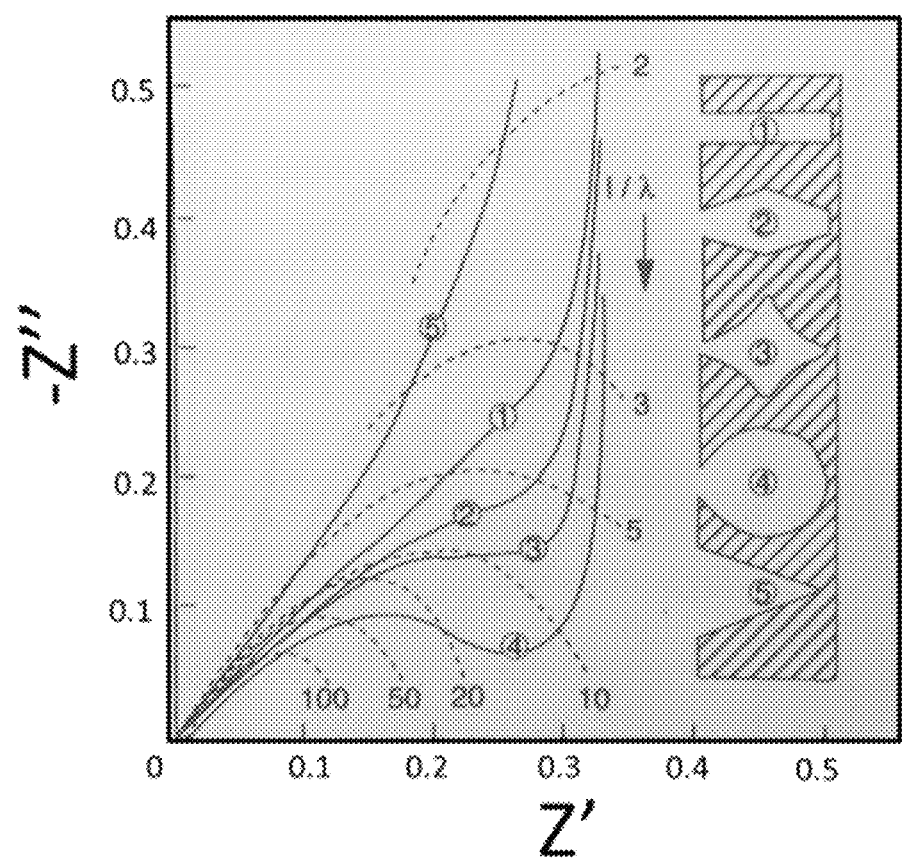
Figure 40:
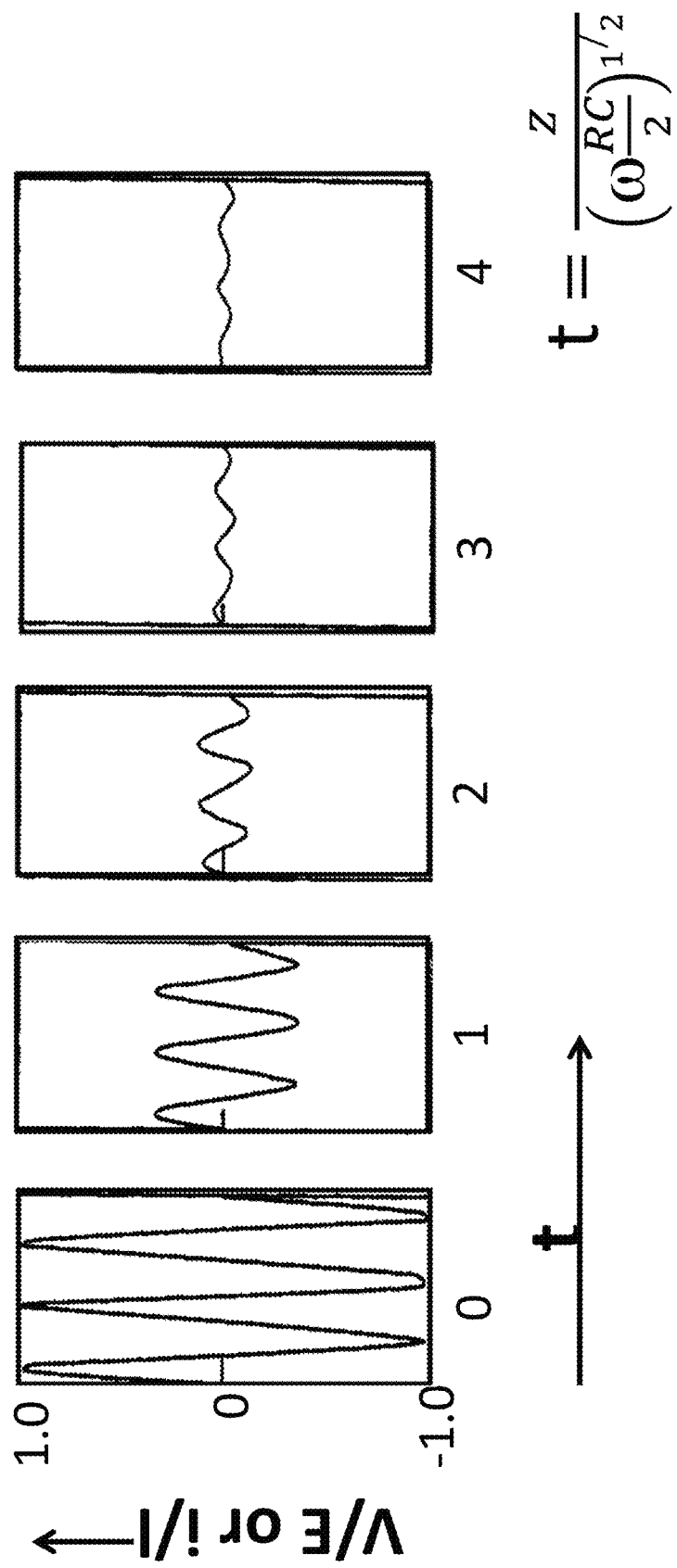
Figure 41:
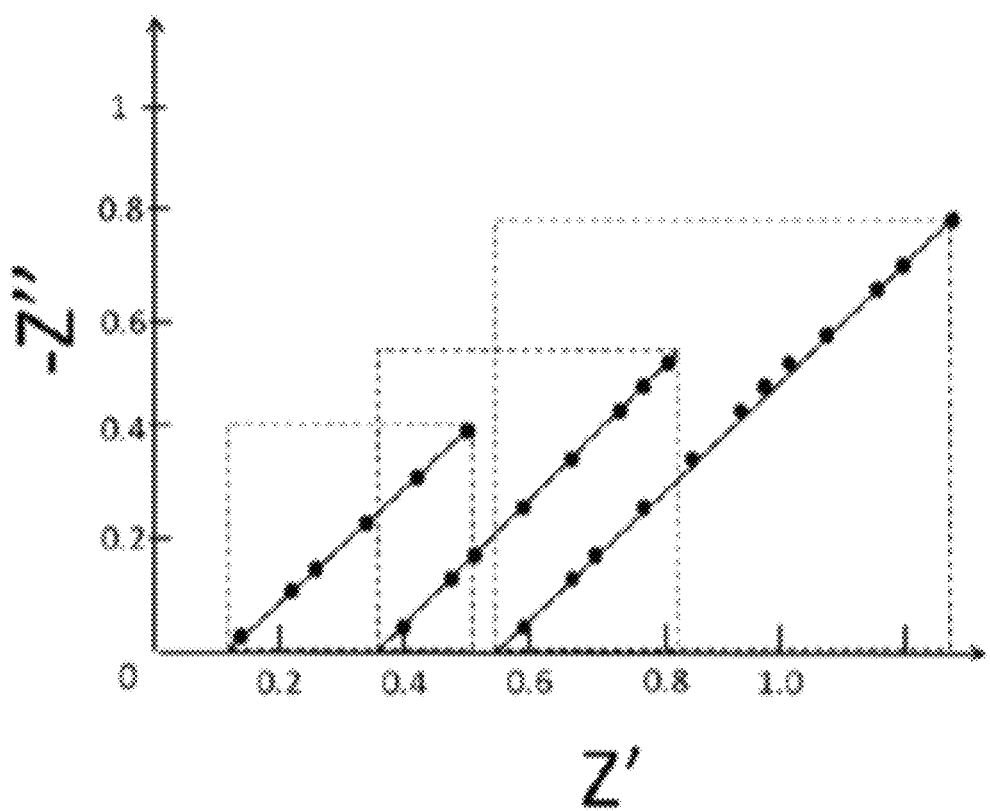
Figure 42:
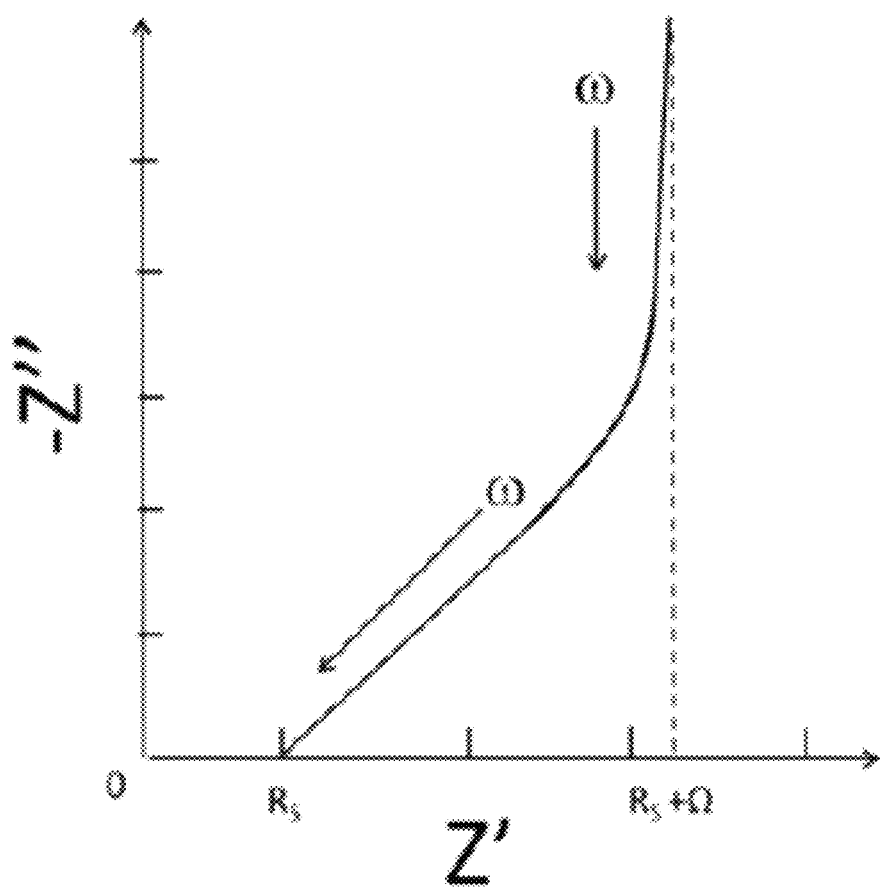

The impedance behavior in the simulations in FIGS. 35-39 with specific tomographic and topographic pore structures shows different characteristics, with FIG. 35 showing a single closed pore geometry and FIG. 36 showing simulations of a single open-pore geometry. FIGS. 37 and 38 each show a simulated impedance spectrum of 2D fractals. In FIG. 39 the impedance behavior of a set with different structures of the pores is shown, wherein l is the length of the pores and lambda is the form factor. It can be seen from the analysis and the simulations of the impedance spectrum and in particular of the normalized impedance spectrum that different pore geometries and pore structures in the graphical and mathematical analysis represent typical behavior patterns. The evaluation and frequency adaptation to different pore structures can therefore be performed easily. In principle, parameter-dependent location vectors, which, for example, describe the different continuous functions, can also be determined with the aid, for example, of vector analysis. The characteristic 18 of the electromagnetic radiation 10 can thus be adapted depending on the pore geometry of the arthropod.

Figure 50:
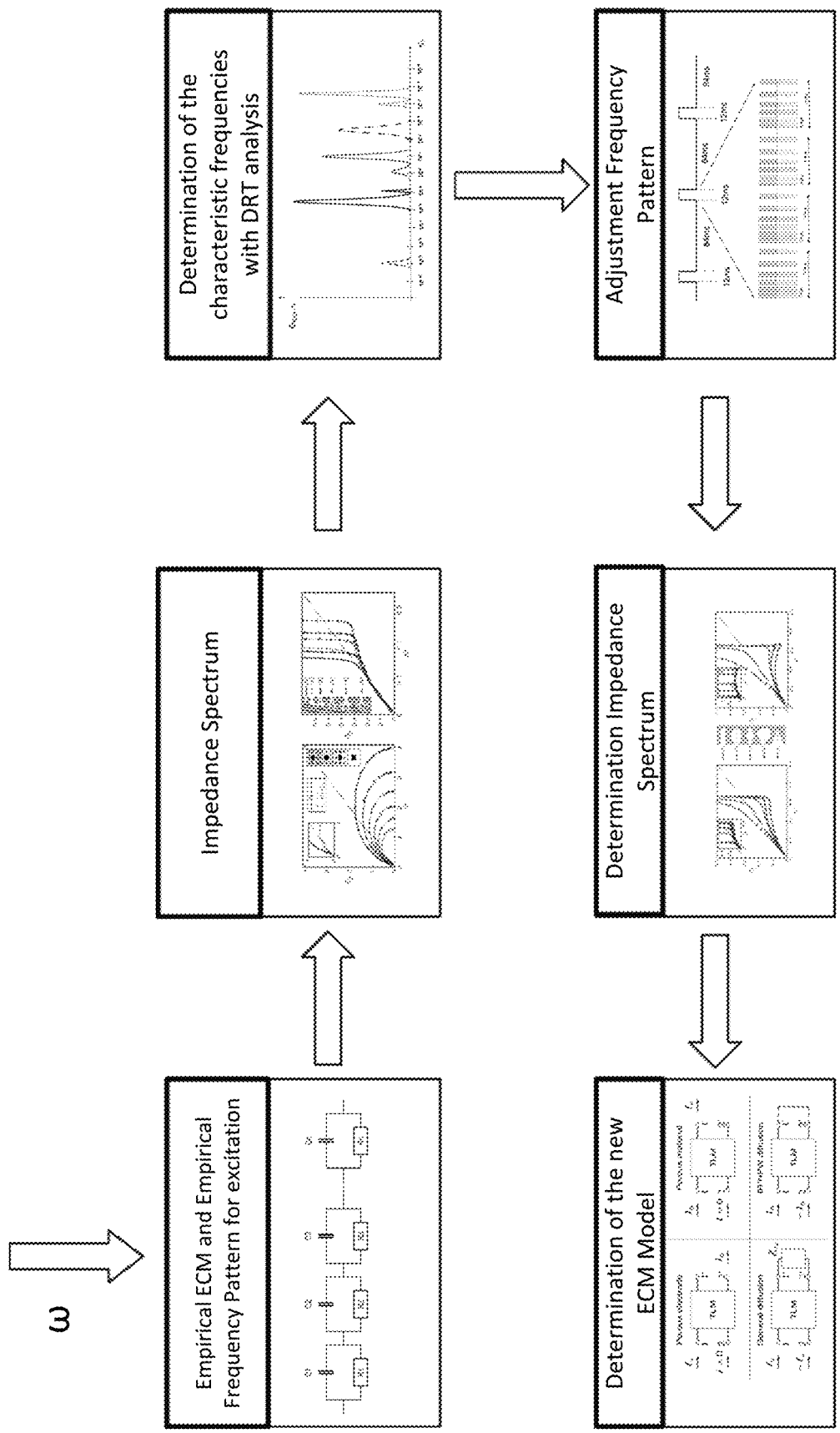
Figure 51:
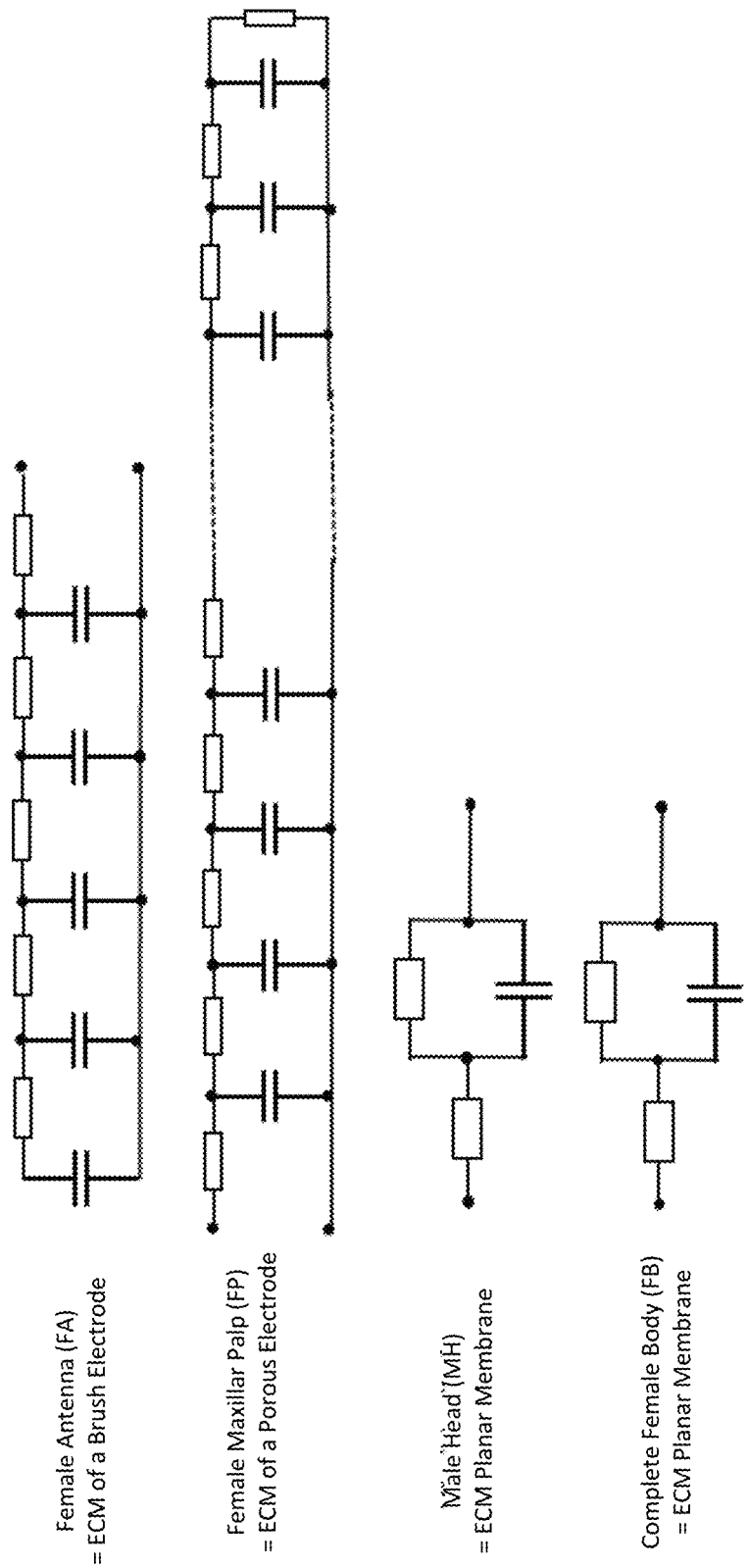
Figure 52:
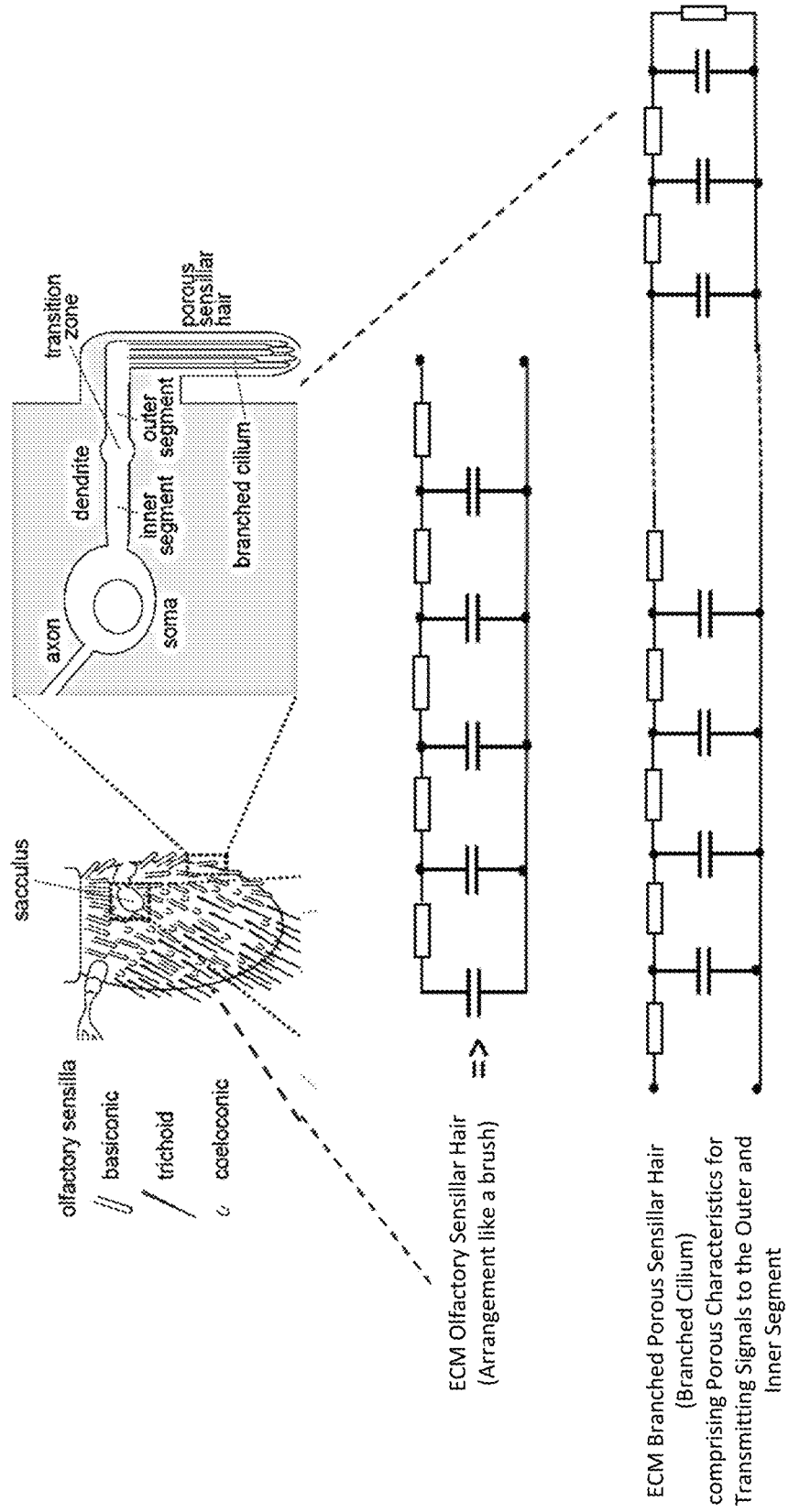
Figure 53:
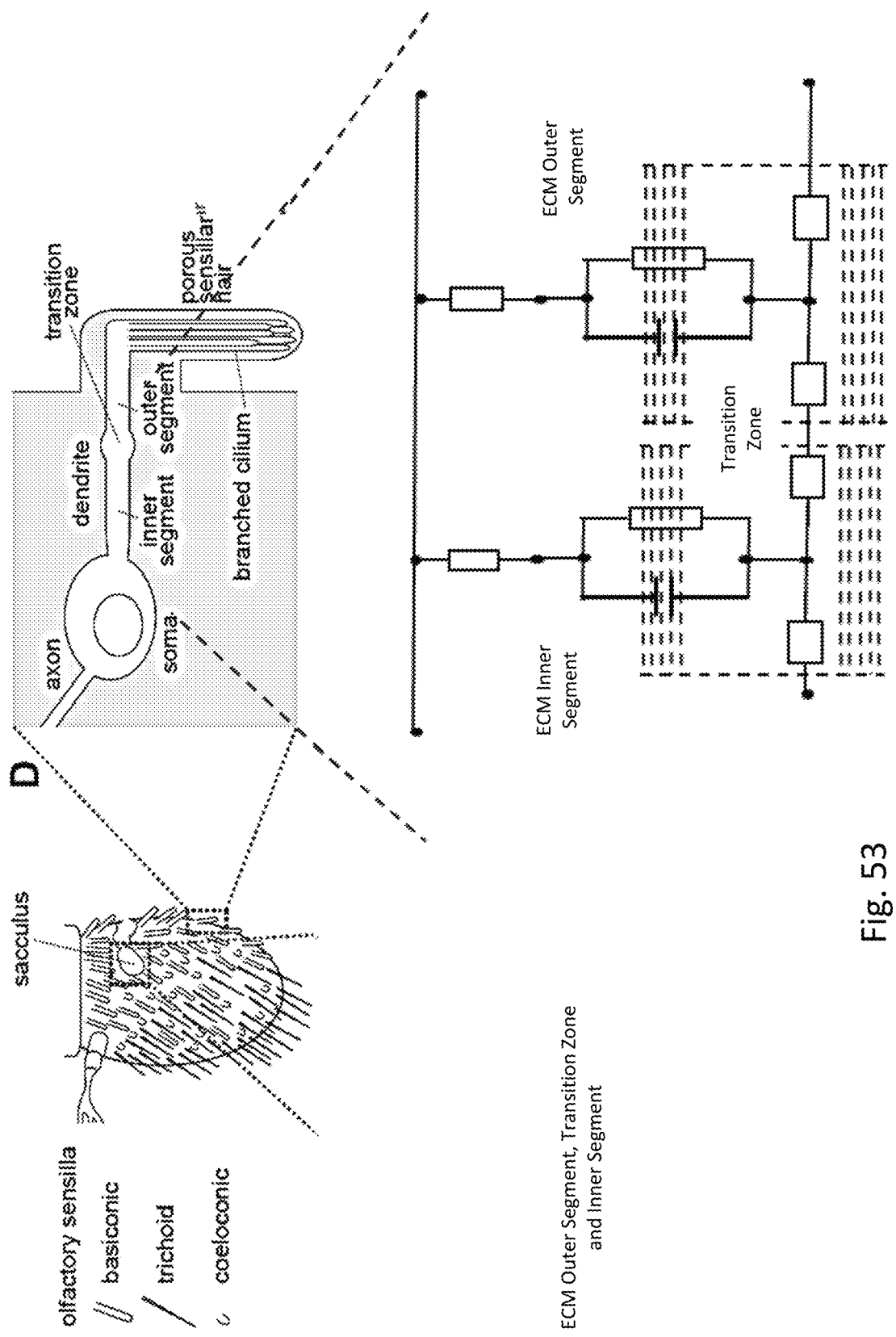
Figure 54:
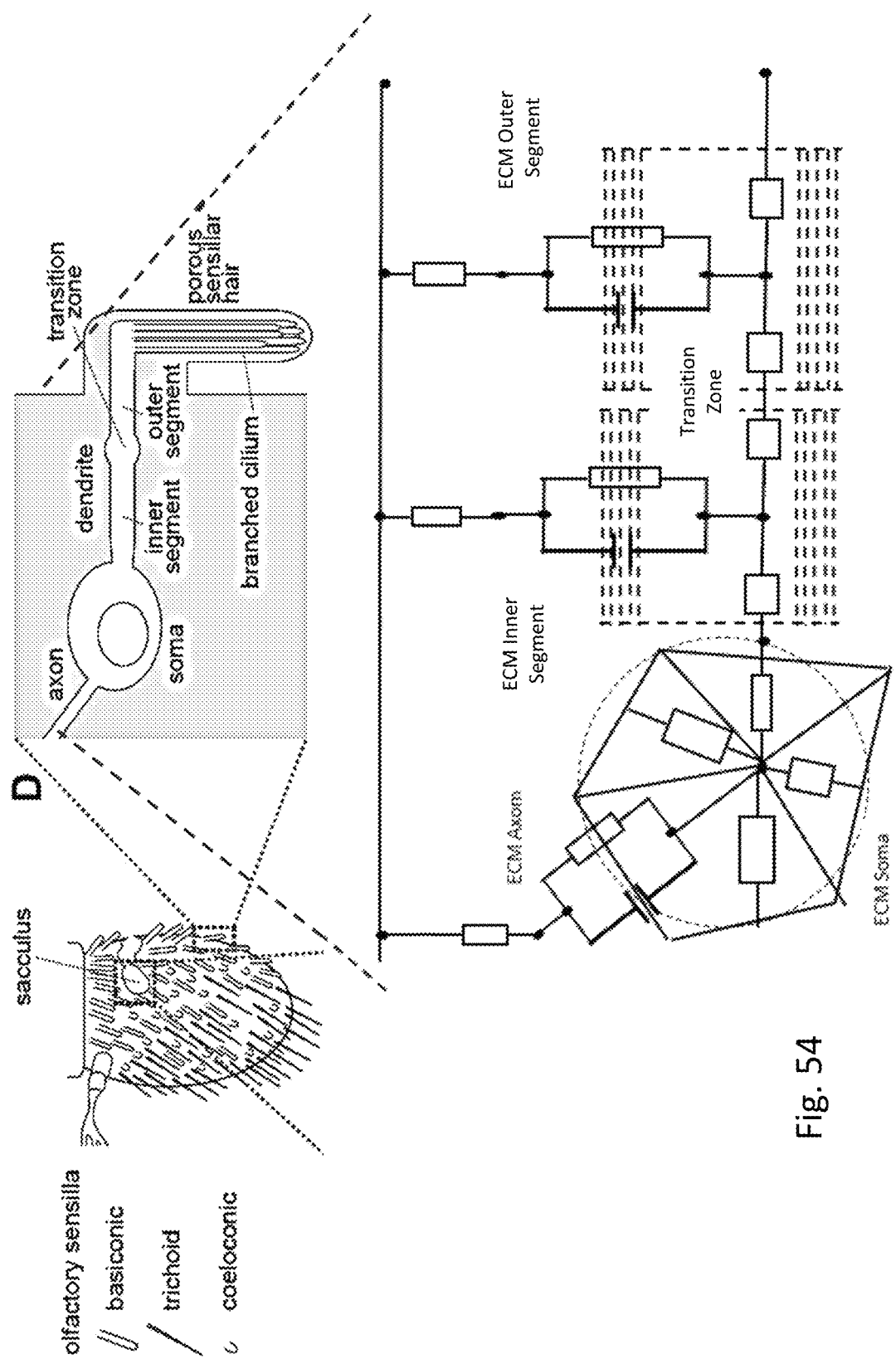

In a further preferred exemplary embodiment, the used TLM 20 is verified and/or adapted with the aid of at least one other TLM. For example, an empirically determined model in the form, for example, of a frequency pattern can be used for verification. As shown in FIG. 50, new TLM models can be generated, for example, from empirically determined frequency patterns and the use of Infinite Voigt models. For example, it is also conceivable that a different TLM base model from the four models in FIG. 27*a*-27*d* is used for the modelling. Particularly in physical and/or biochemical systems, the consideration for example of open or closed structures (for example open pores or closed pores) is important in order to replicate impedance models based on tomographic and/or topographic data; see for example FIG. 37.

The frequency spectrum for exciting sensory appendages 16 and/or sensory properties of arthropods 12 is very large. A multi-frequency excitation may thus lead to an ambiguity of the results. Different physical and/or biochemical processes can be monitored and analyzed in different frequency ranges. Therefore, in a further preferred exemplary embodiment, parameters of the TLM for unique assignment of the TLM to the corresponding sensory appendage of the arthropod are determined. FIG. 29, for example, shows the DRT spectrum with the distributed spectrum of the relaxation behavior (distribution of settling times, DRT) with the characteristic settling times as a replication of the structures of the arthropods. This spectrum was determined empirically in the first step in FIG. 50, such that the arthropods showed passive behavior (no biting, dormant) when excited with the frequency patterns. Due to the topographic and/or tomographic anatomy and structure of the arthropods, specific frequencies can be assigned. FIG. 50 shows the simplified modelling process. Simplified equivalent circuits and frequency patterns are determined from empirical investigations. These frequency patterns may have a broadband spectrum. An impedance spectrum is derived herefrom. Characteristic frequencies and time constants are determined with the aid of the DRT analysis. New excitation frequencies are derived from this DRT spectrum. These are used in turn to determine a new impedance spectrum and, derived therefrom, a new structured transmission line model.

If a unique assignment is not possible, in a particularly preferred exemplary embodiment, for example, certain parameters of the TLM can be determined in a simplified and/or direct manner by the use of, for example, topographic and/or tomographic data of the arthropod. For example, by means of topographic data of the arthropod and impedance simulations of various pore geometries, corresponding parameters can be determined. For example, the different pore properties (see for example FIG. 38) can be assigned with the aid of curve discussions and/or differential equations.

In a preferred exemplary embodiment, the parameters are normalized. Generally valid models for each type of arthropod can be defined with the aid of normalized parameters, for example, impedance parameters. Relative deviations or changes can be well determined with the normalization, for example, of the impedance spectrum to the reference factor 1 and are thus clearly identifiable during the analysis.

Together with a limit value consideration, for example towards zero and/or towards infinity, the parameter adaptation for example in a used software is simplified, since the adaptations are only relative to a previously determined value. In a further exemplary embodiment, the parameters are therefore adapted with a limit value consideration. For example, the terms within the differential equations are simplified with the limit value consideration. This is important for the implementation of the algorithms in a microcontroller.

In a particularly preferred exemplary embodiment, arbitrary nonlinear functions are modelled by a substitution method in combination with at least one database, for example a function library. For the substitution method, graphical functions are replaced in part, for example by e-functions, Gaussian functions and/or linear functions. This partial function, as portion function, can be represented in turn as an ECM, for example as a combination of resistor and capacitor. For example, when implementing the method in a microcontroller-based system, differential equations can thus be avoided since nonlinear function progressions are stored, for example in look-up tables in a microcontroller, thus reducing storage space. For example, it is also conceivable that a discrete Fourier transform (DFT) is used for memory-efficient use of the algorithms on the basis of a microcontroller with incorporation of a Goertzel algorithm for the signal evaluation, in particular with use of more than one excitation frequency.

In a further exemplary embodiment, at least one discrete Fourier transform (DFT) is used with incorporation of a Goertzel algorithm for an advantageously memory-efficient use of the method on the basis of a microcontroller. It is thus possible to implement the method and/or the resultant algorithm in a memory space-saving manner on a microcontroller, so that there is no need to use large and powerful computing units.

Figure 47:
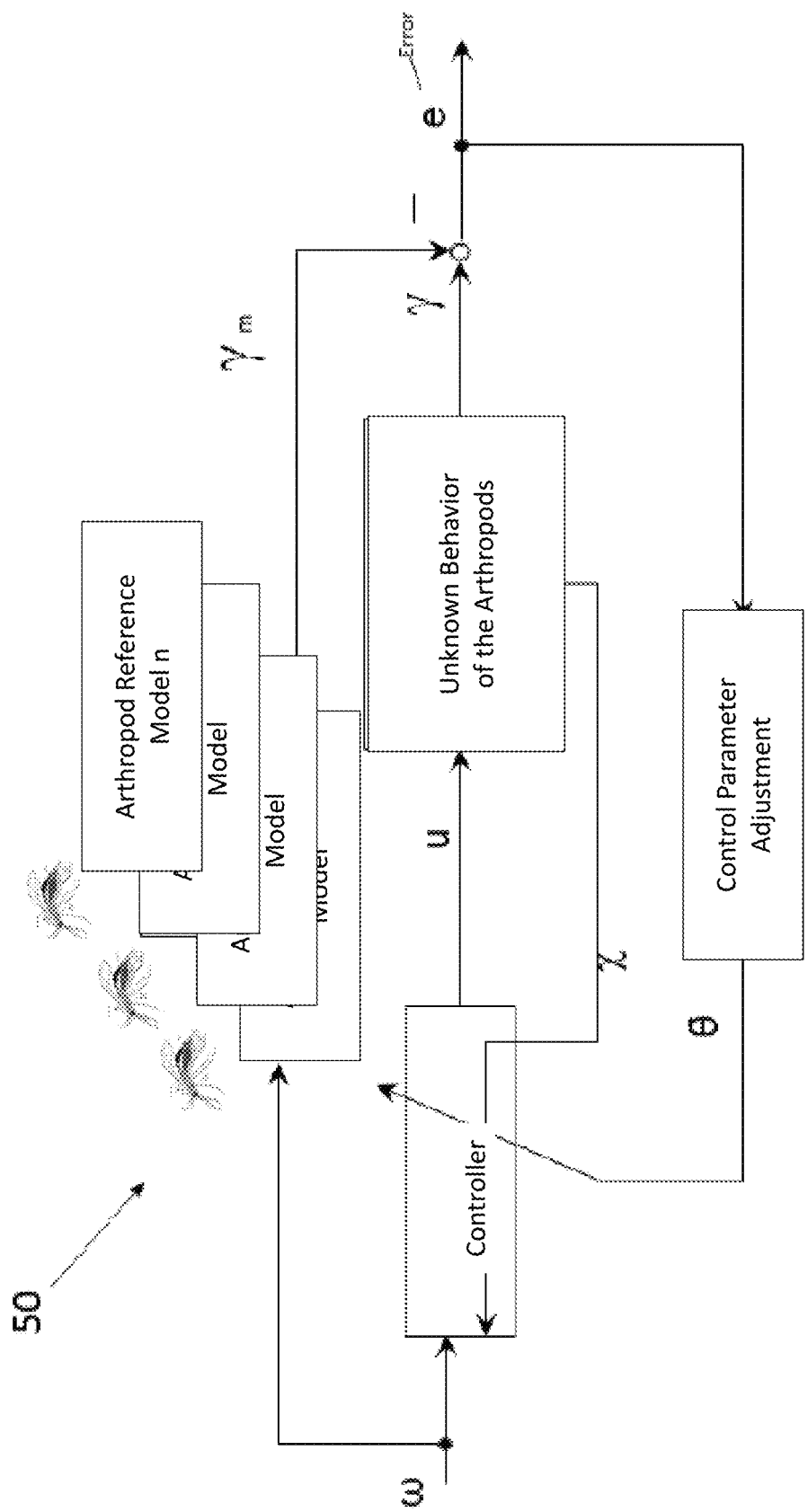
Figure 48A:
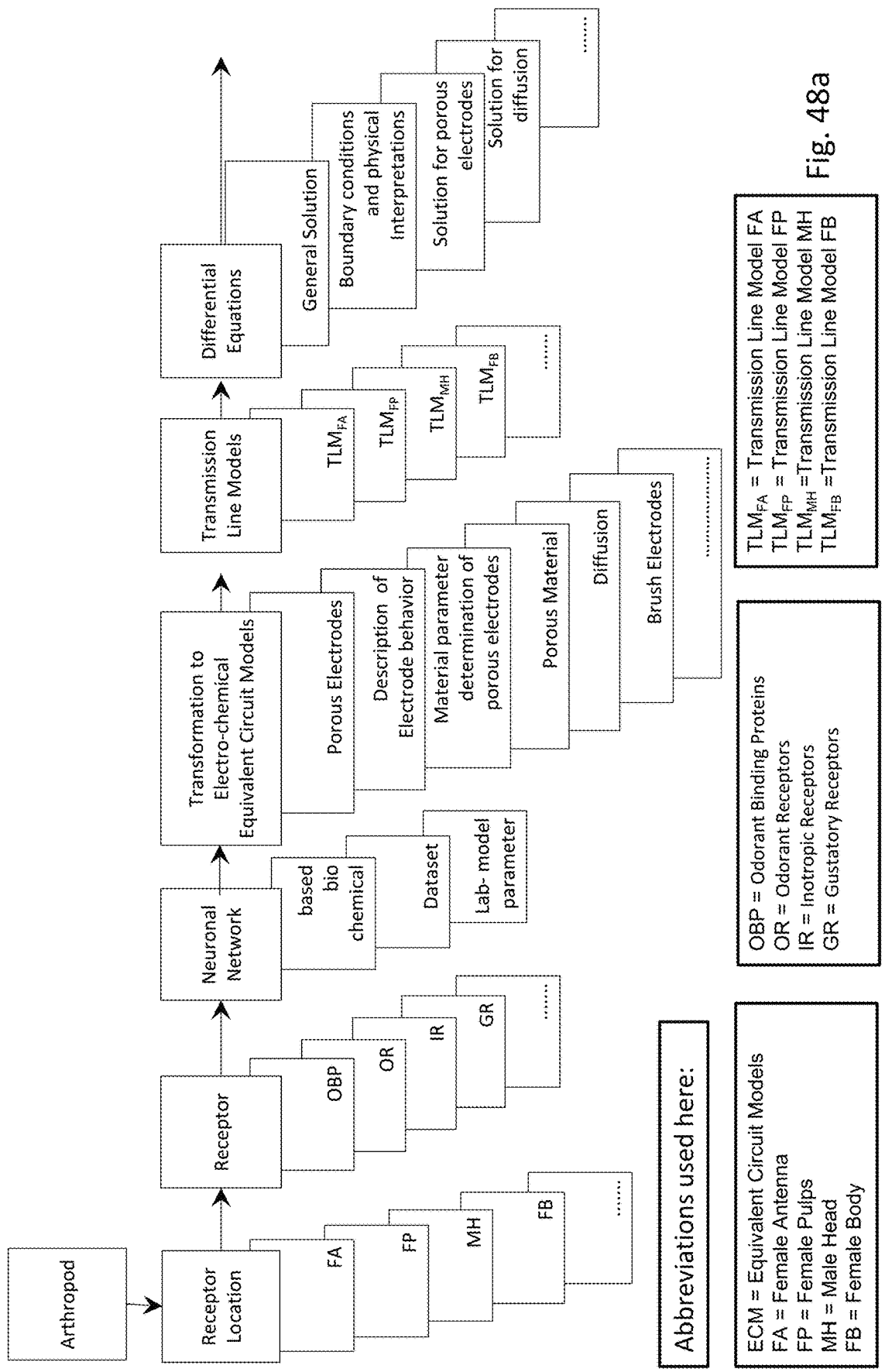
Figure 48B:
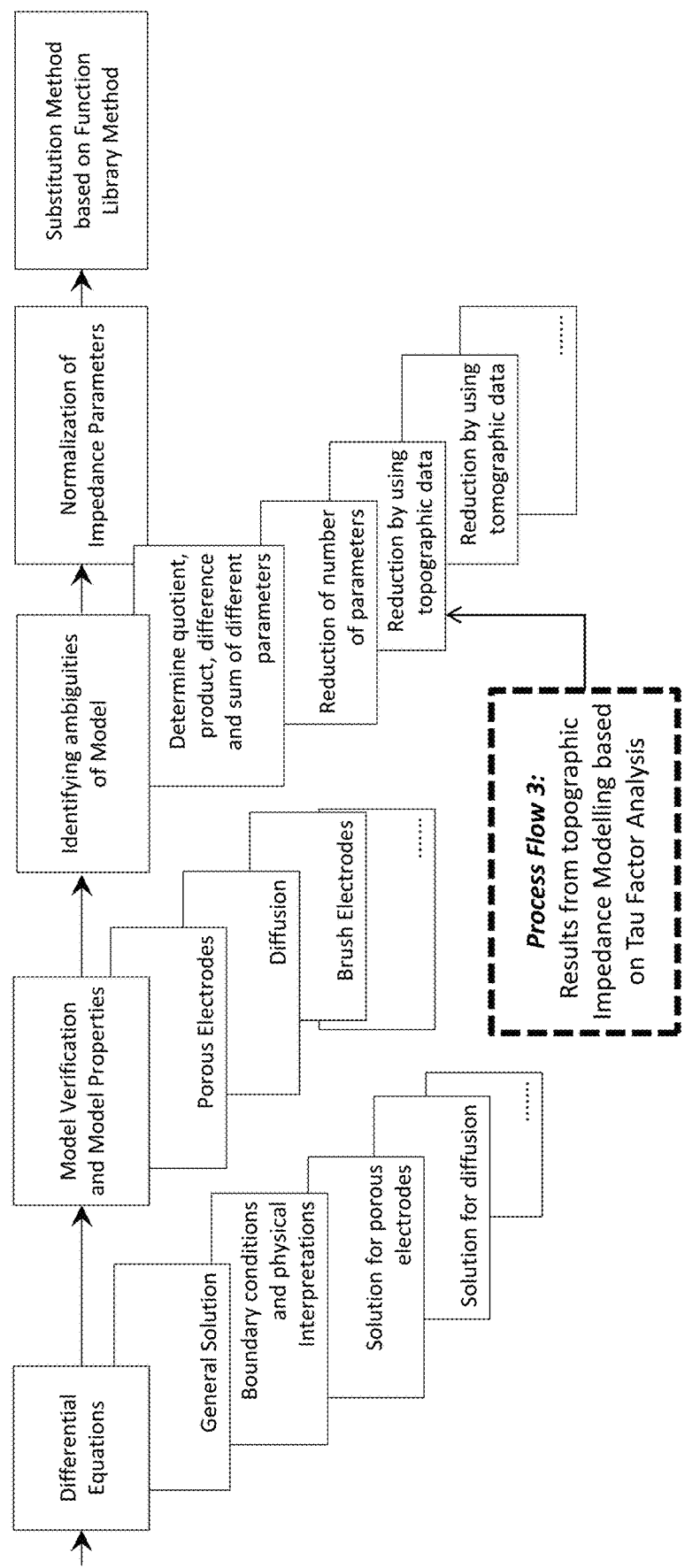
Figure 48C:
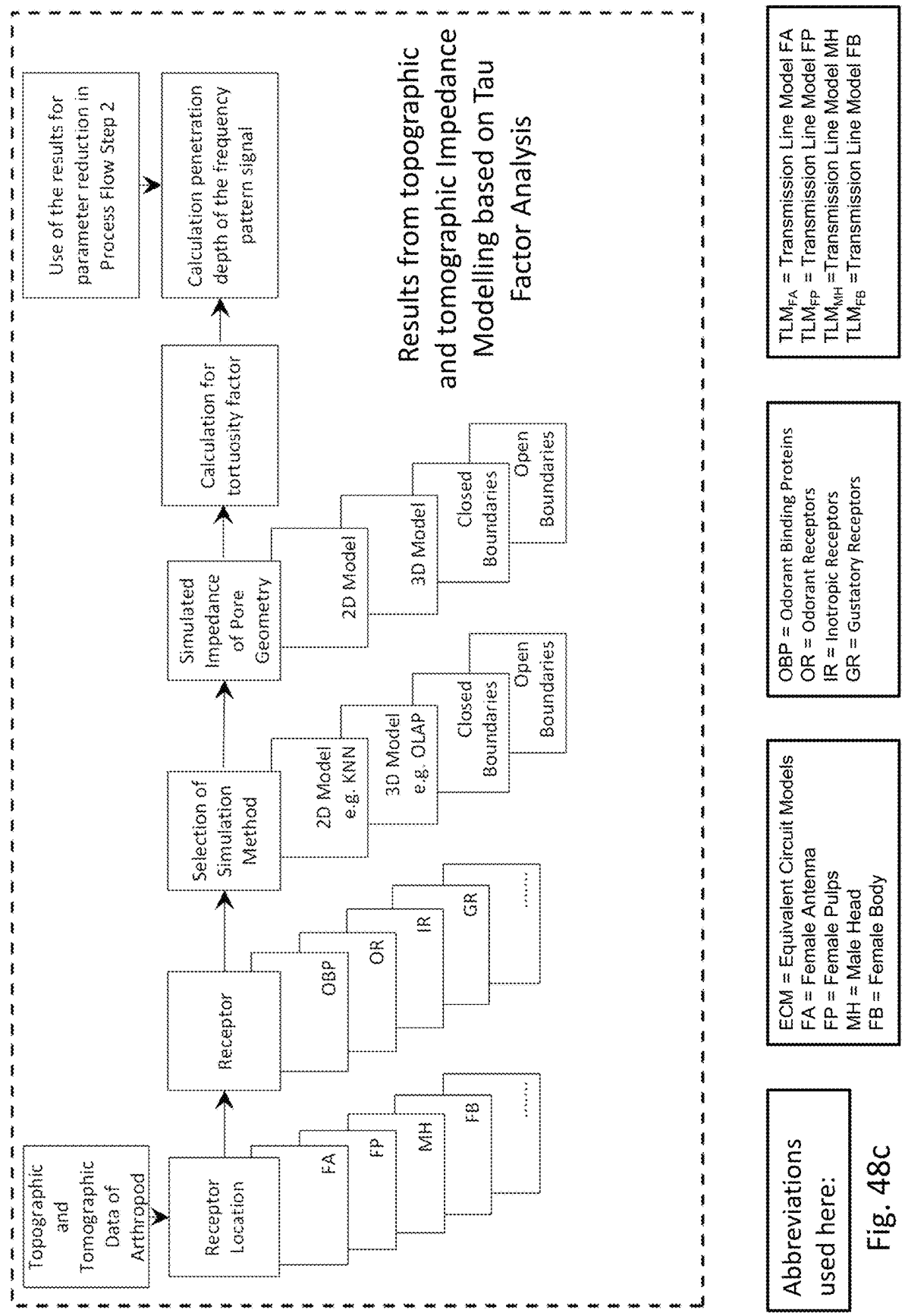
Figure 48D:
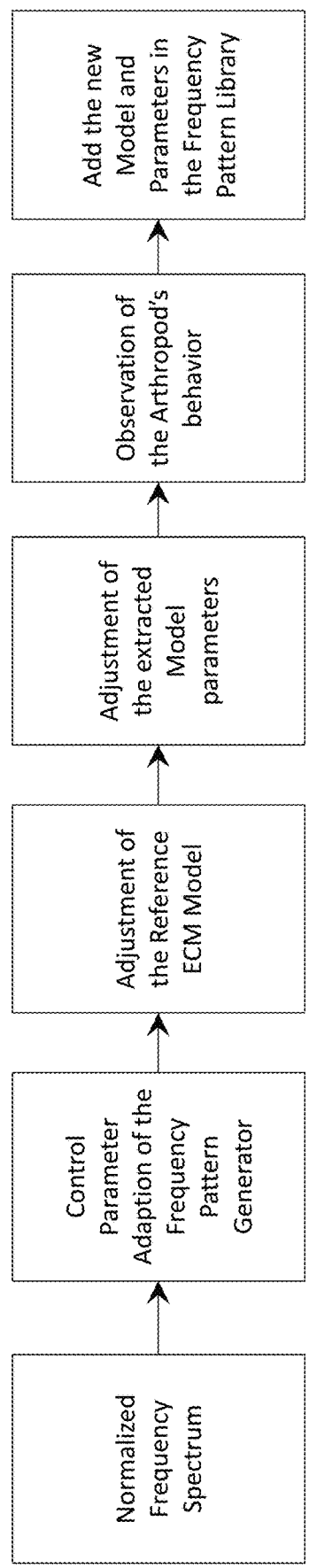

In a preferred exemplary embodiment, the solution of the differential equation is checked and/or adapted by means of an adaptive control system 50, for example a self-adapting control system 50, based on at least one reference model. FIG. 47 shows a general block diagram of a control system 50 for training different reference models. The adaptation can be performed, for example, on the basis of the previous results and/or the monitoring of the arthropods and their behavior patterns. The arthropods are excited, for example, by the characteristic of the electromagnetic radiation obtained by solving the differential equation. This solution serves as a reference model. The excitation influences the activity behavior of the arthropods, and this is lastly detected, for example, by means of human monitoring or a camera or other suitable optical sensors, for example infrared or FIR time-of-flight sensors. The system comprises an internal, closed feedback control circuit and an outer circuit responsible for the adaptation. The control parameters are adapted, for example, on the basis of a quality criterion with use of a gradient method or other known mathematical methods. During the arthropod reference modelling, the desired transmission behavior of the closed control circuit is specified with the aid of the reference model. The first reference model can be based, for example, also on empirical investigations. FIG. 47 describes a model for adaptive control which is based on a set of variable control parameters Θ. An adaptation is performed by the adaptation law (control parameter adaptation) such that an input/output behavior of the controlled system corresponds to a reference model of the arthropod. The manipulated variable is, for example, the frequency pattern ω. The controller in this case adapts, for example, the time progression of the excitation signal.

The reference model, for example the first reference model, can be based for example on empirical data and/or data of a model of the arthropod already determined earlier. The reference models may thus be models of the arthropod determined earlier and/or models from empirical data, which are now adapted.

In a preferred exemplary embodiment, the characteristic of the electromagnetic radiation is stored in a memory, for example a database or a function library. For example, the characteristic can be transmitted wirelessly to the memory and stored there. The characteristic can later be transmitted from the memory, for example wirelessly.

Figure 25:
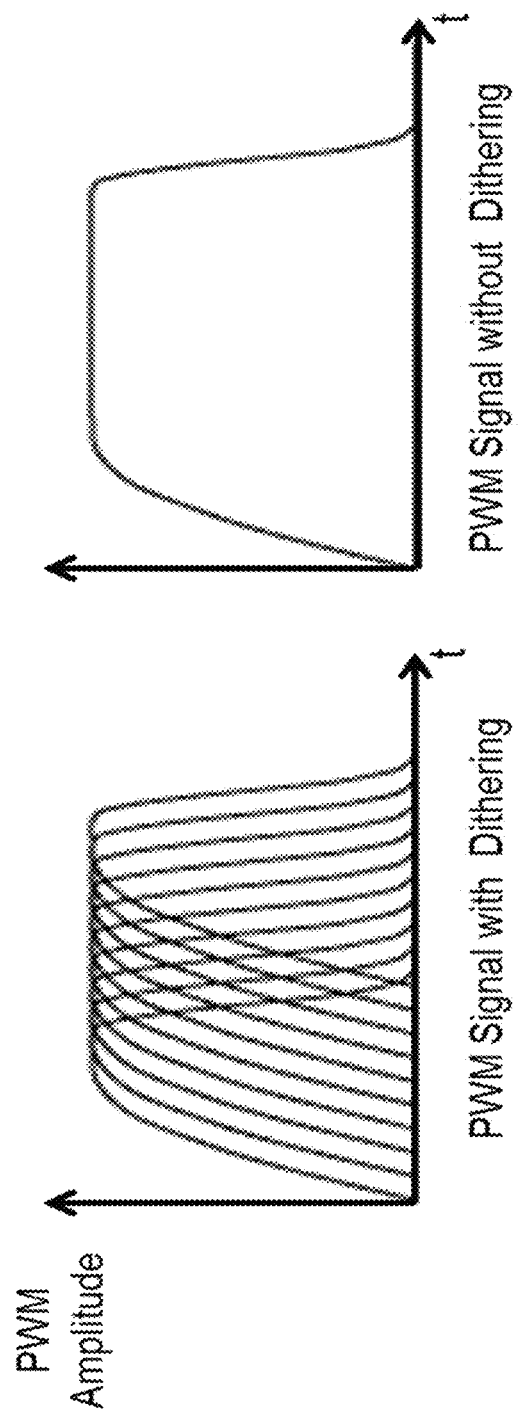
Figure 26:
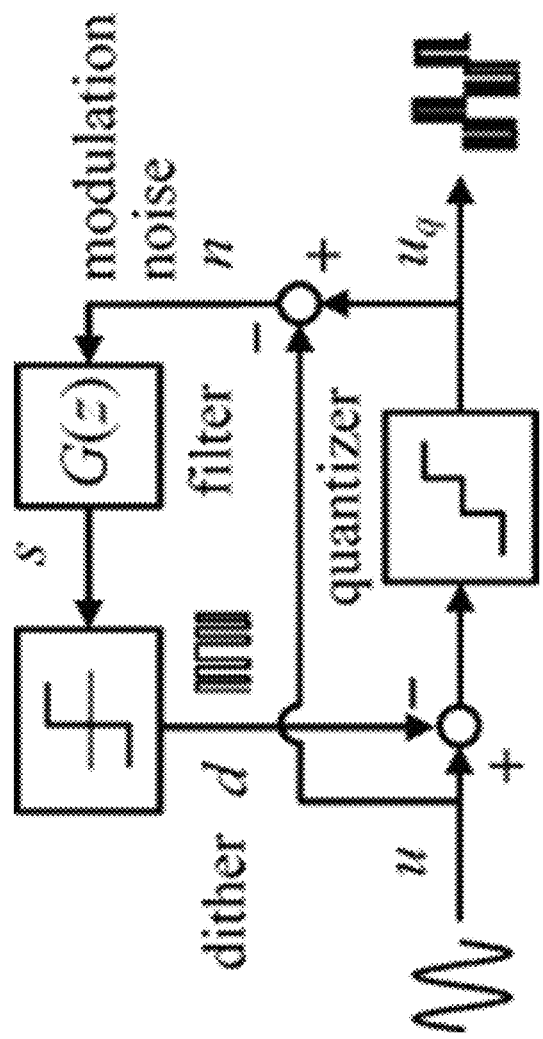

In the exemplary embodiment in FIG. 18, the characteristic 18 of the electromagnetic radiation 10 is modulated with at least one carrier signal 22. In principle, a very wide range of modulation types are possible, for example PWM, FM, AM, PFM, TDM, FDM. FIG. 25 (left and right) shows a PWM signal in each case. A plurality of modulation types can also be combined. For example, all modulation frequencies can be prime number-based and/or can have no integer harmonic and subharmonic factors and/or multiples. The frequencies may lie, for example, in the sub-GHz, MHz or GHz range.

In a further exemplary embodiment, the characteristic 18 of the electromagnetic radiation 10 is particularly preferably modulated with at least one dither signal. It is thus possible advantageously to obtain an increased range and/or transmitting power of the characteristic of the electromagnetic radiation and thus save power. More preferably, the carrier signal 22 is additionally modulated with at least one dither signal. In FIG. 25 (left), a PWM signal with modulated dither signal can be seen as an example.

Figure 21:
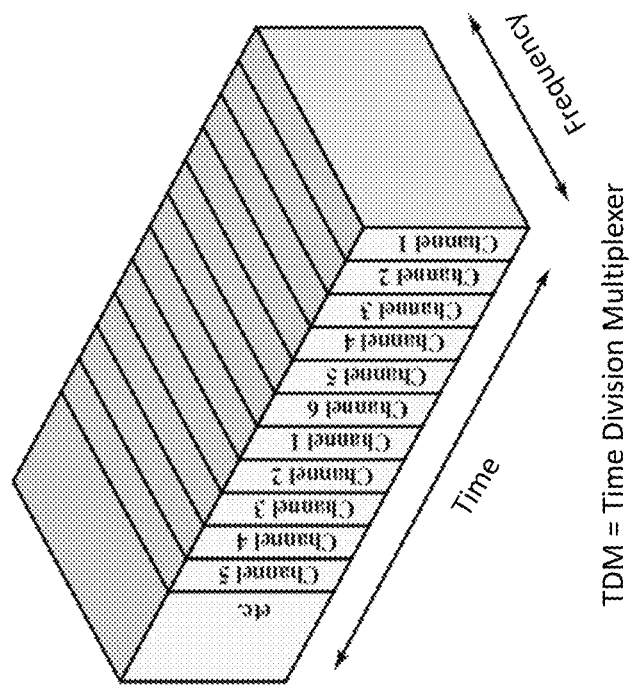
Figure 20:
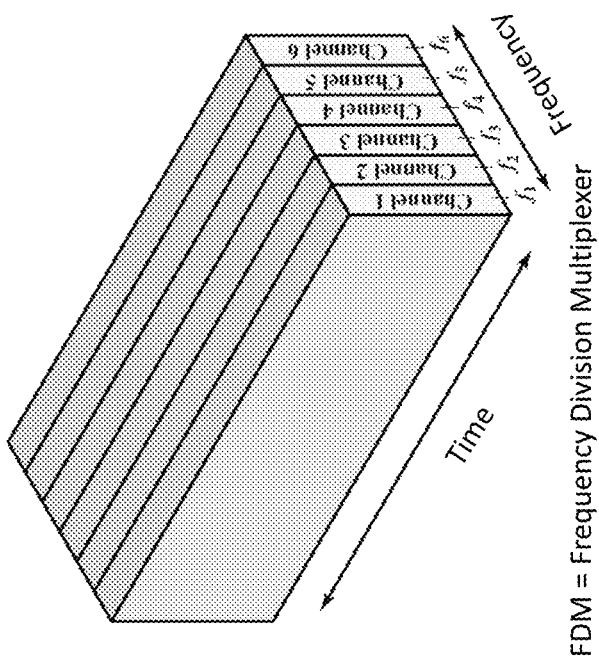
Figure 22:
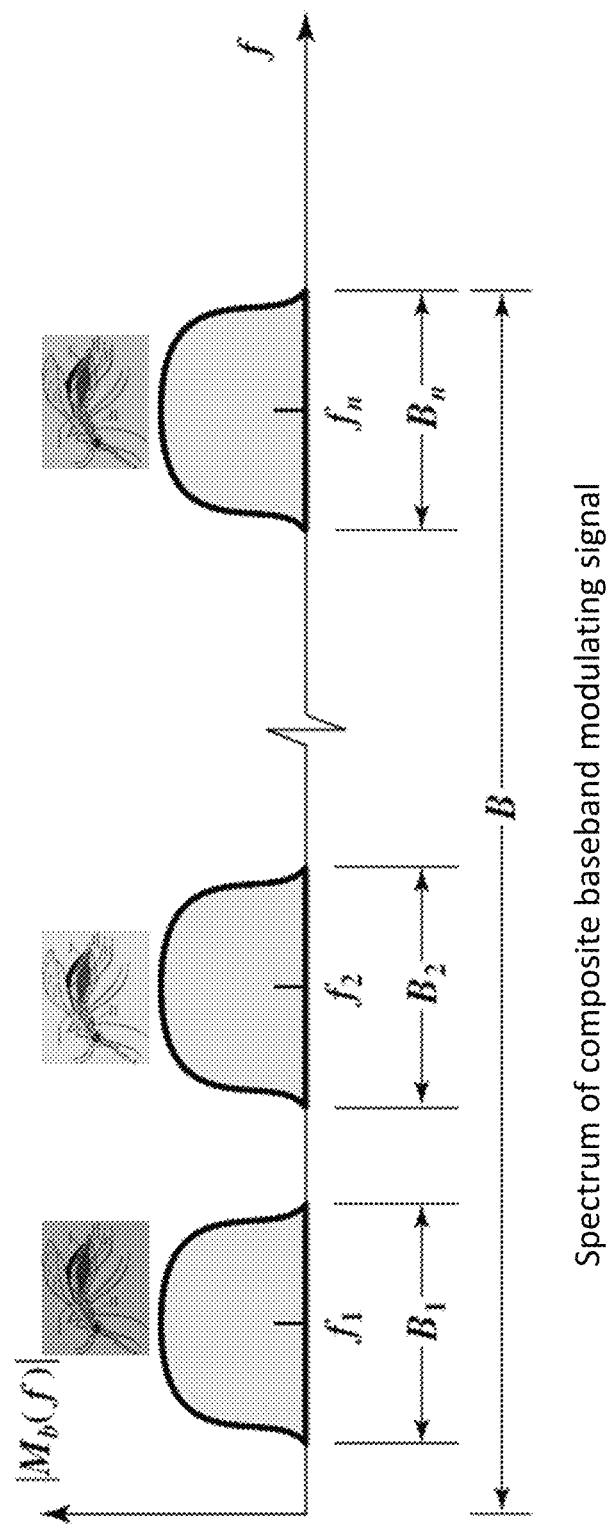
Figure 23:
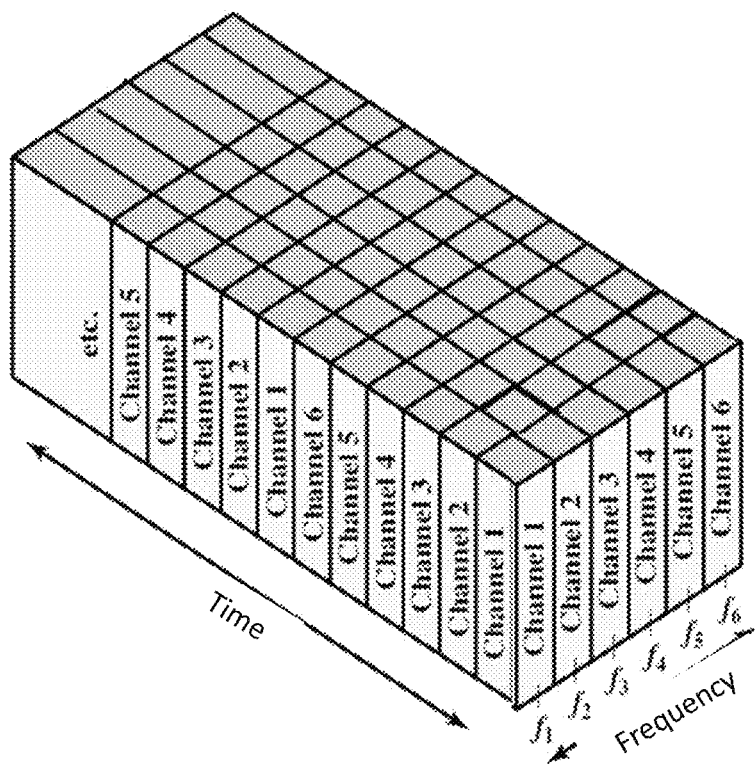
Figure 24:
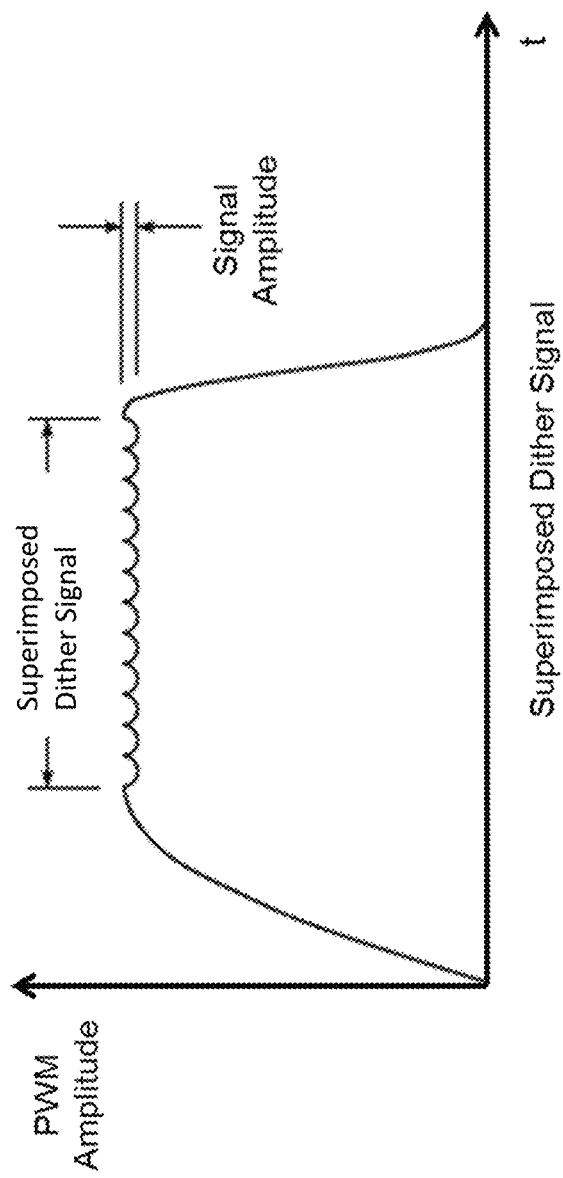

In a further exemplary embodiment in FIG. 23, the characteristic of the electromagnetic radiation is generated with a combined multi-frequency pattern generator 24, which is based on a frequency division multiplexing signal (FDM) (FIG. 20) and a time division multiplexing signal (TDM) (FIG. 21). It is thus possible to generate arbitrary characteristics of the electromagnetic radiation, both in the frequency domain and in the time domain. By contrast, a frequency division multiplexing signal (FDM) in FIG. 20 or a time division multiplexing signal (TDM) in FIG. 21 merely makes it possible to generate a specific frequency range over the entire time or, respectively, a plurality of frequencies over only a certain time range.

Figure 31:
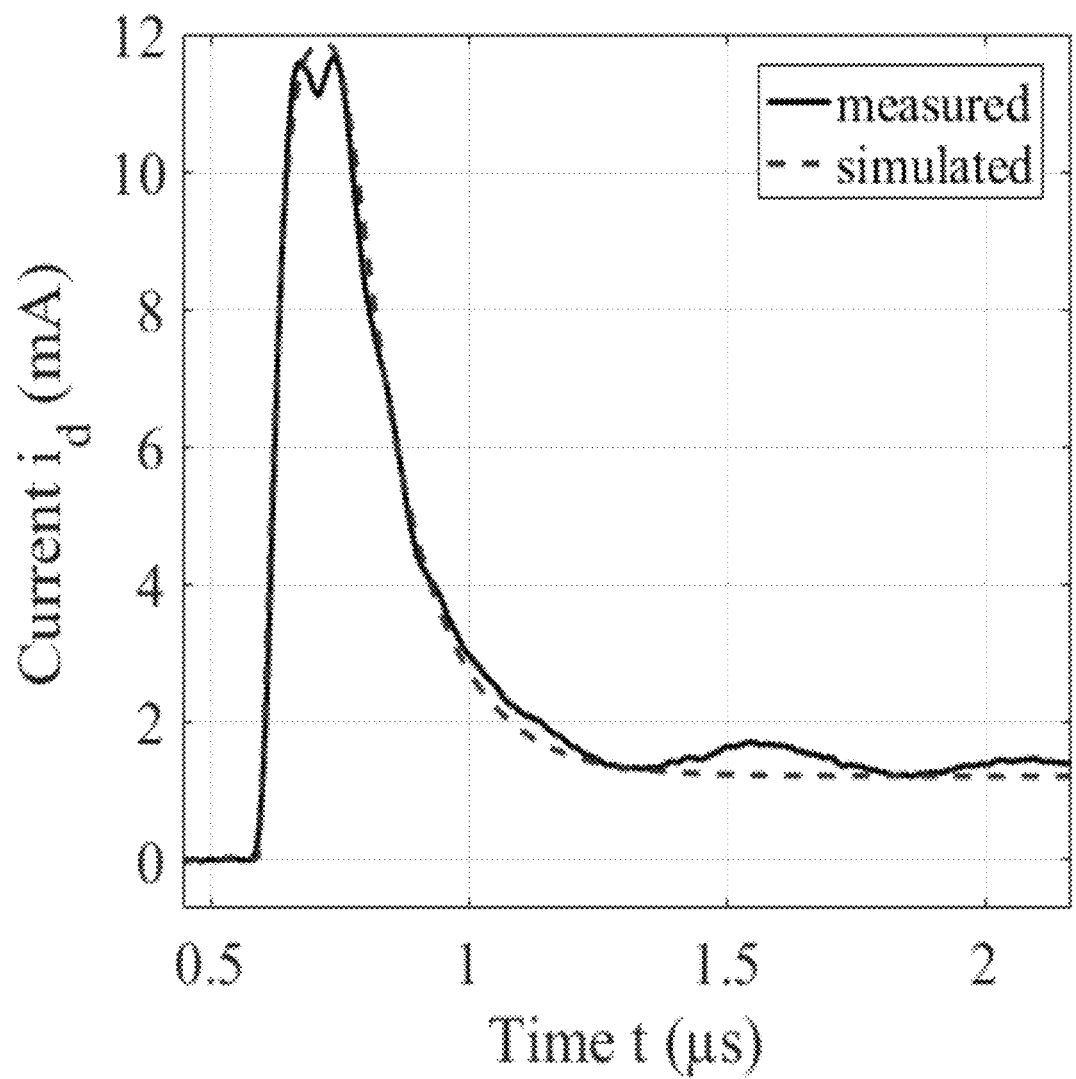
Figure 32:
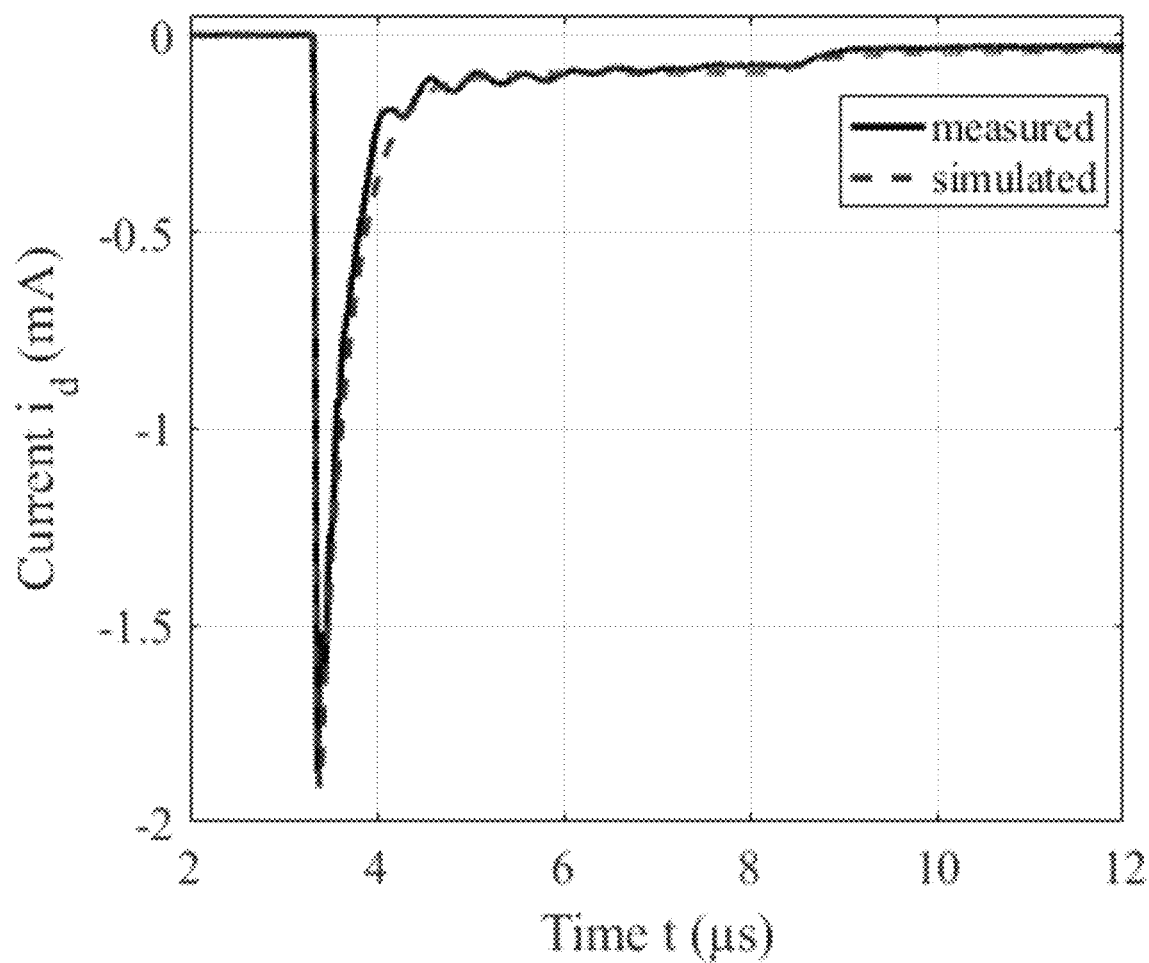
Figure 33:
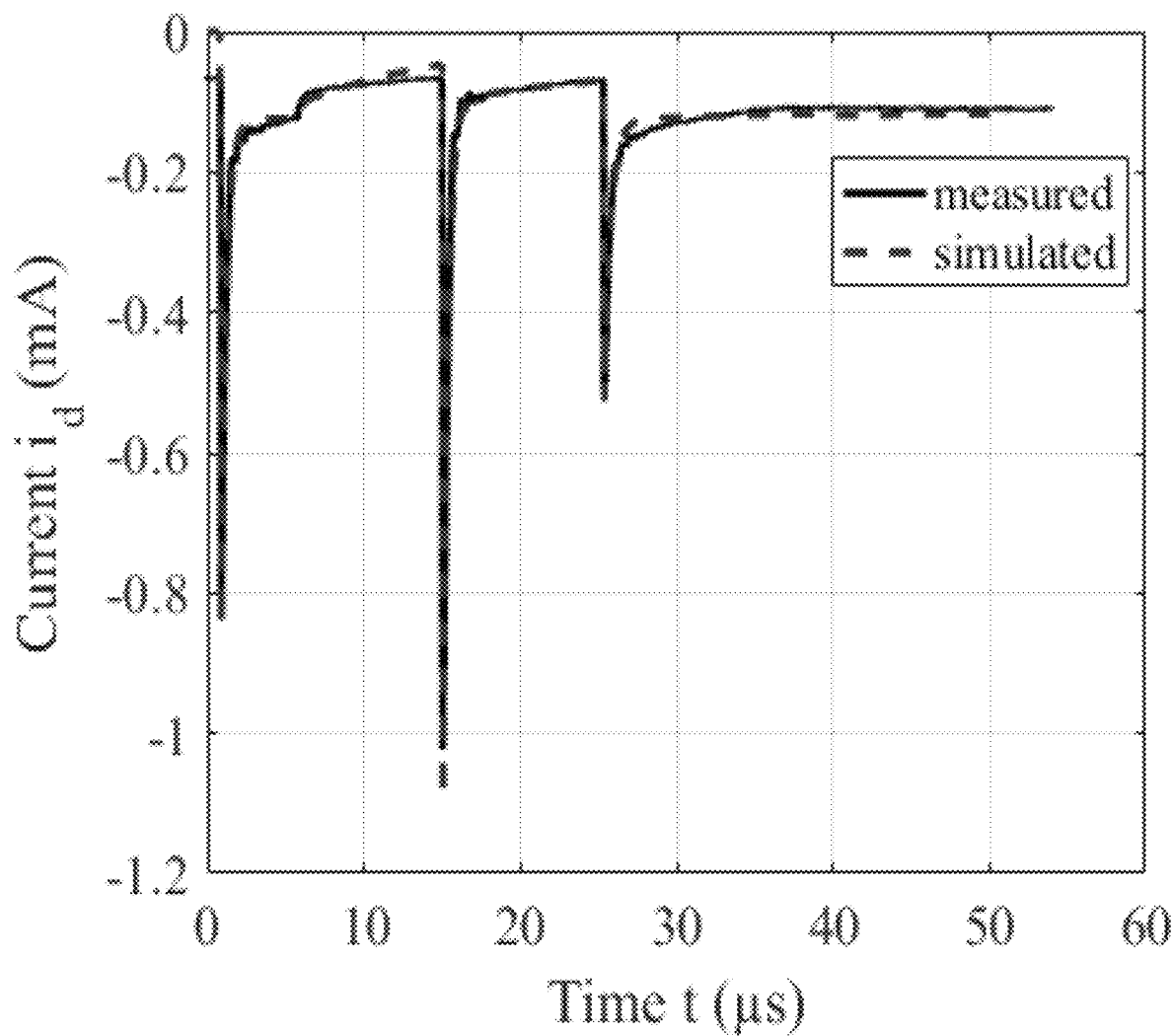

For more accurate and more effective influencing of the arthropods 12, the characteristic 18 of the electromagnetic radiation 10 in a further exemplary embodiment comprises at least one burst pulse, which simulates at least one corona discharge in air, the time progression of which comprises at least one positive and/or negative Trichel pulse. In FIGS. 31 and 32, positive and negative Trichel pulses are shown, respectively. Corona discharges are low-current gas discharges at atmospheric pressure and with locally high electric field strength, for example at electrodes or wires. FIG. 31 shows an example of the time progression of a positive Trichel pulse (measured and simulated pulse) and FIG. 32 shows the time progression of a negative Trichel pulse (measured and simulated pulse). Empirical investigations on arthropods have shown that such patterns which simulate Corona discharges in air significantly influence the behavior of arthropods. FIG. 33 shows the time progression of a Trichel pulse sequence as measured and simulated pulse.

For an advantageously increased efficacy of the influencing, the characteristic 18 does not have any harmonic and/or subharmonic correlations. A distinction is thus made, for example, between the harmonic components and subharmonic components for example in the frequency spectrum for all sequences transmitted simultaneously, at the same time. For example, the characteristic of simultaneously transmitted frequencies in the time domain and/or in the frequency domain does not have any harmonic and/or subharmonic correlations.

For a further increased efficacy of the influencing, the characteristic 18 is prime number-based. The characteristic 18 thus does not have any integer harmonic and/or subharmonic multiples and/or factors.

For a particularly increased efficacy, the characteristic 18 is based on the Dirichlet's theorem on arithmetic progressions. Dirichlet's theorem is a statement from the mathematical subfield of number theory which states that an arithmetic sequence contains infinitely many prime numbers, if this is not impossible for trivial reasons.

In a further exemplary embodiment in FIG. 49, a device 100 for influencing arthropods 12 by means of electromagnetic radiation 10 is shown, wherein the device 100 comprises at least one transmitter 14, which transmits a characteristic 18 of the electromagnetic radiation 10, wherein the characteristic 18 of the electromagnetic radiation 10 is created with the aid of at least one equivalent electronic circuit, wherein the equivalent circuit is a model of an arthropod 12.

In a further exemplary embodiment, the model describes at least one sensory appendage 16 and/or at least one sensory property of the arthropod 12.

In a preferred exemplary embodiment, the equivalent circuit is generated with the aid of at least one TLM 20. Generally valid solutions exist for TLMs and, for example, any desired physical and/or biochemical effects can likewise be described with TLMs.

As in the exemplary embodiment in FIG. 49 for example, the device 100 may also comprise a multi-frequency pattern generator 24, which generates the characteristic of the electromagnetic radiation 10. The device can additionally optionally comprise a modulator 26, an amplifier 28, an oscillator 30 and an antenna 32. The multi-frequency pattern generator 24 generates the electromagnetic radiation 10, wherein the signal is then modulated with the modulator 26 and/or oscillator 30, for example by means of PWM, FM, AM, PFM, TDM, FDM or other modulation types. The signal is then amplified in the amplifier 28 and then radiated by the antenna 32.

Furthermore, in a preferred exemplary embodiment in FIG. 49, means 34 are provided, with which the characteristic of the electromagnetic radiation can be transferred from a memory, for example from a database or a cloud, to the device. In principle, any desired transmission means and/or types can be considered, for example wireless transmission types, such as Wi-Fi, Bluetooth, infrared or other data networks.

In a further exemplary embodiment in FIG. 49, means 36 are provided with which the characteristic of the electromagnetic radiation 10 can be created, for example calculated, in the device 100, for example with a microcontroller or a computing unit.

The characteristic 18 can additionally also comprise at least one Trichel pulse sequence (FIG. 33), (FIG. 31), (FIG. 32) for simulation of a corona discharge in the atmosphere for stronger and more efficient influencing of the arthropods 12.

To summarize, a biologist firstly examines an insect for its sensory organs and classifies these. These sensory organs or sensory appendages can perceive very different stimuli, for example volatile and non-volatile odors, scent molecules, temperature, humidity or taste. The biologist knows exactly where the various sensory organs with the receptors are located in the arthropod.

In addition, it is widely known to the biologist, as a result of investigations, how the cell structure looks and how the exact correlations for signal transmission occur within the arthropod. Microscopic investigations and other imaging analysis methods have provided the biologist with extensive and unambiguous information regarding the structural build of the arthropod. In addition, the biologist knows which genes, gene families and chemo sensory neurons are responsible for the particular sensory perception.

The biologist thus drafts a comprehensive image of the arthropod and determines all sensory structures. The biologist also knows where exactly cell branches, porous structures, permeable and semi-permeable layers and membranes, thickened areas, and constrictions in the signal transmission pathway are located and where diffusion can occur. On this basis, the biologist is aware of the signal transmission pathways of stimuli and the topological properties responsible for the signal transmission.

The biologist also knows that electromagnetic radiation is used in the therapy of mammals and that electromagnetic radiation and light signals in the nanometer range influence the behavior of arthropods.

Based on the knowledge of the biologist that electromagnetic radiation directly and indirectly influences the behavior of arthropods, the conclusion results, i.e., that the sensory properties can be modelled with electrical equivalent circuits in order to abstract the complex topology of the arthropod with the aid of electrical equivalent circuits.

It results from this that the use of equivalent circuits is helpful in the influencing of arthropods.

Due to the similarity of some sensory organs to components in the field of electrical engineering, for example antennae and feelers, it has been found that there is a closeness to solutions in electrical engineering. This results in the assumption that it is helpful to directly replace the sensory organs specifically with elements from electrical engineering. For example, the antenna feelers have the same biomechanical and optical structure as a brush electrode in electrical engineering. Based on this approach, a selection of equivalent circuits is provided and the equivalent circuits that correspond the closest to the sensory organs are selected.

An assignment of the topology of the arthropod to equivalent circuits is thus performed.

FIGS. 51-54 list equivalent circuits of various sensory appendages of an arthropod with correspondingly assigned equivalent circuits. The assignment of the biological knowledge regarding the equivalent circuit has been provided based on the current state of medical technology. The representation of the electrical conductivity and thus also of the electrical resistivity as well as the resultant impedance progressions form a further helpful assumption.

At this point, however, the values of the resistances and capacitances in the equivalent circuit (FIG. 51-54) are unknown.

Figure 55:
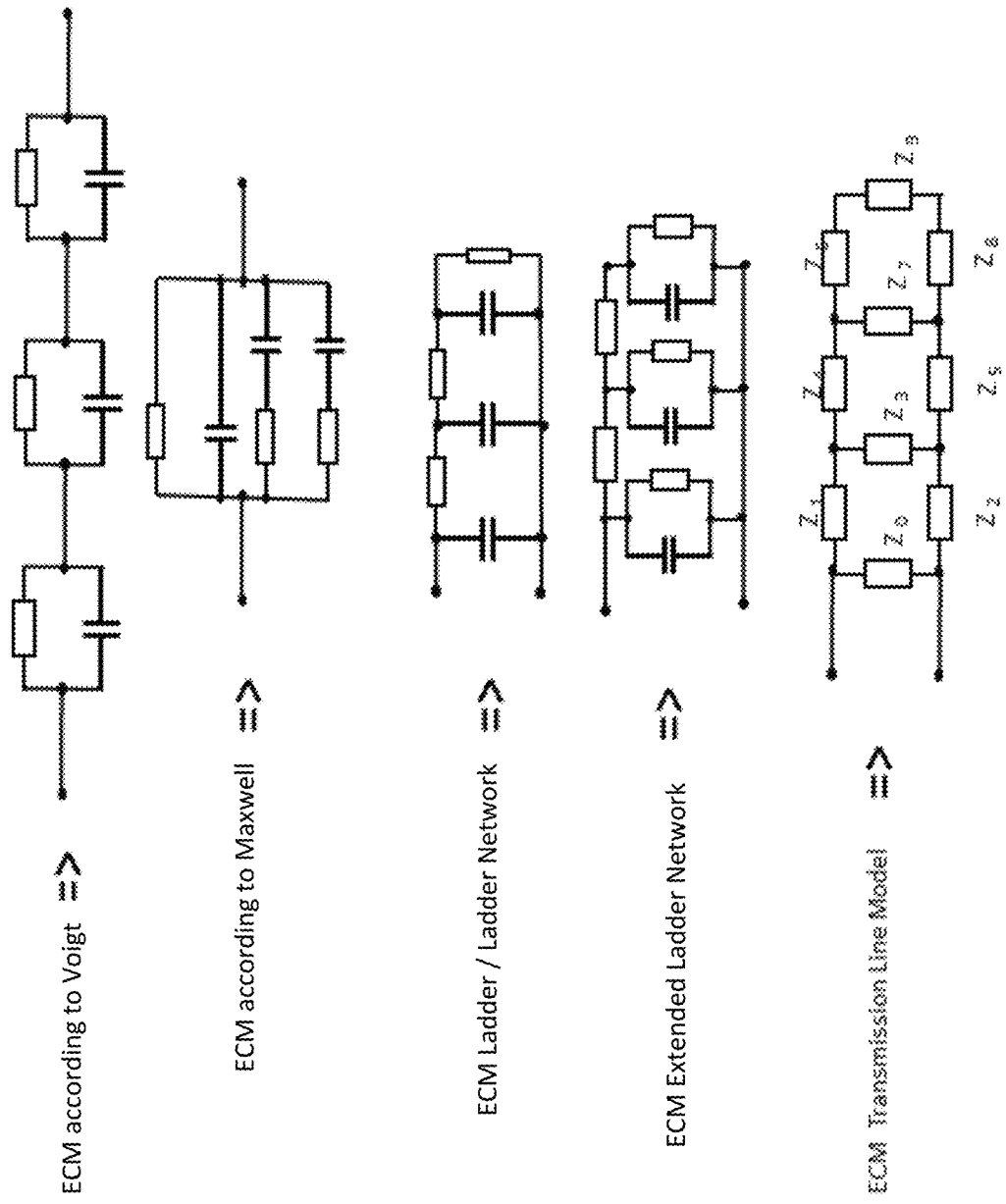
Figure 56:
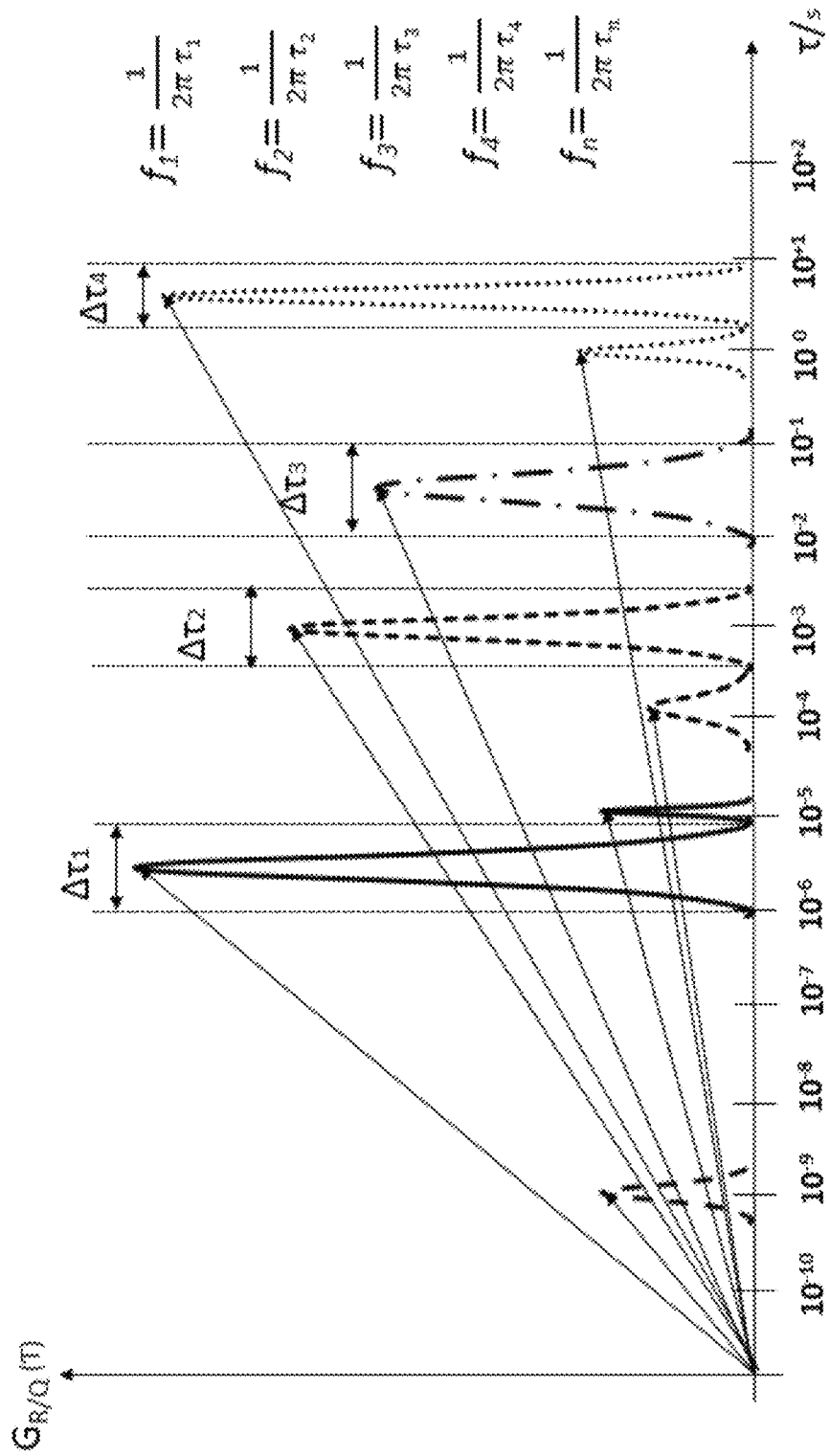
Figure 57:
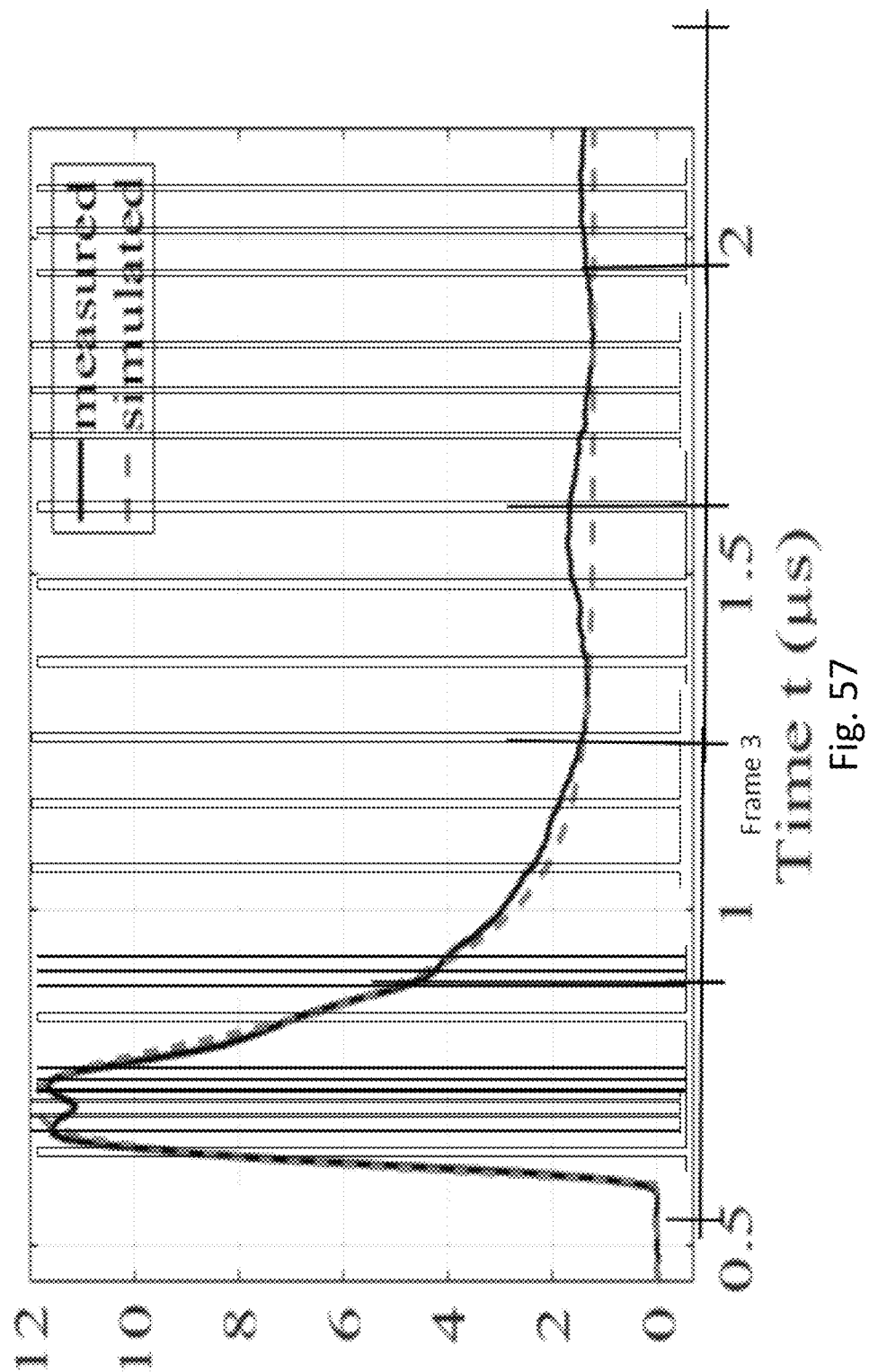
Figure 58:
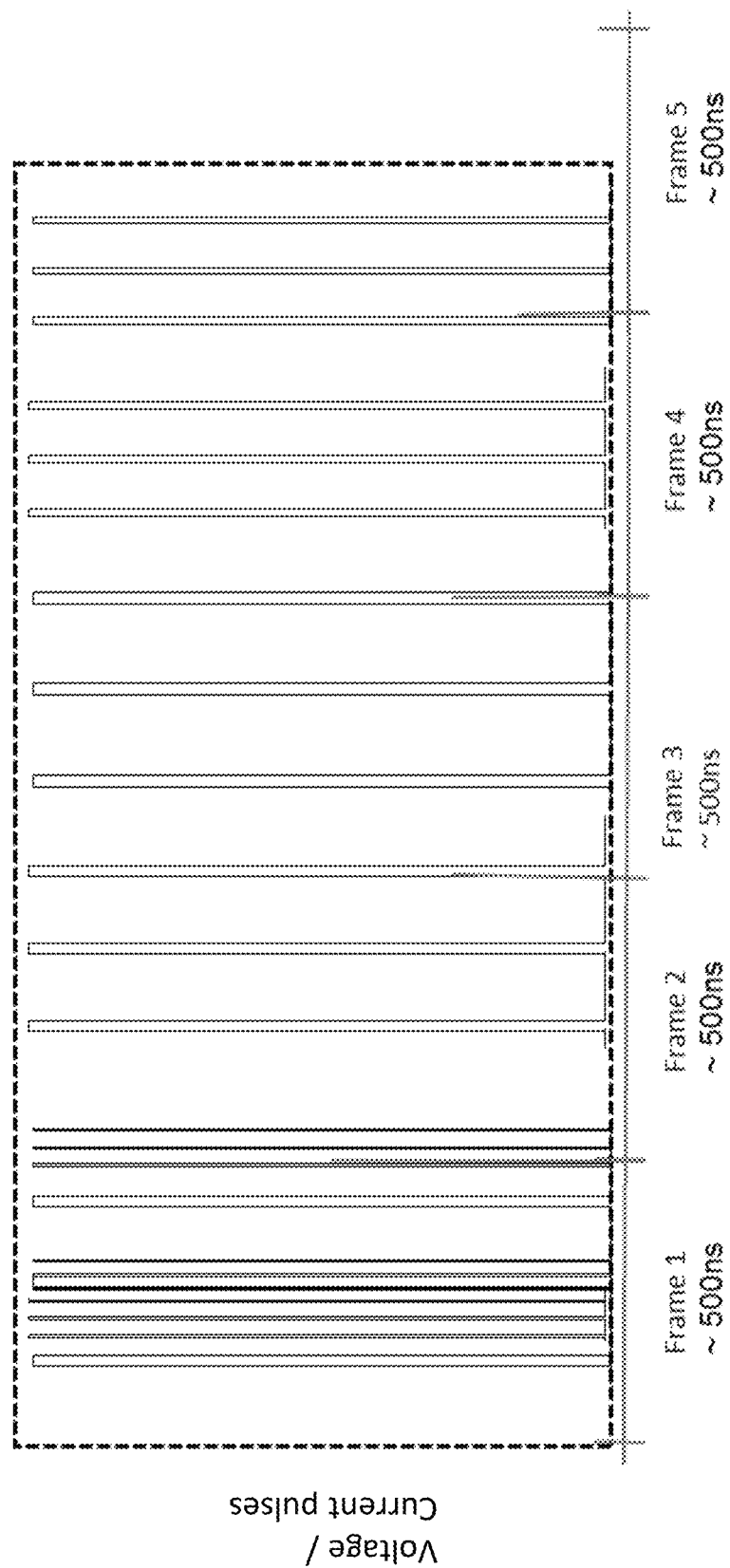
Figure 59:
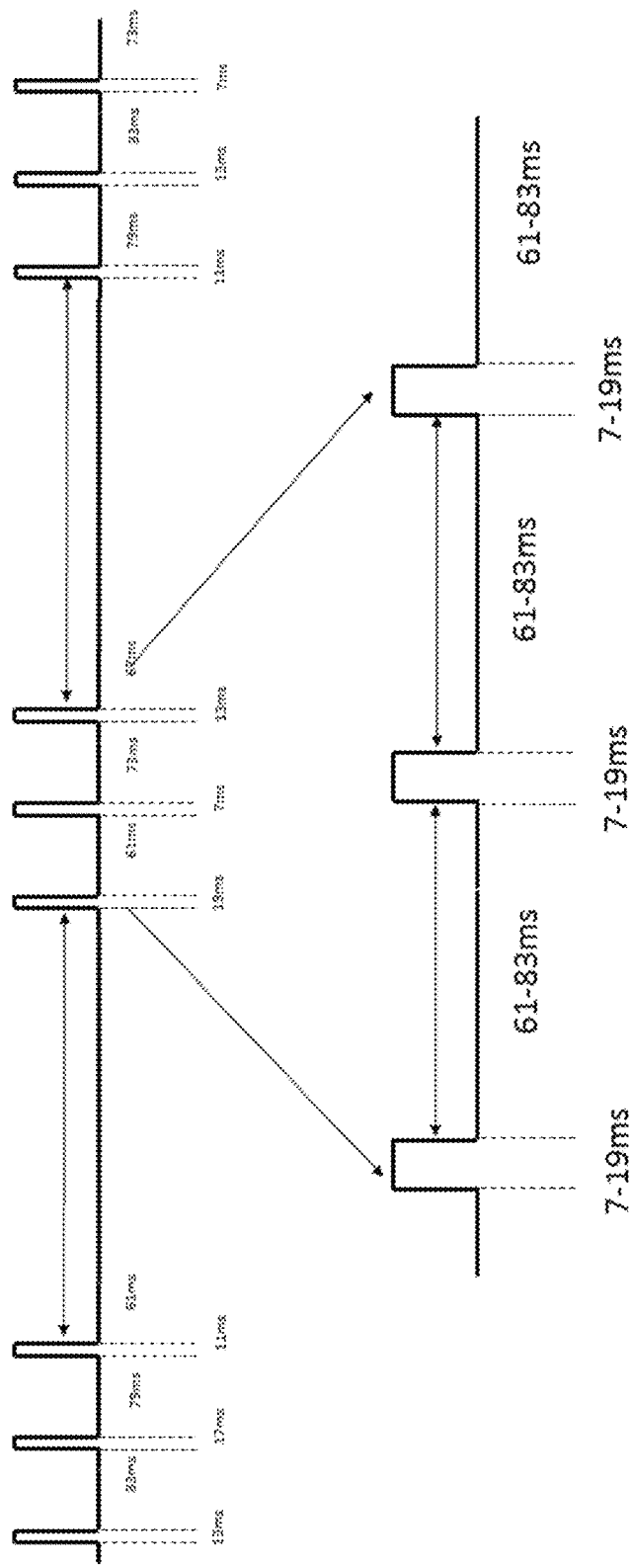
Figure 60:
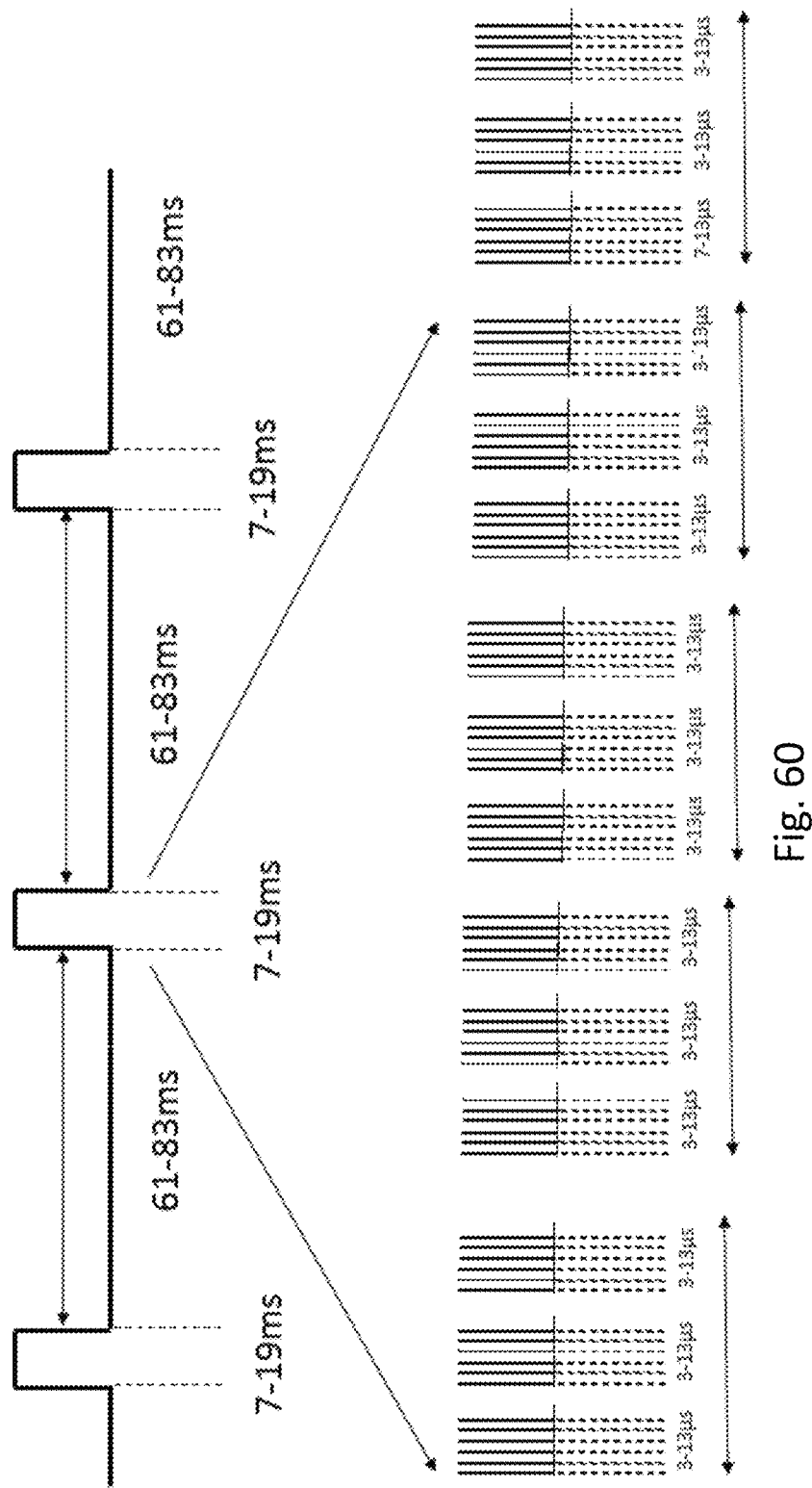
Figure 61:
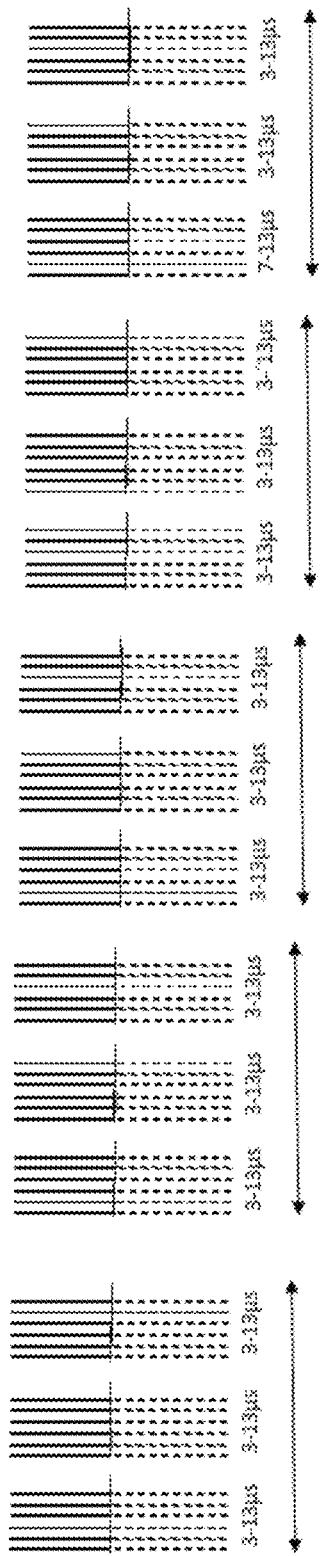

A transformation of the equivalent circuits (possibly connected in series) to a Voigt, Maxwell, ladder, extended ladder or TLM model, for example (FIG. 55), is performed. All models in FIG. 55 can be used equivalently. However, the TLM model is universally applicable. The term "universally applicable" means that all equivalent circuits or all equivalent circuits no matter how they are connected together can be described with a TLM.

For example, Voigt models and TLM models are suitable for analysis and determination of conductivity, impedance and resistivity of unknown systems.

At this point, the values of the resistances and capacitances are also unknown.

Regardless of the equivalent circuits and assumptions determined up to now, a known Trichel pulse (or any other pulse) is now transmitted or is used initially for irradiation of the arthropod.

Trichel pulses are signals in the time domain which occur widely in nature. In particular, the sun generates electromagnetic radiation which can lead to pulse discharges in the air and which can be perceived by arthropods in particular as a change to their atmospheric environment. The Trichel pulse is thus a natural pulse perceived in principle by the arthropods and simulates a natural change. Put simply, the Trichel pulse is the language or the signal by which the arthropod communicates, also within the scope of the disclosure. The use of a pulse and in particular a Trichel pulse is thus a further helpful assumption for influencing arthropods.

The transmitted Trichel pulse delivers a frequency spectrum. For example, a Fourier transform is used for the analysis of a frequency spectrum of signals in the time domain. With the aid of the Fourier transform, the frequency components of the Trichel pulses are now also determined. The frequency components of pulse discharges, such as a Trichel pulse, must be determined characteristically in the frequency spectrum.

Each determined characteristic frequency component in the Trichel pulse is then converted into a settling time τ (tau). This settling time corresponds with the time constants of an RC circuit in the equivalent circuit, for example of the Voigt model (FIG. 29). This means that, at this point, the connection to the arthropod is established by means of the at least one equivalent circuit. With use of the determined settling times tau, preferably all time constants of all RC circuits in the equivalent circuit can thus be resolved. Each significant frequency in the frequency spectrum is representative here of a settling time of an RC circuit. This is thus a further helpful assumption.

As already described above, in order to represent the electrical conductivity and thus also the electrical resistivity and the impedance of biological structures, equivalent circuits formed of resistors and capacitors are used. Based on Ohm's law and Kirchhoff's law, there is a direct correlation between current, voltage, conductivity and resistivity. This representation is extremely helpful when it comes to determining the key influencing variables, specifically a representation of the normalized amplitudes (voltage) in the frequency spectrum (y-axis) depending on the settling times of the RC circuits (x-axis).

Due to the direct correlation of current, voltage and resistivity, the normalized representation of the resistivity (y-axis) is now used in dependence on the settling times of the RC circuits. This representation is referred to as DRT analysis or DRT impedance spectrum. In the DRT analysis the resistivities (reciprocal of the complex impedance) of the RC circuits are set in relation to the settling times of the individual RC circuits. For this reason, DRT analysis is used for graphical representation and optionally analysis. Due to the different complex resistivities in the DRT impedance spectrum, the significant and less significant RC circuits and thus influencing variables for influencing the arthropod are directly identified.

The DRT impedance spectrum is thus the first signal in the communication or influencing of the behavior of the arthropod and the graphical representation of the impedance of the arthropod.

By targeted variation of the time constants of the frequency/pulse pattern, it is possible to train the arthropod.

With the aid of a graphical analysis of the DRT impedance spectrum based on algorithms from artificial intelligence, the frequency/pulse patterns can be adapted by selective variation of the determined significant time constants. This corresponds in practice to the variation of the Trichel pulse until the correct frequency at which the arthropod reacts has been found.

The characteristic properties of an arthropod can thus even be represented additionally or alternatively by a graphical solution. By monitoring only the magnitude of the peak values of the resistivities $G_{R/Q}$ in the DRT spectrum, the significant frequencies can be directly derived. A further mathematical possibility is the use of scalar and vector fields or line search methods in the graphical DRT impedance spectrum. The use of commercially conventional microcontrollers and look-up tables is thus possible for the analysis. An analysis simplified in this way can be performed within a few seconds, also on a mobile communications device, such as a mobile phone, which is also capable of then transmitting the determined frequency components.

Proceeding from this DRT impedance spectrum, the RC time constants are now adapted, and thus the frequencies.

As an optional step for checking plausibility and for verifying the foregoing, a graphical analysis can additionally be performed by means of the Nyquist impedance spectrum (locus curve representation) and verification of the locus curves with the equivalent circuit.

The analysis of electrical complex networks in the image domain (locus curves) of the so-called Nyquist impedance spectrum offers many advantages in the verification or validation of equivalent circuits with the topological structures of systems such as arthropods and is used above all, but not only, in order to check plausibility. If the above-explained steps are known specifically, conversely the topology of the arthropod can also be concluded from the graphical representation of the frequency pattern, and vice versa. This can be performed by means of pattern recognition methods, optionally with use of artificial intelligence.

Different geometrical shapes of cell structures or topological properties of arthropods can be assigned directly to different curves in the Nyquist impedance spectrum. FIGS. 36-39 show curve families, semi-circles, straight lines and turning points, which can be uniquely assigned in the graphical analysis depending on the geometric structure or porous properties. The "correct" characteristic or the "correct" frequencies can be represented instead in a DRT spectrum as in FIG. 29 and also as a Nyquist plot (FIG. **36*ff***).

The Nyquist plot allows an identification of the topology of the insect on the basis of the assignment of the Nyquist impedance spectrum. It is also used to validate the knowledge and understanding of the biologist with the knowledge of the electrical engineer. A trend analysis to adapt the frequency/pulse pattern by enlarging or reducing the time constants can thus optionally be determined as a result.

The bases of the biological and biochemical analyses are the precondition for the understanding of the equivalent circuits. Different attributes or topological properties are broken down into individual equivalent circuits and analyzed. A porous sensilla hair, for example, has different electrical properties here as compared to a branched axon. Properties such as porosity, permeable or semi-permeable membranes, diffusion, brush electrodes or ion transport have unique properties and significant features in the Nyquist impedance spectrum.

Brush electrodes (de Levie behavior) or a large number of sensilla hairs have the property of a constant phase element CPE, as is provided in a double-layer capacitor. Based on these known properties (FIG. 41), the assignment of equivalent circuits can be simplified.

The same is true for the structure of somas and axons of the arthropod. In the Nyquist impedance spectrum, properties of constant phase elements can be directly assigned (FIG. 38 and FIG. 39).

FIG. 62 shows the structure according to the device with measurement devices and PC with MatLab, as is used in a laboratory, but also in principle in practice.

The device comprises means 40 for transmitting at least one pulse, preferably a Trichel pulse. This may be any kind of signal generator. The pulse is then detected by means 42 for detecting the frequency spectrum of the transmitted pulse, in the exemplary embodiment an oscilloscope. The analysis, thus determined, in the time domain is then forwarded to a frequency spectrum analyzer as means 44 for determining at least one frequency component of the frequency spectrum of the transmitted pulse. If the frequency components are determined, the at least one frequency component can be converted into a settling time by computing means 46, in order to thus determine, optionally by the same computing means 46, the at least one unknown RC circuit on the basis of the settling time corresponding with the time constants of the RC circuit. This presupposes an application of knowledge from biology, that is to say knowledge of the analogy between the structure of sensory appendages 16 and sensory properties with electronic equivalent circuits.

Preferably following normalization of the voltage amplitude in dependence on the at least one settling time by means of normalization means 48, a significant RC circuit can be selected by selection means 62 by the means for determining the at least one significant RC circuit. For this purpose, for example, a DRT impedance spectrum and an analysis based on artificial intelligence can be used. The determination means 44 thus identify at least one RC circuit significant for the influencing of the arthropod 12. This selection can be verified by means of a verification 60 as necessary, for example by the Nyquist plot with known impedance spectra.

The means for transmitting the pulse 40 is arranged to transmit at least one positive and/or negative Trichel pulse.

Figure 63:
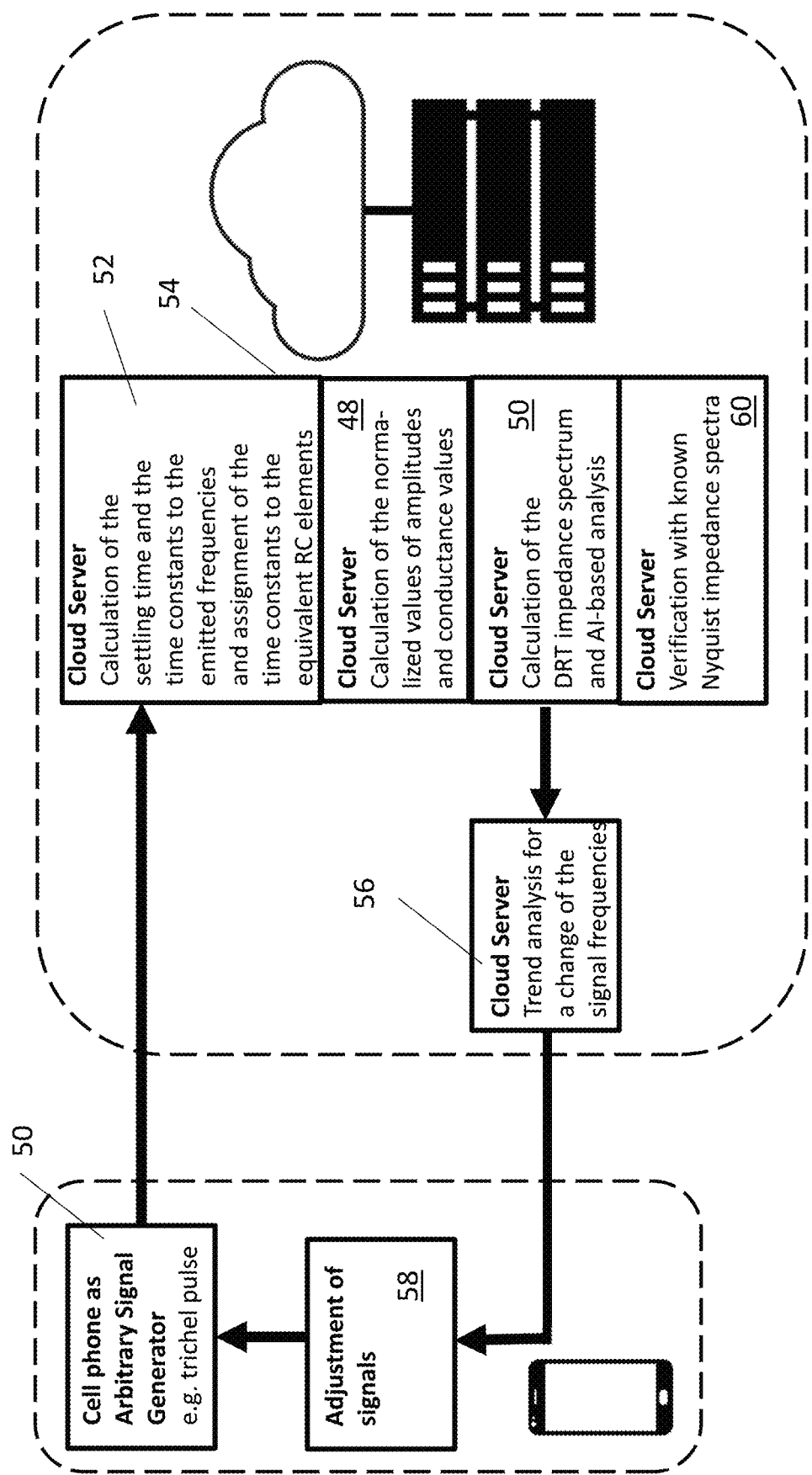

Alternatively or additionally, means for identifying and means for graphically representing 56 a frequency behavior of the at least one element from the group comprising the sensory appendage 16 and the sensory property of the arthropod 12 when transmitting at least one pulse can also be provided and are coupled to means for identifying and means for graphically representing 54 a frequency behavior of equivalent circuits when transmitting at least one pulse, for example by means of a cloud solution according to FIG. 63. The graphically represented frequency behaviors of the equivalent circuits are compared with the graphically represented frequency behaviors of the at least one element of the arthropod 12 by comparison means, which can also be contained in the cloud or the identification means 56, and similarities between graphical patterns can be determined. The selection means 62 for selecting the at least one electronic equivalent circuit that is equivalent to the at least one element from the group comprising the sensory appendage 16 and the sensory property of the arthropod 12 then make a decision on the basis of the determined similarity.

Here too, a verification 60 as well as the comparison can be performed in a Nyquist plot.

Figure 62:
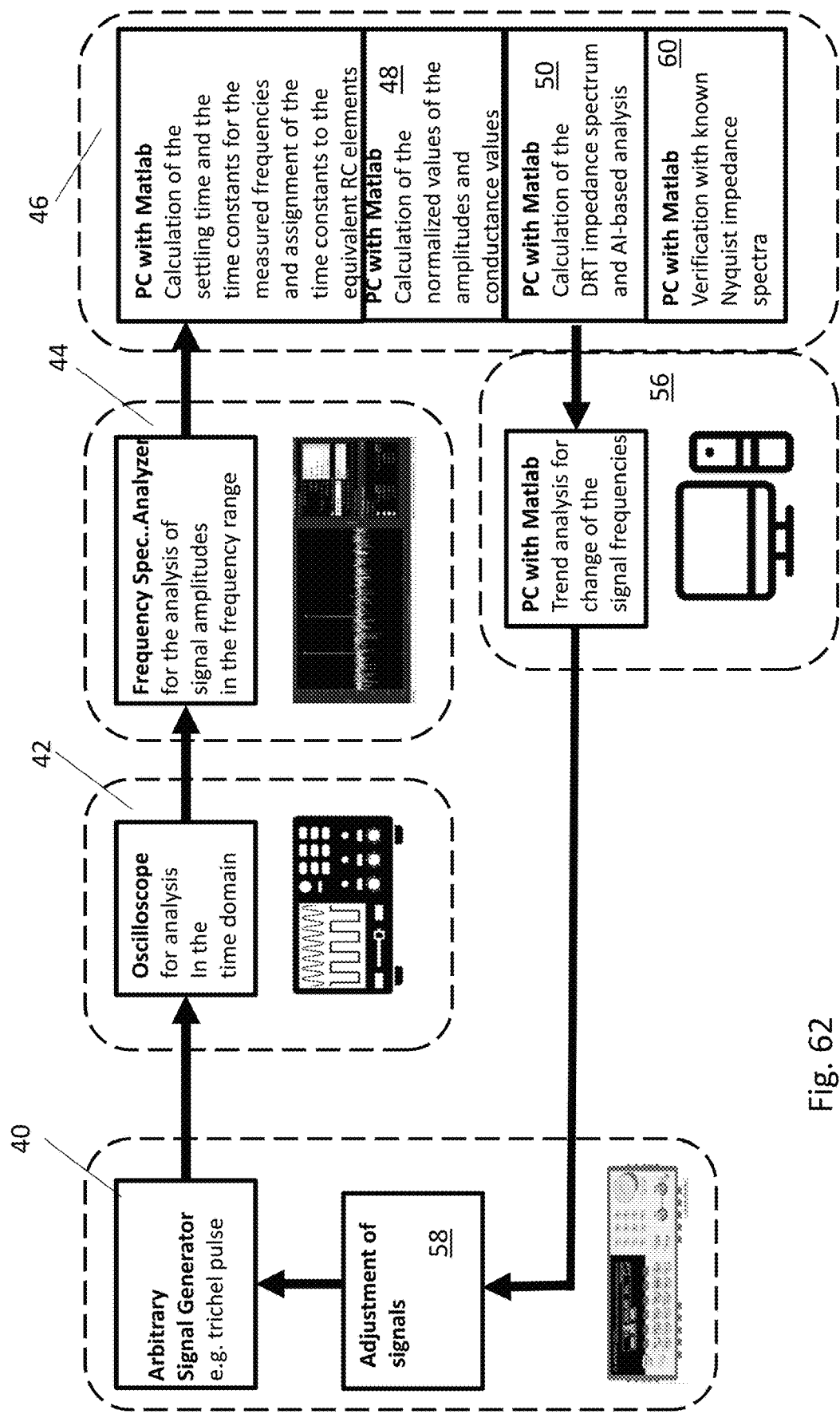

Whereas a trend analysis is performed in FIG. 62 by means of the microcontroller or PC, this can also be performed in practice according to FIG. 63 in a cloud-based manner. The signals in both cases are subjected to an adaptation, and the signal generator is actuated accordingly. In FIG. 63 a mobile phone 50 is used as signal generator.

It is self-explanatory that this description can be subjected to a very wide range of modifications, changes and adaptations, which lie within the scope of equivalents to the accompanying claims.

The invention claimed:

1. A method for influencing arthropods in using an electromagnetic radiation, wherein the electromagnetic radiation with a characteristic is radiated by at least one transmitter, wherein the characteristic of the electromagnetic radiation is determined with at least one equivalent electronic circuit, wherein the equivalent circuit is a model of at least one element from a group comprising at least one sensory appendage and at least one sensory property of an arthropod.

2. A method according to claim 1, comprising the following steps:

transmitting at least one pulse,
detecting the frequency spectrum of the transmitted pulse,
determining at least one frequency component of the frequency spectrum of the transmitted pulse and converting the frequency component into a settling time,
determining the at least one element from the group comprising the sensory appendage and the sensory property of the arthropod as at least one determined element,
selecting the at least one equivalent electronic circuit that is equivalent to the at least one determined element and that has at least one unknown RC circuit with a resistance R of 0≤R and a capacitance C of 0≤C,
determining the at least one unknown RC circuit on the basis of the settling time, calculated from the frequency component of the frequency spectrum of the transmitted pulse, corresponding with time constants of the RC circuit, as at least one now known RC circuit,
determining at least one RC circuit significant for influencing the arthropod.

3. A method according to claim 2, wherein to determine the at least one RC circuit, the voltage amplitude is normalized depending on at least one settling time determined with the known RC circuit, and the voltage amplitude is determined on the basis of a normalized voltage amplitude.

4. A method according to claim 3, wherein the voltage amplitude is normalized by a DRT analysis.

5. A method according to claim 2, wherein the time progression of the pulse has at least one of at least one positive Trichel pulse and at least one negative Trichel pulse.

6. A method according to claim 2, comprising the step of training the arthropod by varying the time constants of the at least one RC circuit.

7. A method according to claim 1, comprising the following steps:

determining at least one element from the group comprising the sensory appendage (16) and the sensory property of the arthropod,
identifying and graphically representing a frequency behavior of the at least one element from the group when transmitting at least one pulse,
identifying and graphically representing a frequency behavior of at least one equivalent electronic circuit when transmitting at least one pulse,
comparing a graphically represented frequency behavior of the at least one equivalent circuit with a graphically represented frequency behavior of the at least one element from the group and determining a similarity of graphical patterns,
selecting the at least one electronic equivalent circuit that is equivalent to the at least one element from the group on a basis of the similarity as determined.

8. A method according to claim 6, wherein a graphical representation is provided in a Nyquist plot.

9. A method according to claim 1, wherein the model is associated with at least one of a physical effect and a biochemical effect of at least one element from the group:

a model of a brush electrode, which is a model of the antennae of the arthropod,
a model of a porous electrode, which is a model of the porous sensilla hairs of the arthropod,
a model of general diffusion, which describes a ion diffusion,
a model of the diffusion of a non-permeable wall,
a model of a diffusion of an ideal reservoir, a model for calculating a tortuosity factor from tomographic data of at least one of a surface and an inner structure of the arthropod, a model for calculating the tortuosity factor from topographic data of at least one of the surface and the inner structure of the arthropod.

10. A method according to claim 2, wherein to determine the at least one RC circuit of the equivalent electronic circuit at least one transmission line model is used.

11. A method according to claim 1, wherein a plurality of equivalent electronic circuits are connected in series.

12. A method according to claim 1, wherein at least one impedance spectrum is determined with the at least one equivalent electronic circuit.

13. A method according to claim 12, wherein the at least one impedance spectrum is determined with the at least one of tomographic data and topographic data of the arthropod.

14. A method according to claim 10, wherein the transmission line model is divided into at least one of the following transmission line models:
transmission line model for a porous electrode,
transmission line model for porous material,
transmission line model for general diffusion,
transmission line model for diffusion in non-permeable walls and an ideal reservoir.

15. A method according to claim 10, wherein at least one differential equation of the transmission line model is solved to determine parameters for the characteristic of the electromagnetic radiation.

16. A method according to claim 10, wherein a used transmission line model is verified and/or adapted with at least one element of at least one other transmission line model and at least one simplified equivalent electronic circuit.

17. A method according to claim 1, wherein arbitrary nonlinear functions are modeled by a substitution method in combination with at least one database.

18. A method according to claim 1, wherein at least one discrete Fourier transform with incorporation of a Goertzel algorithm is used for storage-efficient use of the method on a basis of a microcontroller.

19. A method according to claim 14, wherein the solving of the differential equation by a control system based on at least one reference model is checked and adapted, wherein the reference model is determined from at least one of empirical data and data of an already determined model.

20. A method according to claim 1, wherein the characteristic of the electromagnetic radiation is modulated with at least one carrier signal or at least one dither signal or with at least one carrier signal which is additionally modulated with at least one dither signal.

21. A method according to claim 1, wherein the characteristic of the electromagnetic radiation is generated with a combined multi-frequency pattern generator which is based on a frequency division multiplexing signal and a time division multiplexing signal and has at least one burst pulse which simulates at least one corona discharge in the air and the time progression of which has at least one of at least one positive Trichel pulse and at least one negative Trichel pulse.

22. A method according to claim 1, wherein the characteristic comprise at least one of the following attitudes
it does not have any harmonic correlations,
it does not have any subharmonic correlations,
it is prime-number-based,
it does not have any integer harmonic multiples or factors,
it does not have any integer subharmonic multiples or factors.

23. A device for influencing arthropods with an electromagnetic radiation, wherein the device has at least one transmitter, which radiates the electromagnetic radiation with a characteristic, characterized in that at least one equivalent electronic circuit is configured for determining the characteristic of the electromagnetic radiation, wherein the at least one equivalent electronic circuit is a model of at least one element from a group comprising at least one sensory appendage and at least one sensory property of an arthropod.

24. A device according to claim 23, comprising:
means for transmitting at least one pulse,
means for detecting the frequency spectrum of the transmitted pulse,
means for determining at least one frequency component of the frequency spectrum of the transmitted pulse and computing means for converting the frequency component into a settling time,
means for determining at least one element from the group comprising the sensory appendage and the sensory property of the arthropod as at least one determined element,
selection means for selecting the at least one equivalent electronic circuit that is equivalent to the at least one determined element and that comprises at least one unknown RC circuit with a resistance R of 0≤R and a capacitance C of 0≤C,
means for determining the at least one unknown RC circuit on the basis of the settling time, calculated from the frequency component of the frequency spectrum of the transmitted pulse, corresponding with the time constants of the RC circuit as at least one now known RC circuit,
means for determining at least one RC circuit, significant for influencing the arthropod.

25. A device according to claim 24, wherein the means for determining the at least one RC circuit comprise normalization means for normalizing the voltage amplitude depending on at least one settling time determined with the known RC circuit.

26. A device according to claim 24, wherein the means for transmitting the at least one pulse is configured to transmit at least one of at least one positive Trichel pulse and at least one negative Trichel pulse.

27. A device according to claim 23, further comprising:
means for determining at least one element from the group comprising the sensory appendage and the sensory property of the arthropod,
first means for identifying and first means for graphically representing a frequency behavior of the at least one element from the group comprising the sensory appendage and the sensory property of the arthropod when transmitting at least one pulse,
second means for identifying and second means for graphically representing a frequency behavior of the at least one equivalent electronic circuit when transmitting at least one pulse,
means for comparing a graphically represented frequency behavior of the at least one equivalent electronic circuit with a graphically represented frequency behavior of the at least one element from the group comprising the sensory appendage and the sensory property of the arthropod and for determining a similarity of graphical patterns,
selection means for selecting the at least one electronic equivalent circuit that is equivalent to the at least one element from the group comprising the sensory appendage and the sensory property of the arthropod on the basis of the determined similarity.

28. A device according to claim 27, wherein graphical representation means are configured to provide a graphical representation in a Nyquist plot.

29. A device according to claim 23, wherein a combined multi-frequency pattern generator which is based on a frequency division multiplexing signal and a time division multiplexing signal is provided and configured to generate the characteristic of the electromagnetic radiation.

30. A device according to claim 23, wherein means are provided with which the characteristic of the electromagnetic radiation is transferrable from a memory to the device or is configured to be set up in the device.

31. A device according to claim 23, wherein the device is configured to provide the characteristic comprising at least one burst pulse, which simulates at least one corona discharge in the air and the time progression of which has at least one of at least one positive Trichel pulse and at least one negative Trichel pulse.

* * * * *